United States Patent
Suematsu et al.

(10) Patent No.: US 7,392,024 B2
(45) Date of Patent: Jun. 24, 2008

(54) RADIO RECEIVER, RADIO COMMUNICATION SYSTEM AND ELECTRONIC EQUIPMENT

(75) Inventors: Eiji Suematsu, Nara (JP); Keisuke Satoh, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 277 days.

(21) Appl. No.: 11/187,869

(22) Filed: Jul. 25, 2005

(65) Prior Publication Data
US 2006/0063483 A1   Mar. 23, 2006

(30) Foreign Application Priority Data
Jul. 23, 2004 (JP) .............................. 2004-215369
Feb. 3, 2005 (JP) .............................. 2005-027907

(51) Int. Cl.
H04B 15/00 (2006.01)
H04B 1/26 (2006.01)

(52) U.S. Cl. ........................ 455/130; 455/3.02; 455/314; 455/323; 455/334

(58) Field of Classification Search ....... 455/3.02–3.06, 455/75–88, 313–325, 334–337
See application file for complete search history.

(56) References Cited

U.S. PATENT DOCUMENTS

| | | | | |
|---|---|---|---|---|
| 4,219,849 A | * | 8/1980 | Janssen et al. | 348/737 |
| 5,388,125 A | * | 2/1995 | Toda et al. | 375/332 |
| 6,185,201 B1 | * | 2/2001 | Kiyanagi et al. | 370/343 |
| 6,363,262 B1 | * | 3/2002 | McNicol | 455/561 |
| 6,584,157 B1 | * | 6/2003 | Van Der Zwan et al. | 375/247 |
| 6,826,234 B1 | | 11/2004 | Shoji et al. | |
| 6,973,328 B1 | * | 12/2005 | Suematsu | 455/552.1 |
| 7,075,967 B2 | * | 7/2006 | Struhsaker et al. | 375/130 |
| 7,218,907 B2 | * | 5/2007 | Sorrells et al. | 455/319 |

FOREIGN PATENT DOCUMENTS

| | | |
|---|---|---|
| JP | 8-316737 A | 11/1996 |
| JP | 2001-53640 A | 2/2001 |
| JP | 2003-198259 A | 7/2003 |
| JP | 2003-258655 A | 9/2003 |
| JP | 2004-7505 A | 1/2004 |
| WO | WO-03/073628 A1 | 9/2003 |

* cited by examiner

*Primary Examiner*—Simon Nguyen
(74) *Attorney, Agent, or Firm*—Birch, Stewart, Kolasch & Birch, LLP

(57) ABSTRACT

According to the radio receiver, a first path P1 included in a frequency conversion circuit 12 does not have a filter, and a filter 171 for extracting a reference signal 74c is provided in a second path P2 so that a second IF multiple signal 74 and the reference signal 74c are multiplied together in a mixer section 12a. Consequently, by extracting the reference signal 74c, the filter 171 in the second path P2 operates as a local oscillation signal source synchronized with the second IF multiple signal 74. Therefore, according to the signal obtained by down-conversion of the second IF multiple signal 74 with use of the reference signal 74c in the mixer section 12a, signals identical in quality to input signals inputted on the transmission side can be reproduced.

23 Claims, 21 Drawing Sheets

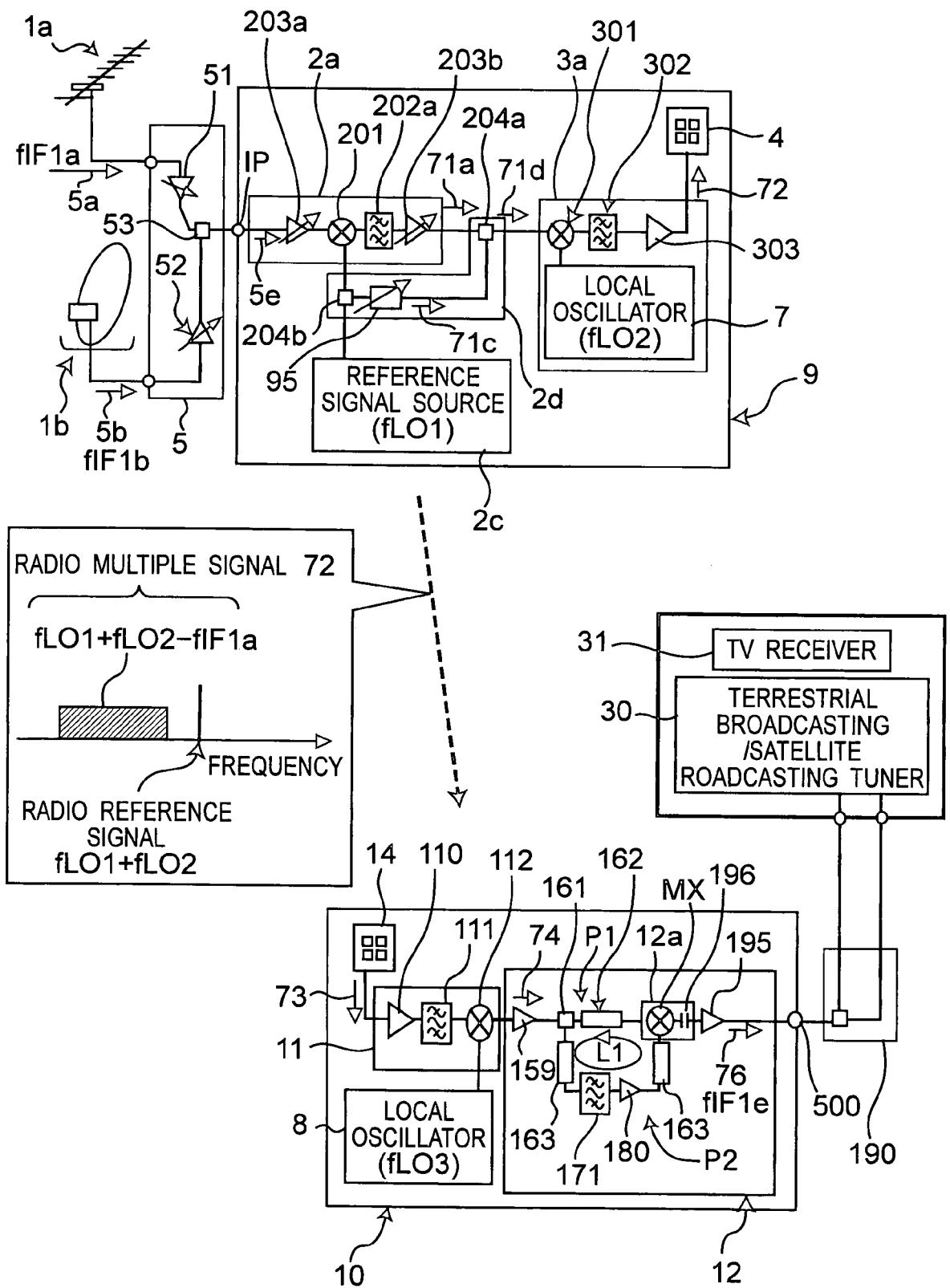

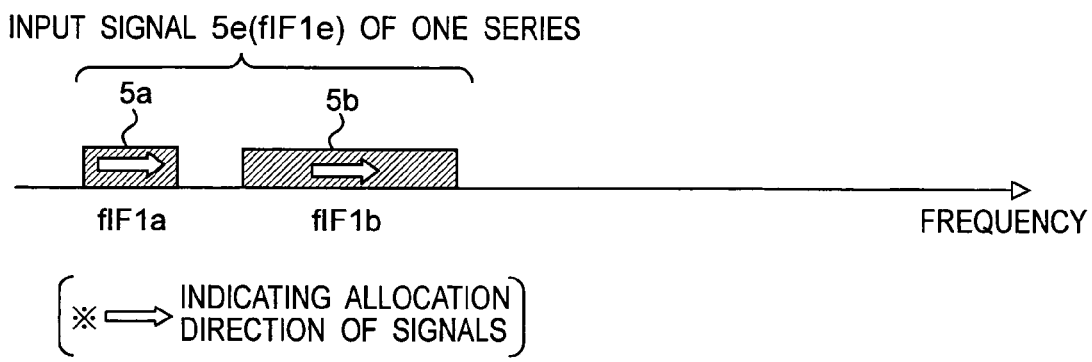
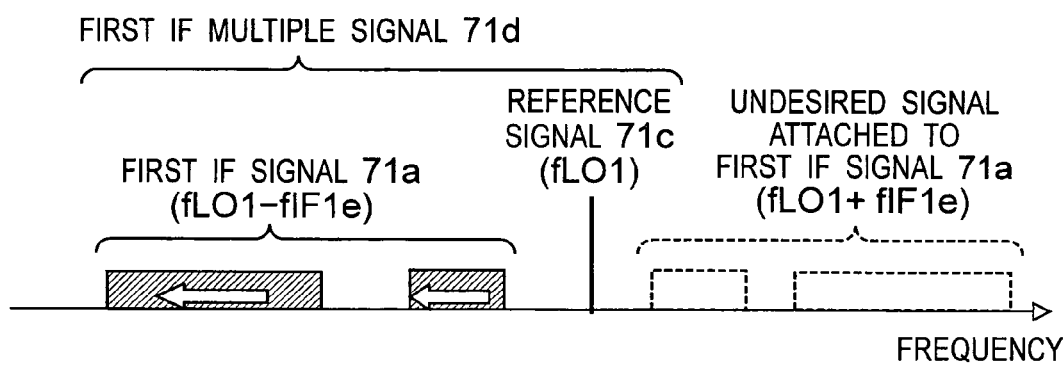
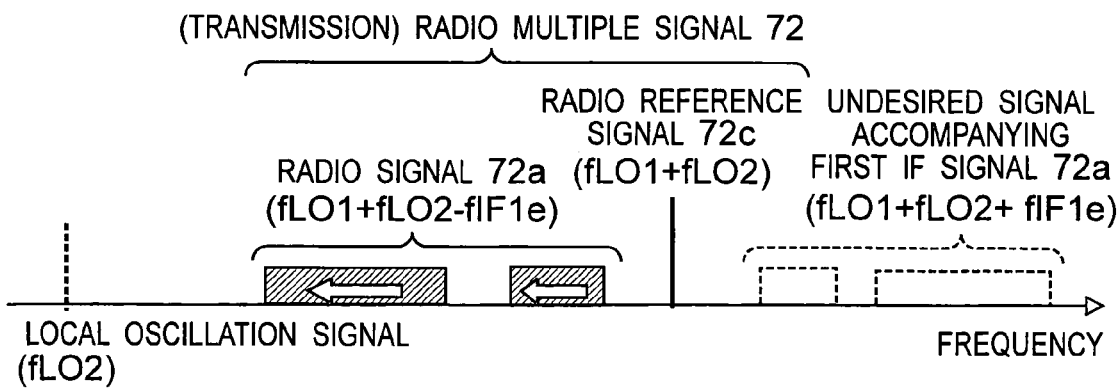

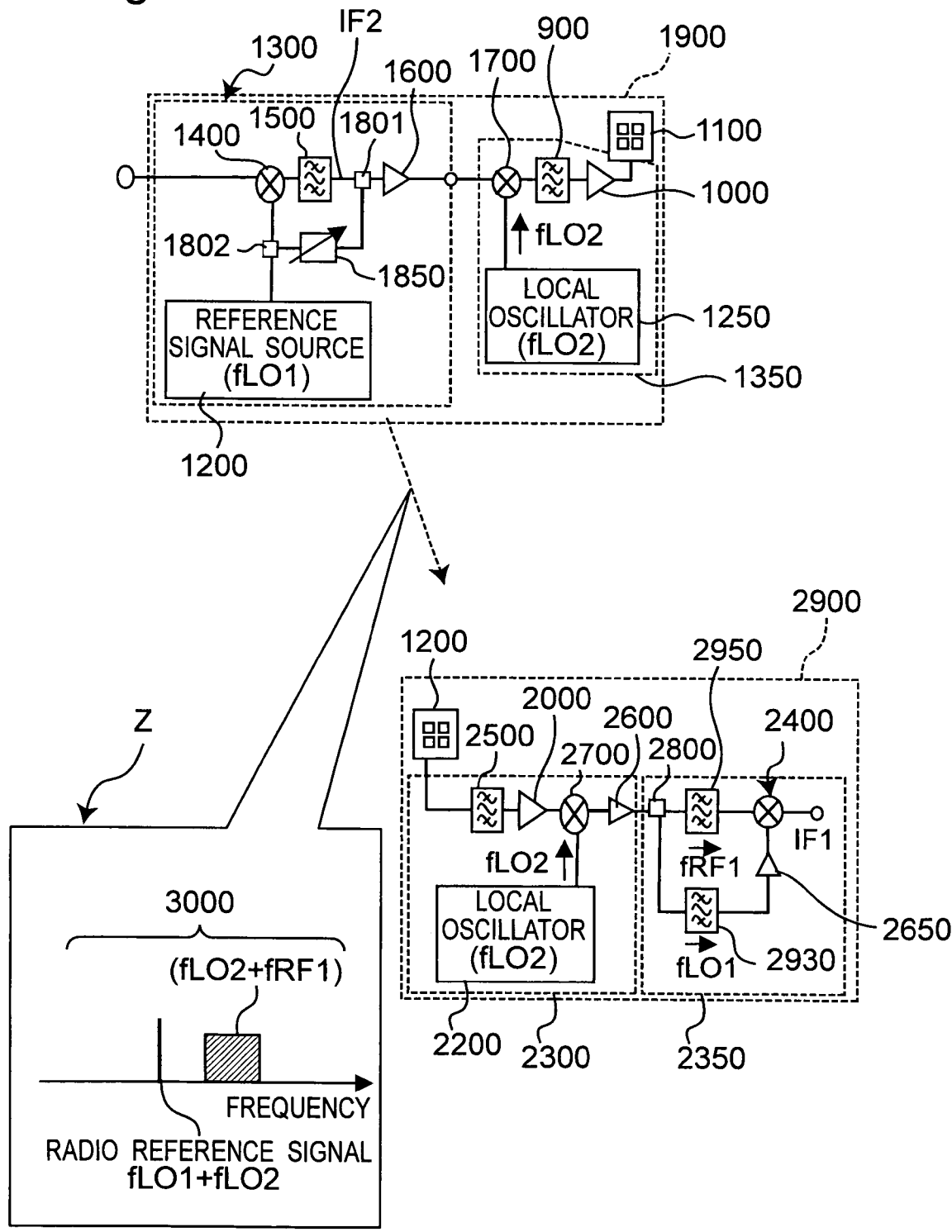

RADIO RECEIVER, RADIO COMMUNICATION SYSTEM AND ELECTRONIC EQUIPMENT

This nonprovisional application claims priority under 35 U.S.C. 119 (a) of Japanese application No. 2004-215369 filed on Jul. 23, 2004 and Japanese application No. 2005-027907 filed on Feb. 3, 2005, the contents of which are fully incorporated herein by reference.

BACKGROUND OF THE INVENTION

The present invention relates to a radio communication device, more particularly, for example, a microwave-band radio receiver for receiving signals of broadcast waves wirelessly transmitted in microwave bands, a microwave-band radio communication system and electronic equipment.

Conventional microwave-band radio communication systems include those having radio-frequency radio transmitters and radio-frequency radio receivers as shown in FIG. 21 (see, e.g., JP 2003-258655 A). Herein, microwave bands refer to frequency bandwidths including millimeter-wavebands.

First, description is given of a conventional radio-frequency radio transmitter 1900 shown in FIG. 21. The radio-frequency radio transmitter 1900 is composed of a first up-converter (intermediate frequency mixer) section 1300, a second up-converter (microwave-band mixer) section 1350 and a transmission antenna 1100.

The first up-converter section 1300 has a local oscillator 1200, a frequency mixer 1400, a filter 1500, an amplifier 1600, a power combiner 1801 and an attenuator (level setter) 1850.

In this conventional radio-frequency radio transmitter 1900, at first, the first up-converter section 1300 receives inputs of a first IF signal (modulated wave signal) IF1. The modulated wave signal IF1 is a signal modulated by, for example, orthogonal multi-carrier modulation (OFDM modulation). The frequency mixer 1400 multiplies an inputted signal IF1 and a first LO signal (local oscillation signal) LO1 (frequency fLO1) together to output a second IF signal IF2 (frequency fIF2). Further, the filter 1500 provided immediately after the mixer 1400 mainly extracts only a second IF signal IF2 component. In this description, the filter 1500 passes upper sideband signals as desired signals.

Moreover, a power divider 1802 distributes part of the first local oscillation signal LO1 outputted by the local oscillator 1200 to the attenuator 1850, which adjusts the level of the distributed first local oscillation signal LO1, and then the power combiner 1801 combines the first local oscillation signal LO1 and the second IF signal IF2 (frequency fIF2).

Thus, a multiwave signal (intermediate frequency multiple signal) composed of the second IF signal IF2 (radio-frequency signal RF1 (frequency fRF1)) and the first local oscillation signal (reference signal) LO1 is formed. This intermediate frequency multiwave signal is amplified by the amplifier 1600, and the amplified intermediate frequency multiwave signal is inputted into the second up-converter section 1350.

Description is now given of the second up-converter section 1350. The second up-converter section 1350 has a second local oscillator 1250, a mixer 1700, a filter 900 and an amplifier 1000.

The mixer 1700 multiplies a multiwave signal composed of the second IF signal IF2 and the first local oscillation signal LO1 by a second LO signal (local oscillation signal) LO2 (frequency fLO2) outputted from the local oscillator 1250 to up-convert the signal to a radio signal. Further, the filter 900 passes only desired frequency components of the up-converted radio signal, and the amplifier 1000 amplifies the passed radio signal. The signal amplified by the amplifier 1000 is a multiple signal composed of a signal of a radio modulated signal component (radio-frequency signal RF1+ second LO signal LO2) and a signal of a local oscillation signal component (first local oscillation signal LO1+second local oscillation signal LO2).

The transmission antenna 1100 transmits a signal of a radio modulated signal component (frequency fRF1+frequency fLO2) and a signal of a local oscillation signal component (frequency fLO1+frequency fLO2).

Description is now given of a conventional radio-frequency radio receiver 2900. The radio-frequency radio receiver 2900 is composed of a receiving antenna 2100, a first down-converter section 2300 and a second down-converter section 2350.

The radio-frequency radio receiver 2900 receives signals transmitted by the radio-frequency radio transmitter 1900. As schematically shown in a portion indicated by reference symbol Z in FIG. 21, signal components transmitted by the radio frequency radio transmitter 1900 are composed of a radio reference signal of a local oscillation signal component (frequency fLO1+frequency fLO2) and a signal of a radio modulated signal component (frequency fRF1+frequency fLO2). The radio-frequency radio receiver 2900 down-converts the received signals to original modulated wave signals (first IF signal IF1).

The first down-converter section 2300 has a filter 2500, an amplifier 2000, a mixer 2700 and a local oscillator 2200. The signal received by the receiving antenna 2100, which is a signal component 3000 transmitted by the radio-frequency radio transmitter 1900, is composed of a signal of a local oscillation signal component (frequency fLO1+fLO2) and a signal of a radio modulated signal component (frequency fRF1+fLO2). The filter 2500 passes a necessary signal out of the signal frequency (fLO1+fLO2) and the signal (frequency fRF1+fLO2), and the signal passed the filter 2500 is amplified by the amplifier 2000. With a local oscillation signal LO2 (frequency fLO2) from the local oscillator 2200, first frequency conversion is performed in the frequency mixer 2700.

Thus, the signal of the local oscillation signal component (frequency fLO1+fLO2) and the signal of the radio modulated signal component (frequency fRF1+fLO2) are down-converted to an intermediate frequency multiple signal (i.e., a multi-wave signal composed of a second IF signal IF2 and a first local oscillation signal LO1).

Then, after being amplified by an amplifier 2600, the multi-wave signal (frequency fRF1+fLO1) is inputted into the second down-converter section 2350 and divided by a divider 2800, and through a filter 2950 passing only a radio-frequency signal RF1 (frequency fRF1), the radio-frequency signal RF1 (frequency fRF1) is inputted into a frequency mixer 2400. In the meanwhile, the first local oscillation signal LO1 goes through a filter 2930 which passes only the first local oscillation signal LO1 and is amplified by an amplifier 2650 before being inputted into the frequency mixer 2400. The frequency mixer 2400 multiplies the radio-frequency signal RF1 by the first local oscillation signal LO1 so that the radio-frequency signal RF1 is down-converted and demodulated to a first IF signal IF1.

The conventional radio-frequency radio receiver 2900 has following problems.

A multi-wave signal, which is the signal down-converted in the first down-converter section 2300, contains a second IF signal IF2 (radio-frequency signal RF1) and a first local oscillation signal LO1.

In the first up-conversion step on the side of the transmitter 1900, the radio-frequency signal RF1 uses, for example, upper sidebands (frequency fLO1 of first local oscillation signal LO1+frequency fIF1 of first IF signal IF1). Therefore, the radio-frequency signal RF1 as a component of the multi-wave signal outputted after the first down-conversion on the side of the receiver 2900 contains a component of (frequency fIF1+frequency fLO1).

However, an output signal from the first down-converter section 2300 as a receiving side contains a signal of (frequency fLO1−frequency fIF1). This is mainly caused by the following reasons.

That is, the bandpass filter 1500 on the side of the transmitter 1900 is imperfect, and so at the time of first frequency up-conversion on the side of the transmitter 1900, the radio-frequency signal RF1 contains not only a component of (frequency fLO1+frequency fIF1) but also a component of (frequency fLO1−frequency IF1). At the time of the second up-conversion in the transmitter 1900, a frequency component (fLO1−fIF1) is up-converted and strengthened by the transmission amplifier 1000. Consequently, on the transmitter 1900 side, the undesired wave of the frequency [(fLO1−fIF1)+fLO2] is generated although its signal level is sufficiently low.

On the receiver 2900 side, in the first down-converter section 2300, the first down-conversion is performed with the second LO signal LO2 outputted by the local oscillator 2200, as a result of which a component of (frequency fLO1±frequency IF1) is generated as a component of the radio-frequency signal RF1. In addition, in the case where a radio transmission distance is relatively short, the peak level of the frequency component (fLO1+fLO2) that is a local oscillation signal component is larger by about 20 dB than the radio modulated signal component (fRF1+fLO2), and particularly, the nonlinearity in the intermediate frequency amplifier 2600 in an intermediate frequency stage is strong, by which the frequency component (fLO1−fIF1) that is an undesired wave is strengthened.

Thus, once an undesired wave component is amplified in the intermediate frequency amplifier 2600 in the first down-converter section 2300 on the receiver 2900 side and the undesired wave component is strengthened by non-linear action, complete filtration becomes difficult even though desired signal waves are separated in the filter 2950 and the filter 2930 in the subsequent stages.

For example, an undesired wave component that is the frequency component (fLO1−fIF1) remains though its level is smaller than that of (fLO1+fIF1) side of the desired wave, becomes larger than noise floor of the receiver 2900, and turns out to be a signal having phase distortion and noise added thereto. Consequently, during frequency down-conversion in the second down-converter section 2350 in the next stage, the frequency component (fLO1−fIF1) that is a desired wave functions as a noise component.

During the second down-conversion, the frequency component (fLO1+fIF1) that is a desired wave is converted to the frequency band identical to the frequency component of the undesired wave. Consequently, compared to a CN (Carrier/Noise ratio) value as signal quality of an input signal on the transmitter 1900 side, a CN value of an output signal after the final down conversion on the receiver 2900 side is deteriorated.

In addition, a multi-wave signal amplified in the amplifier 2600 and inputted into the second down-converter section 2350 is divided in the divider 2800 and a radio-frequency signal RF1 (frequency fRF1) goes through the filter 2950 passing only the radio-frequency signal RF1 and is inputted into the frequency mixer 2400. At the same time, a first local oscillation signal LO1 goes through the filter 2930 passing only the signal of frequency fLO1 and is amplified by the amplifier 2650 before being inputted into the mixer 2400. In such configuration, when the frequency fRF1 and the frequency fLO1 are close, it is difficult to fulfill a filter which can pass only the component of the frequency fRF1.

In addition, since the filter 2950 for passing the frequency fRF1 allows desired signals to pass, the filter 2950 is a broad-band filter compared to the filter 2039 which passes only the frequency fLO1 and is therefore composed of a plurality of resonators and the like having wide frequency ranges. Because of this, in a loop L1 composed of the divider 2800, the filer 2930, the amplifier 2650, the mixer 2400 and the filter 2950, a resonator composed of the amplifier 2650 and the filter 2950 constitutes a positive feedback loop. Eventually, with the resonator formed by the filter 2950, the loop L1 operates as an oscillator to generate undesired oscillation waves, causing a problem that it is difficult for the present configuration to normally demodulate desired signals.

In addition, the broadband filter 2950 is large in size and so the loop L1 is also large so that the frequency range of the positive feedback loop covers a wider region toward both the high and low frequency sides, thereby increasing unnecessary noise floor and constituting an unstable loop.

In addition, in the case of such configuration as automatically regenerating the local oscillation signal LO1 during the second down-conversion, when a lot of out-of-band undesired components are present and undesired wave components spread to wide bands in the first frequency down-conversion, it becomes difficult to completely extract a non-modulated signal only with a narrow-band filter 2930. Consequently, the local oscillation signal inputted into the mixer 2400 contains undesired wave components, which hinders normal second frequency down-conversion, thereby causing a problem of considerable deterioration in characteristics.

SUMMARY OF THE INVENTION

An object of the present invention is to provide a radio receiver, a radio communication system and electronic equipment capable of suppressing undesired oscillation and noise increase and allowing high-performance, stable and highly efficient frequency conversion (down-conversion).

In order to achieve the above object, there is provided a radio receiver, comprising:

a first down-converter for down-converting a received radio signal to produce an intermediate frequency multiple signal; and a second down-converter for down-converting the intermediate frequency multiple signal to produce an input signal, wherein the second down-converter has:

a first path;

a second path;

a divider for dividing the intermediate frequency multiple signal into signals going to the first path and the second path; and a mixer section, the first path transmits the intermediate frequency multiple signal from the divider to the mixer section, the second path has a filter for extracting a reference signal from the intermediate frequency multiple signal and transmits the reference signal to the mixer section, and the mixer section multiplies the intermediate frequency multiple signal from the first path by the reference signal from the second path so as to perform frequency down-conversion of the intermediate frequency multiple signal.

According to the radio receiver of the present invention, an intermediate frequency multiple signal from the first down-converter is inputted into the second down-converter. In the second down-converter, the intermediate frequency multiple signal is divided into signals going to the first path and the second path by the divider. In the first path, the intermediate frequency multiple signal is transmitted as it is. In the second path, by the filer included in the second path, a reference signal is extracted from the intermediate frequency multiple signal and is transmitted to the mixer section. The mixer section multiplies the reference signal from the second path and the intermediate frequency multiple signal from the first path together to perform frequency down-conversion of the intermediate frequency multiple signal.

Thus, according to the present invention, a filter is not necessary in the first path included in the second down-converter, but a filter for extracting a reference signal is provided in the second path, so that the intermediate frequency multiple signal and the reference signal are multiplied together in the mixer section. Therefore, by extracting the reference signal, the filter in the second path operates as a local oscillation signal source synchronized with the intermediate frequency multiple signal.

Therefore, according to the signal produced by down-converting the intermediate frequency multiple signal with the reference signal in the mixer section, signals identical in quality to the input signals inputted on a transmitter side can be reproduced.

Further, according to the present invention, it is not necessary to put a filter (generally composed of resonators) in the first path that is a path diverging from the divider, which makes it possible to eliminate resonators in a loop composed of the first path and the second path, thereby making it possible to prevent parasitic oscillation and increase of parasitic noise floor.

In one embodiment of the present invention, the first path does not have a filter.

In this embodiment, the first path does not have a filter, which allows reliable elimination of resonators in the loop composed of the first path and the second path, thereby making it possible to prevent parasitic oscillation and increase of parasitic noise floor.

In one embodiment of the present invention, the first path and the second path constitute a negative feedback loop which practically generates negative feedback.

In this embodiment, the first path and the second path constitute a negative feedback loop which practically generates negative feedback, which allows reliable elimination of resonators in the loop composed of the first path and the second path, thereby making it possible to prevent parasitic oscillation and increase of parasitic noise floor.

In one embodiment of the present invention, the first path has an attenuator.

In this embodiment, by the attenuator included in the first path, it becomes possible to adjust a power ratio S/T between signal power (s) in the intermediate frequency multiple signal in the first path and power (T) in the reference signal in the second path to be 1 or less. This makes the power of the reference signal larger than the power of the intermediate frequency multiple signal, which makes it possible to bring the operation of the mixer section close to linear operation during down-conversion by the second down-converter.

More specifically, the reference signal becomes a local oscillation signal of the mixer section, and therefore in order to bring the operation of the mixer section closer to the linear operation, it is necessary to drive the mixer section by the local oscillation signal sufficiently larger in signal level than the intermediate frequency multiple signal. Accordingly, the reference signal to be the local oscillation signal is extracted by the filter and is further amplified if the second path includes an amplifier. Therefore, the reference signal becomes a signal sufficiently larger than the intermediate frequency multiple signal.

Further, herein by inserting the attenuator to the first path, the level ratio of the local oscillation signal (reference signal) to the intermediate frequency multiple signal can be increased, thereby making it possible to bring the operation of the mixer section closer to the linear operation. In addition, since the attenuator is inserted to the loop composed of the first path and the second path, the loop can be brought close to the operation of a negative feedback loop, which makes it possible to reliably reduce parasitic oscillation and increase of parasitic noise floor, thereby allowing more stable operation.

In one embodiment of the present invention, the first path has an isolator.

In this embodiment, the first path has an isolator, which makes it possible to suppress feedback of signals by a loop formed from the first path and the second path. Therefore, the loop can come close to the loop characteristics of negative feedback, which makes it possible to suppress increase of noise floor and to suppress undesired wave components, thereby allowing obtention of stable output characteristics.

In one embodiment of the present invention, a path length of the first path is almost equal to a path length of the second path.

In this embodiment, the divider divides the intermediate frequency multiple signal into signals going to the first path and the second path, and the second path, in which the first path inputs the intermediate frequency multiple signal directly to the mixer section constituting the down-converter and the second path extracts a reference signal from the intermediate frequency multiple signal, and the second path inputs has a path length almost equal to that of the first path.

With this configuration, the component of the reference signal via the second path, which serves as a local oscillation source of the mixer section during second receiver-side frequency conversion (second down-conversion), is combined with the intermediate frequency multiple signal via the first path in identical phase. Consequently, the reference signal becomes a stable local oscillation signal having small level variation for the mixer section, which enables the mixer section to operate stably and to decrease a frequency conversion loss. As a result, a radio transmission distance can be increased and while at the same time, signals after frequency conversion can be maintained at high quality because parasitic noise components caused by phase shift of the reference signal are not generated. It is to be noted that that path length of the first path is almost equal to that of the second path means to include designing and dimensional tolerance within the range exerting the similar effect.

In one embodiment of the present invention, a sum of the path length of the first path and the path length of the second path is not more than one wavelength in a minimum frequency of a low-side signal of the intermediate frequency multiple signal.

In this embodiment, in the second down-converter that is the subsequent stage of the first down-converter (first receiver-side frequency conversion means), the divider functions as a starting point and an intermediate frequency multiple signal is divided into two signals in the same phase. The first path and the second path exist as two paths extending from the divider for dividing a signal into two signals to the mixer section. The sum of the path length of the first path and the second path is one wavelength or lower in a minimum frequency of a lower-side signal of the intermediate frequency multiple signal. Consequently, the total length of a loop formed from the first path and the second path becomes one wavelength or lower in the minimum frequency, by which the parasitic oscillation loop becomes less likely to generate undesired oscillation waves.

In one embodiment of the present invention, the mixer section has a combiner having port isolation and a base injection-type mixer.

In the radio receiver in this embodiment, the mixer section included in the second down-converter has a combiner having port isolation and a base injection-type mixer. Therefore, the intermediate frequency multiple signal from the first path and the reference signal from the second path are combined in identical phase by the combiner having port isolation and the combined signal is inputted into the base injection-type mixer. It is to be noted that the combiner may be a Wilkinson combiner that is an in-phase combiner.

Herein, with its amplification operation and frequency conversion operation, the base injection-type mixer is capable of minimizing frequency conversion loss even in the case of low input-level reference signals (local oscillation signals), enhancing receiver sensitivity, and increasing a radio transmission distance. It is to be noted that as one example, the Wilkinson combiner may be composed of a λ/4 transmission line and a resistance, or may be formed only from a lumped-constant line such as inductors and capacitors.

In one embodiment of the present invention, the base injection-type mixer has a short circuit for short-circuiting at least the intermediate frequency multiple signal or the reference signal.

According to this embodiment, the base injection-type mixer has a short circuit for short-circuiting at least either the intermediate frequency multiple signal or the reference signal. Therefore, on the output side of the mixer section, at least either the intermediate frequency multiple signal or the reference signal is short-circuited, which makes it possible to decrease frequency conversion loss in the mixer section and to enlarge the radio transmission distance.

More particularly, according to this embodiment, with the short circuit (trap circuit) provided on the output side of the mixer, the intermediate frequency multiple signal leaked to the output side of the mixer is reflected and fed back to the mixer side again, by which frequency mixing efficiency of the mixer can be enhanced. It is to be noted that as the frequency bandwidth of the intermediate frequency multiple signal is wide, it becomes possible to short-circuit the intermediate frequency multiple signal in broad bands by including, as the short circuit (trap circuit), two short circuits each for low-pass frequencies and high-pass frequencies as one example.

In one embodiment of the present invention, the mixer section is a cascode-type mixer section.

According to the radio receiver in this embodiment, the mixer section is a cascode-type mixer section, which makes it possible to decrease the conversion loss as a frequency mixer, improve (sufficiently increase) isolation characteristics between respective input ports in the mixer section and to remove parasitic oscillation by the parasitic loop L1 and the like.

In addition, according to the embodiment, the presence of the cascode-type mixer section makes it possible to allot different input ports and input circuits to respective two paths, the first path and the second path. Therefore, the mixer section can be driven with optimum input impedances for the respective first path and second path, which allows improvement of frequency conversion characteristics and distortion characteristics of the mixer.

In one embodiment of the present invention, the mixer section has a common emitter-type transistor and a common base-type transistor.

According to the radio receiver of this embodiment, the common emitter-type transistor and the common base-type transistor constitute the cascode-type mixer section. Therefore, (i) the base terminal of the common emitter-type transistor is used as an input port of the reference signal (local oscillation signal) while the base terminal of the common base-type transistor is used as an input port of the intermediate frequency multiple signal, and (ii) further, in a low-frequency region sufficiently away from the frequency of the intermediate frequency multiple signal inputted into the base terminal used as the input port of the common base-type transistor, the base terminal of the common base-type transistor is grounded, so that the mixer section can be operated also as a cascode-type amplifier. This allows further reduction in frequency conversion loss and makes it possible to contribute to increase in radio transmission distance.

In one embodiment of the present invention, in the mixer section, the reference signal is inputted into the common emitter-type transistor while the intermediate frequency multiple signal is inputted into the common base-type transistor.

According to the radio receiver in this embodiment, the second path is connected to the base terminal (first injection port) of the common emitter-type transistor in the cascode-type mixer section, while the first path is connected to the base terminal (second injection port) of the common base-type transistor. The reference signal is transmitted to the second path, whereas the intermediate frequency multiple signal is transmitted to the first path. Consequently, it becomes possible to take advantage of a sensitivity characteristic to the reference signal, which is necessary in a transmission/reception system including the radio receiver, in a wide region from a low input level to a high input level. Therefore, increase in frequency conversion loss due to the level variation of the reference signal can be dulled and the transmission distance can be increased, while distortion can be reduced even in a short transmission distance, thereby allowing obtention of good radio transmission quality.

In one embodiment of the present invention, the radio receiver further comprises:

a first filer which is a filter for filtering out undesired waves from the intermediate frequency multiple signal; and a second filer which is the filter for extracting the reference signal from the intermediate frequency multiple signal.

In the radio receiver in this embodiment, undesired wave signals included in an intermediate frequency multiple signal after down-conversion by the first down-converter can be filtered out by the first filter in the stage, for example, prior to the second down-conversion. Consequently, the desired intermediate frequency multiple signal which is the signal to be transmitted can be obtained, so that only the reference signal can be extracted from the intermediate frequency multiple signal by the second filter included in the second path. Therefore, only the reference signal can be faithfully amplified so that a reference signal component containing little noise component and undesired wave component can be reproduced.

In addition, since a broadband filter is not necessary in the first path, formation of broadband resonators in the loop composed of the first path and the second path can be avoided, which makes it possible to prevent the loop from becoming a positive feedback loop which oscillates in a certain frequency, thereby allowing obtention of a stable loop. As a result, second frequency down-conversion of good characteristics may be performed, which can decrease deterioration of the CN (Carrier/Noise ratio) by the second down-conversion.

In one embodiment of the present invention, the first path has a first amplifier for amplifying the intermediate frequency multiple signal, and the second path has a second amplifier for amplifying the reference signal extracted via the filter.

In the radio receiver in this embodiment, the first amplifier included in the first path is an amplifier for amplifying the intermediate frequency multiple signal and outputting the signal to the mixer section, and so the loop composed of the first path and the second path becomes a negative feedback loop and becomes a stable loop due to the isolation action of the first amplifier. As a result, the second down-converter can perform frequency down-conversion with good characteristics, which can decrease deterioration of the CN (Carrier/Noise ratio) by the down conversion performed by the second down-converter.

Also, there is provided a radio receiver, comprising:

a first down-converter for down-converting a received radio signal to produce an intermediate frequency multiple signal; and a second down-converter for down-converting the intermediate frequency multiple signal to produce an input signal, wherein the second down-converter has:

first to fifth paths;

an undesired wave removal filter for filtering out undesired waves from the intermediate frequency multiple signal; and a first divider for dividing the intermediate frequency multiple signal into signals going to the first path, the second path and the third path, the first path has a first path filter and a first mixer section, the second path has a reference signal extraction filter for extracting a reference signal from the intermediate frequency multiple signal and a second divider for dividing the reference signal into signals going to the fourth path and the fifth path, the third path has a third path filter and a second mixer section, the fourth path has a first amplifier and transmits the reference signal to the first mixer section, the fifth path has a second amplifier and transmits the reference signal to the second mixer section, the first mixer section multiplies the intermediate frequency multiple signal from the first path by the reference signal from the fourth path so as to perform frequency down-conversion of the intermediate frequency multiple signal, and the second mixer section multiplies the intermediate frequency multiple signal from the third path by the reference signal from the fifth path so as to perform frequency down-conversion of the intermediate frequency multiple signal.

According to the radio receiver of the present invention, undesired wave signals included in an intermediate frequency multiple signal after down-conversion by the first down-converter can be filtered out by the undesired wave removal filter in the stage, for example, prior to the second down-converter. Consequently, the desired intermediate frequency multiple signal which is the signal to be transmitted can be obtained, so that only the reference signal can be extracted from the intermediate frequency multiple signal by the reference signal extraction filter included in the second path.

The second divider included in the second path divides the reference signal into signals going to the fourth path and fifth path. In the fourth and fifth paths, only the reference signal is faithfully amplified in the first and second amplifiers so that the reference signal containing little noise component and undesired wave component can be reproduced. Furthermore, the presence of the first and second amplifiers between the second divider and the first and second mixer sections, respectively, makes it possible to ensure the isolation characteristics between local oscillation ports of the first and second mixer sections that are frequency mixers.

Moreover, in the first and third paths, the intermediate frequency multiple signal is subjected to band segmentation by the first and third path filter and then inputted into the first and third mixer sections. Consequently, a plurality of second frequency down-conversion operations can be performed simultaneously in different and narrow bandwidths, which can decrease characteristic deterioration such as CN deterioration and harmonic distortion caused by the second down-conversion.

Moreover, in the second path, a reference signal extracted by one reference signal extraction filter is divided by the second divider into two identical reference signals, which are distributed to the first and second amplifiers and amplified there. More particularly, one reference signal extraction filter in the second path can function as two reference signal sources.

In one embodiment of the present invention, the first path filter is a high-pass filter, and the third path filter is a low-pass filter.

According to the radio receiver in this embodiment, the first and third path filers can be structured basically from resonators only, which allows downsizing.

In one embodiment of the present invention, the first path and the third path have an isolator or an attenuator.

According to the radio receiver in this embodiment, the attenuator and the isolator can bring a loop composed of the first and second paths and a loop composed of the first and third paths close to negative feedback loops. This makes it possible to perform the second frequency conversion by the reference signal more stably.

In one embodiment of the present invention, the mixer section has a feedback circuit for feeding a reference signal back to an input side.

According to the radio receiver in this embodiment, the feedback circuit traps the reference signal leaked to the output side of the mixer section and feeds it back to the mixer section. Consequently, the fed-back reference signal can be utilized as a local oscillation source of the mixer section. This makes it possible to enhance frequency conversion gain of the mixer section, to enlarge a linear operation region with respect to the input/output characteristics of the mixer section so as to widen the frequency bandwidth, and to increase the radio transmission distance.

In one embodiment of the present invention, the mixer section is a base injection-type or a gate injection-type mixer formed of a microwave transistor.

According to the radio receiver in this embodiment, signals are to be inputted from the base side or the gate side of the microwave transistor, so that the mixer section also has an amplification function. This enables the mixer section to perform stable frequency conversion with a high conversion gain and little undesired oscillation.

In one embodiment of the present invention, in the mixer section, a signal input port and a local oscillation signal input port are formed of power combiners having port isolation.

In the radio receiver in this embodiment, the port isolation between the signal input port and the local oscillation signal input port of the power combiners decreases a feedback amount of a loop L1 so as to stabilize the loop L1.

In one embodiment of the present invention, an electric equipment comprises the above radio receiver, wherein an input signal produced through frequency down-conversion by the radio receiver is at least either recorded or outputted.

According to the electronic equipment in this embodiment, in order to cope with broadband radio transmission in microwave to millimeter wave regions, an AFC (Automatic Frequency Control) section, which adjusts frequency mismatch due to digital signal processing such as compression and expansion and due to frequency variation of local oscillators in transmission/reception devices or in radio communication systems, is not necessary in the radio communication systems or the radio receivers themselves. Therefore, downsizing and cost reduction are achieved.

In one embodiment of the present invention, a radio communication system comprises:

the radio receiver as defined in claim 1 or the electronic equipment as defined in claim 1; and a radio transmitter for up-converting an input signal with use of a reference signal to produce an intermediate frequency signal, adding the reference signal to the intermediate frequency signal to produce an intermediate frequency multiple signal, further up-converting the intermediate frequency multiple signal to produce a microwave-band signal, and wirelessly transmitting the microwave-band signal.

According to the radio communication system in this embodiment, a received signal of radio frequency is once down-converted to an intermediate frequency signal by the radio receiver side to produce an intermediate frequency multiple signal. In this stage, a reference signal is extracted from the received signal and is amplified to produce a local oscillation signal, and with use of the local oscillation signal, the intermediate frequency multiple signal is down-converted. This configuration is the basic configuration of this embodiment.

Consequently, when an intermediate frequency multiple signal is produced on the radio transmitter side, it is not necessary to produce the intermediate frequency multiple signal by strictly controlling the ratio of signal level of a reference signal to that of an intermediate frequency signal, and it also becomes possible to decrease the level of the reference signal on the radio transmitter side to produce a radio multiple signal. Therefore, the level of a radio signal representing information to be transmitted can be increased and transmission efficiency can be enhanced. This allows increase in radio transmission distance. In addition, strict power control on the reference signal on the radio transmitter side is not necessary, which makes it possible to reduce manufacturing costs of the radio communication system.

Also, there is provided a radio receiver, comprising:

a first down-converter for down-converting a received radio signal to produce an intermediate frequency multiple signal; and a second down-converter for down-converting the intermediate frequency multiple signal to produce an input signal, wherein the second down-converter:

extracts a reference signal from the intermediate frequency multiple signal; and multiplies the intermediate frequency multiple signal containing the reference signal by the reference signal to down-covert the intermediate frequency multiple signal.

According to the radio receiver of the present invention, an intermediate frequency multiple signal from the first down-converter is inputted into the second down-converter. In the second down-converter, the intermediate frequency multiple signal is divided by a divider into signals going to a first path and a second path. In the first path, the intermediate frequency multiple signal is transmitted as it is. In the second path, a reference signal is extracted from the intermediate frequency multiple signal by a filter included in the second path, and the reference signal is transmitted to a mixer section. The mixer section multiplies the reference signal from the second path by the intermediate frequency multiple signal from the first path to perform frequency down-conversion of the intermediate frequency multiple signal.

Thus, according to the radio receiver of the present invention, a filter is not necessary in the first path included in the second down-converter, but a filter for extracting a reference signal is provided in the second path, so that the intermediate frequency multiple signal and the reference signal are multiplied together in the mixer section. Therefore, by extracting the reference signal, the filter in the second path operates as a local oscillation signal source synchronized with the intermediate frequency multiple signal.

Therefore, according to the signal produced by down-converting the intermediate frequency multiple signal with the reference signal in the mixer section, signals identical in quality to the input signals inputted on a transmitter side can be reproduced.

Further, according to the radio receiver of the present invention, a filter (generally composed of resonators) is not necessary in the first path that is a path diverging from the divider, which makes it possible to eliminate resonators in a loop composed of the first path and the second path, thereby making it possible to prevent parasitic oscillation and increase of parasitic noise floor.

Therefore, according to the radio receiver of the present invention, it becomes possible to achieve a microwave-band radio receiver and a radio communication system capable of enhancing frequency conversion efficiency on the reception side, increasing a radio transmission distance, and enlarging a radio transmission bandwidth while exerting a defense capability against undesired waves so as to cope with communication of a plurality of modulated wave signals.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a block diagram showing the microwave-band radio communication system of a first embodiment;

FIG. 11A is a view showing a frequency allocation of an input modulated signal 5e produced in a first operation step of a millimeter-waveband radio transmitter 9 of the fourth embodiment;

FIG. 11B is a view showing a frequency allocation of a first IF multiple signal 71d produced in a following operation step of the millimeter-waveband radio transmitter 9;

FIG. 11C is a view showing a frequency allocation of a radio multiple signal 72 produced in a further following step of the millimeter-waveband radio transmitter 9;

FIG. 18C is a view showing a frequency allocation of the second IF multiple signal 74 separated by separation by respective filters 173, 174 in;

FIG. 21 is a block diagram showing a conventional microwave-band radio communication system.

DETAILED DESCRIPTION OF THE INVENTION

Hereinbelow, the invention will be described in conjunction with the embodiments with reference to the drawings.

First Embodiment

Figure 1:
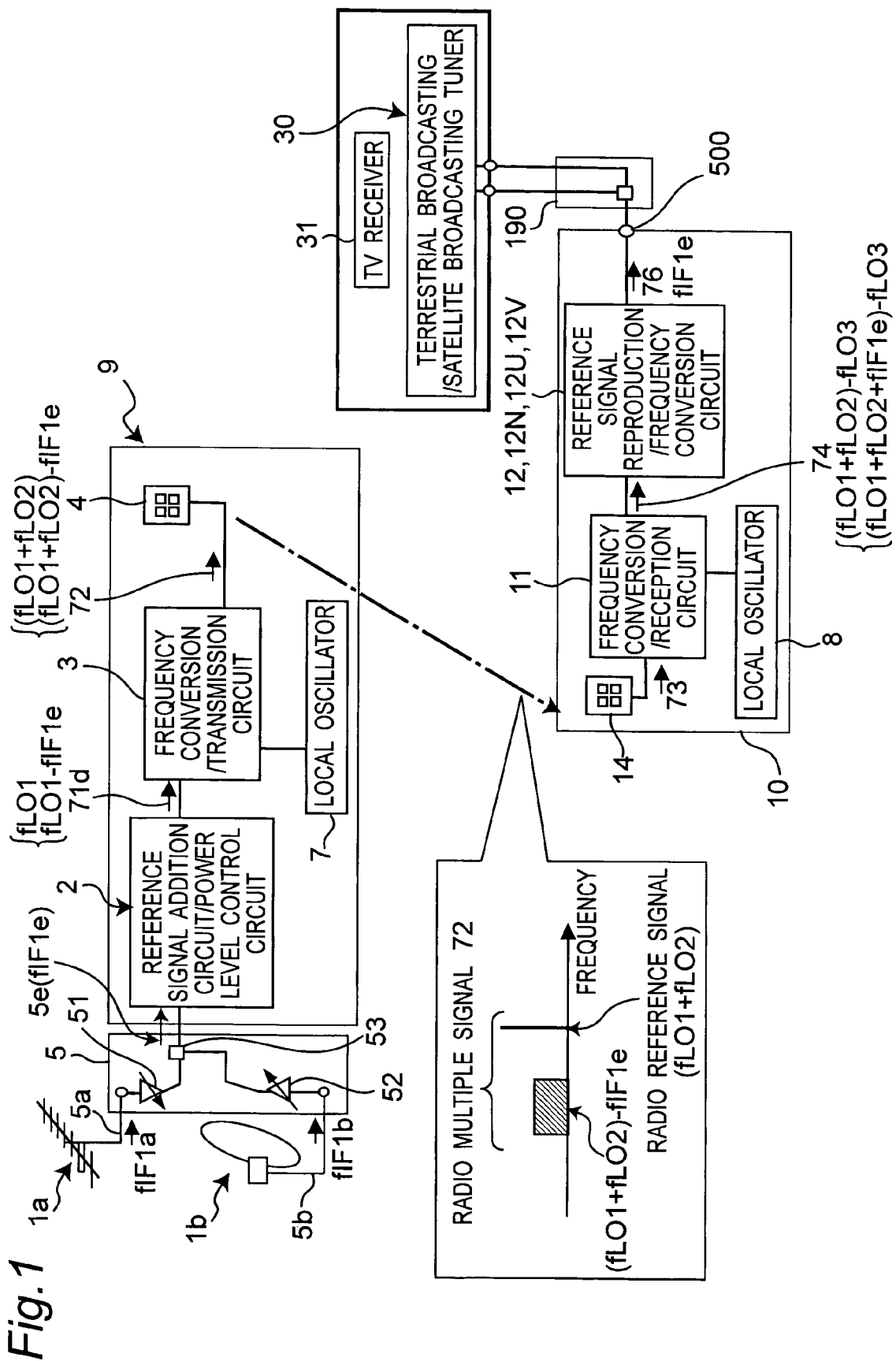
FIG. 1 is a schematic block diagram showing a microwave-band radio communication system of the present invention.

FIG. 1 shows a schematic configuration of a microwave-band radio communication system of a first embodiment according to the present invention. The microwave-band radio communication system has a millimeter-waveband radio transmitter 9 and a millimeter-waveband radio receiver 10. It is to be noted that microwave-bands herein refer to frequency bandwidths including microwave-bands and millimeter-wavebands. Moreover, the microwave-band radio communication system has a frequency arrangement unit 5 connected to an input port IP of the millimeter-waveband radio transmitter 9, and a separation filter 190 connected to an output port 500 of the millimeter-waveband radio receiver 10. The separation filter 190 is connected to a plurality of TV receivers 31. Moreover, the frequency arrangement unit 5 is connected to a terrestrial broadcasting antenna 1a and a satellite broadcasting antenna 1b.

Moreover, the microwave-band radio communication system includes electronic equipment of the present invention composed of the millimeter-waveband radio receiver 10, the separation filter 190 and a terrestrial broadcasting/satellite broadcasting tuner 30.

As shown in FIG. 1, the transmitting-side millimeter-waveband radio transmitter 9 included in the microwave-band radio communication system of the first embodiment is composed of the frequency arrangement unit 5, a reference signal addition/power level control circuit 2 connected to the frequency arrangement unit 5, a frequency conversion/transmission circuit 3, a local oscillator 7, and a transmission antenna 4.

Figure 6A:
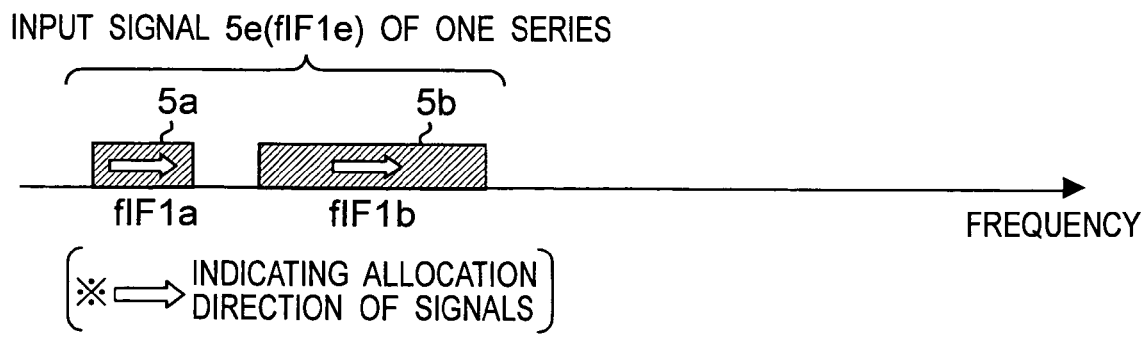
FIG. 6A is a view showing a frequency allocation of input signal 5e to a transmitter 9 in the first to third embodiments of the present invention.

First, with reference to FIG. 1, description will be given of the schematic configuration and the schematic operation of the transmitting-side frequency arrangement unit 5 and millimeter-waveband radio transmitter 9. On this transmitting side, first, for the first step, in the frequency arrangement unit 5 as shown in FIG. 6A, for example, a modulated wave input signal 5a from the terrestrial broadcasting antenna 1a and a modulated wave input signal 5b from the satellite broadcasting antenna 1b are respectively adjusted by amplifiers 51 and 52 so that the power levels of the respective modulated wave input signals 5a, 5b become equal, and their frequency allocation are arranged in a mixer 53 to produce an input signal 5e (frequency fIF1e) of one series.

Figure 6B:
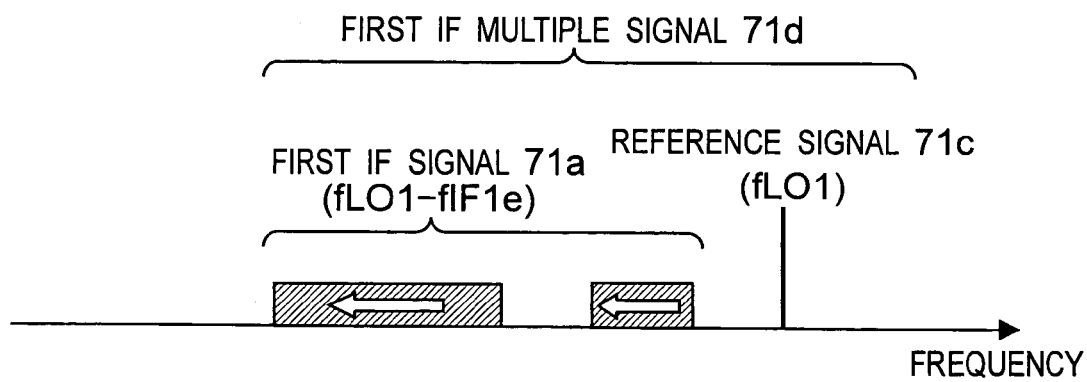
FIG. 6B is a view showing a frequency allocation of a first IF multiple signal 71d in the transmitter 9 in the first to third embodiment.

In the next step, in the millimeter-waveband radio transmitter 9, the input signal 5e is inputted into the reference signal addition/power level control circuit 2, and as shown in FIG. 6B, the modulated wave input signal 5e (frequency fIF1e) of one series allocated on a frequency scale is subjected to first frequency conversion. In the reference signal addition/power level control circuit 2, a first IF signal 71a produced by the first frequency conversion is subjected to level control, and at the same time, a proper-level reference signal 71c is added to the first IF signal 71a, by which a first IF multiple signal 71d that is an intermediate frequency multiple signal (frequency allocated signal) is produced.

In the next step, the first IF multiple signal 71d outputted from the reference signal addition/power level control circuit 2 is inputted into the frequency conversion/transmission circuit 3. Then, in the frequency conversion/transmission circuit 3, the first IF multiple signal 71d is subjected to frequency conversion with a local oscillation signal outputted from the local oscillator 7 to be converted to the millimeter-waveband and then amplified.

Figure 6C:
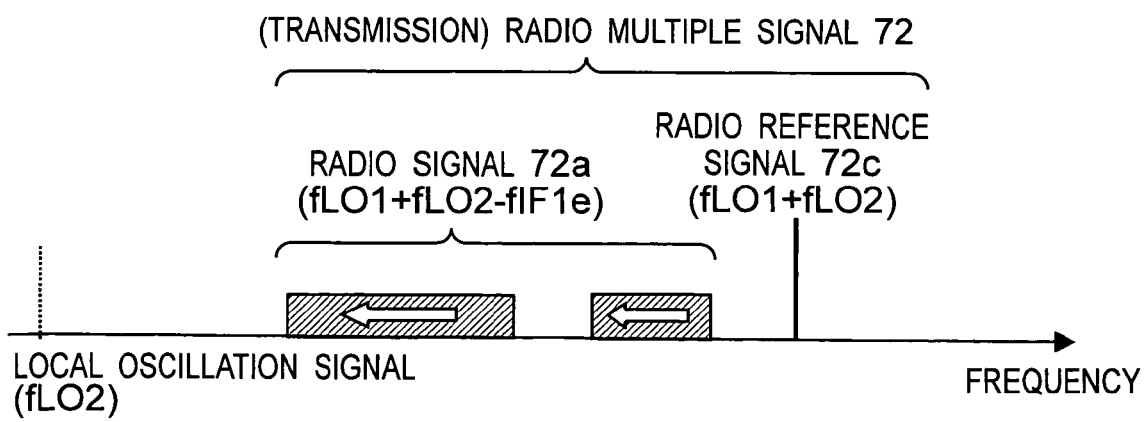
FIG. 6C is a view showing a frequency allocation of a radio multiple signal 72 in the transmitter 9 in the first to third embodiments.

As shown in FIG. 6C, a radio multiple signal 72 produced by the frequency conversion and the amplification is transmitted as a radio signal via the transmission antenna 4. It is to be noted that in FIG. 6A through FIG. 6C, hollow arrow symbols indicate the allocation direction of the signals.

Next, with reference to FIG. 1, description will be given of the schematic configuration and the schematic operation of the millimeter-waveband radio receiver 10. The millimeter-waveband radio receiver 10 is composed of a reception antenna 14 for receiving radio multiple signals from the transmitting side, a frequency conversion/reception circuit 11 for performing first frequency down-conversion upon reception of radio multiple signals 73 from the reception antenna 14, a local oscillator 8 for feeding local oscillation signals, and a reference signal reproduction/frequency conversion circuit 12 for performing second frequency down-conversion on the receiving side. The frequency conversion/reception circuit 11 serves as the first down-converter, while the reference signal reproduction/frequency conversion circuit 12 serves as the second down-converter.

Figure 7A:
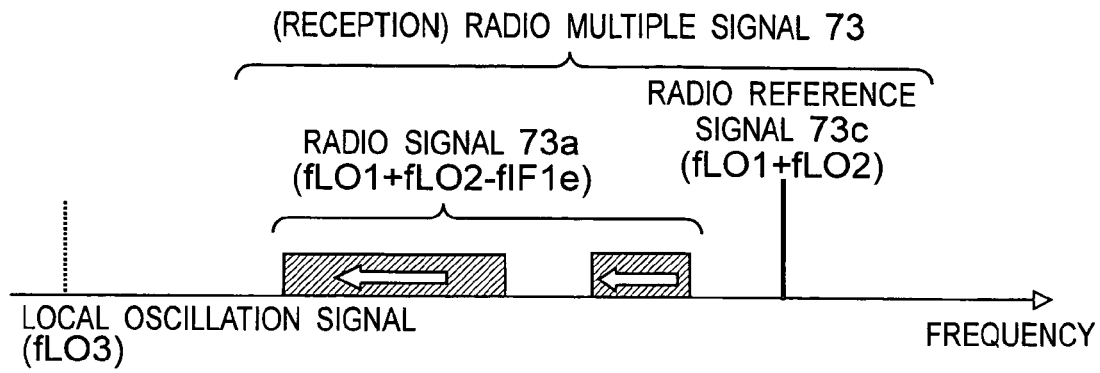
FIG. 7A is a view showing a frequency allocation of a radio multiple signal 73 in a receiver 10 in the first to third embodiment of the present invention.
Figure 7B:
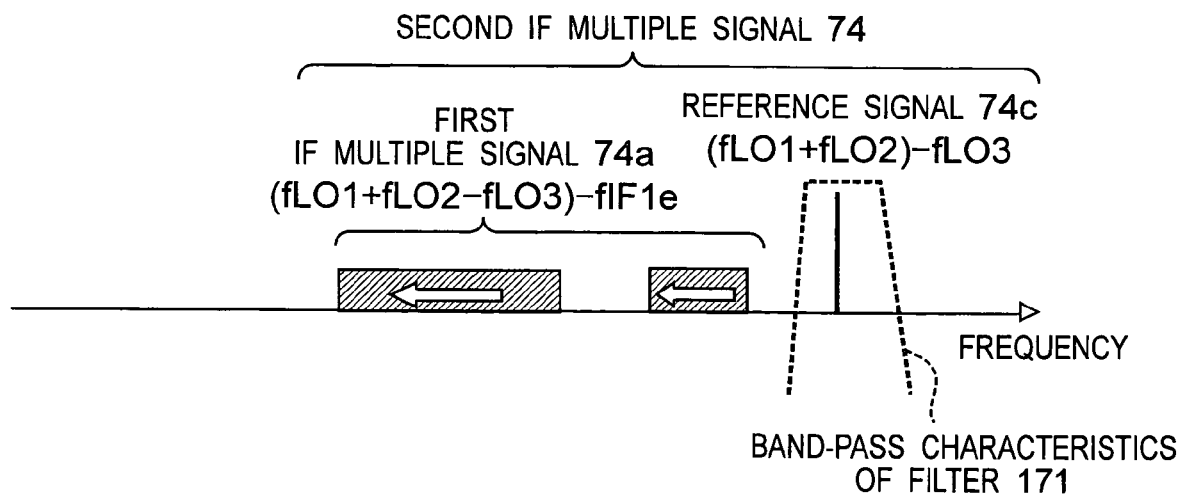
FIG. 7B is a view showing a frequency allocation of a frequency multiple signal 74 of a second IF multiple signal 74 in the receiver 10.

The millimeter-waveband radio receiver 10, first, in the first step of its operation steps, receives a radio multiple signal 72 from the transmitting side via the reception antenna 14 as shown in FIG. 7A, and a radio multiple signal 73 from the reception antenna 14 is received by the frequency conversion/reception circuit 11, where first frequency down-conversion is performed. More particularly, in the frequency conversion/reception circuit 11, the radio multiple signal 73 is converted to a second intermediate frequency-band signal with the local oscillation signal fed from the local oscillator 8 to produce a second IF multiple signal 74 that is an intermediate frequency multiple signal as shown in FIG. 7B. It is to be noted that in FIG. 7A through FIG. 7C, hollow arrow symbols indicate the allocation direction of signals.

Figure 7C:
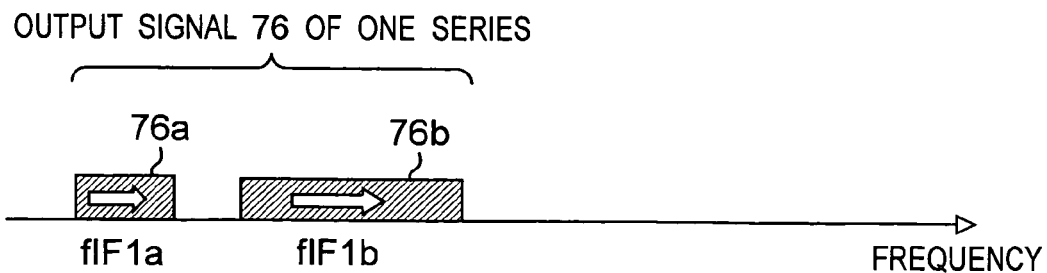
FIG. 7C is a view showing frequency allocation of an output signal 76 in the receiver.

In the next step, the second IF multiple signal 74 is subjected to second receiving-side frequency down-conversion by the reference signal reproduction/frequency conversion circuit 12, and then the output signal 76 (frequency fIF1e) of one series corresponding to the original input signal 5e (frequency fIF1e) of one series is reproduced by the reference signal reproduction/frequency conversion circuit 12 as shown in FIG. 7C.

More particularly, the reference signal reproduction/frequency conversion circuit 12 extracts a reference signal 74c from the second IF multiple signal 74 shown in FIG. 7B with use of a later-described filter, amplifies the reference signal 74c, and with use of the reference signal 74c, performs frequency conversion of the second IF multiple signal 74 that is an intermediate frequency multiple signal. By this, the reference signal reproduction/frequency conversion circuit 12 reproduces the input signal 5e (frequency fIF1e) of one series inputted on the transmitting side as an output signal 76 (frequency fIf1e) of one series as shown in FIG. 7C.

Next, in the last step on the receiving side, the output signal 76 outputted from the output port 500 of the millimeter-waveband radio receiver 10 is inputted into a frequency inverse arrangement/separation section 190. In the frequency inverse arrangement/separation section 190, from the serial output signal 76 (frequency fIf1e) of one series corresponding to the input signal 5e reproduced on the receiving side, a signal 76a corresponding to the signal 5a for terrestrial broadcasting and a signal 76b corresponding to the signal 5b for satellite broadcasting are reproduced. These separated signals 76a, 76b are respectively inputted into a plurality of terrestrial broadcasting/satellite broadcasting tuners 30 in a plurality of the TV receivers 31.

Next, the microwave-band radio communication system in the first embodiment will be described in detail with reference to FIG. 2.

As shown in FIG. 2, the millimeter-waveband radio transmitter 9 as one example of the microwave-band radio transmitter is composed of a first frequency conversion circuit 2a exemplifying an intermediate frequency conversion section connected to a frequency arrangement section 5, a reference signal source 2c, a reference signal addition circuit 2d exemplifying a multiple signal production means, and a millimeter-wave frequency conversion circuit 3a exemplifying a transmitting-side frequency conversion section.

The first frequency conversion circuit 2a, the reference signal source 2c and the reference signal addition circuit 2d constitute the reference signal addition/power level control circuit 2. Moreover, the millimeter-wave frequency conversion circuit 3a constitutes the frequency conversion/transmission circuit 3 and the local oscillator 7.

The reference signal addition/power level control circuit 2 has the first frequency conversion circuit 2a connected to an input port IP, the reference signal addition circuit 2d connected to the first frequency conversion circuit 2a, and the reference signal source 2c connected to the reference signal addition circuit 2d.

The first frequency conversion circuit 2a has an amplifier 203a whose input side is connected to the input port IP, and a frequency mixer 201 whose input port is connected to the output side of the amplifier 203a. The other input port of the frequency mixer 201 is connected to a power divider 204b included in the reference signal addition circuit 2d. The power divider 204b is connected to the reference signal source 2c.

Moreover, the reference signal addition circuit 2d has a level controller 95 whose input side is connected to the power divider 204b, and a power combiner 204a whose input port is connected to the output side of the level controller 95. The other input port of the power conbiner 204a is connected to the output side of an amplifier 203b included in the first frequency conversion circuit 2a. The first frequency conversion circuit 2a has a filter 202a connected to between an output port of the frequency mixer 201 and the input side of the amplifier 203b. It is to be noted that the amplifiers 203a, 203b include a level controller.

Moreover, the millimeter-wave frequency conversion circuit 3a has a frequency mixer 301 whose input port is connected to the output side of the power combiner 204a in the reference signal addition circuit 2d, a local oscillator 7 connected to another input port of the frequency mixer 301, a bandpass filter 302 whose input side is connected to an output port of the frequency mixer 301, and a millimeter-wave amplifier 303 connected to the output side of the bandpass filter 302.

The output side of the millimeter-wave amplifier 303 in the millimeter-wave frequency conversion circuit 3a is connected to the transmission antenna 4.

Description will be given of the operation of the millimeter-waveband radio transmitter 9.

In the frequency arrangement section 5, the power levels of the modulated wave input signal 5a from the terrestrial broadcasting antenna 1a and the modulated wave input signal 5b from the satellite broadcasting antenna 1b are respectively adjusted by the amplifier 51 and the amplifier 52. By this, the power levels of the respective modulated wave input signals 5a, 5b are adjusted to be equal, and the respective modulated wave input signals 5a, 5b are further subjected to power combination and frequency arrangement. As a result, an input signal 5e (frequency fIf1e) of one series shown in FIG. 6A is produced. Herein, in the case where the modulated input signal 5a and the modulated input signal 5b share the same frequency band, direct power combination of these signals cannot be conducted, and so the frequency of either one of the input modulated signals is converted before execution of the power combination of these signals. Thus, the input signal 5e (frequency fIf1e) of one series is produced. Although the power levels of the respective modulated input signals 5a, 5b have been modulated to be equal in this case, power combination may be executed in the state that the modulated input signals 5a, 5b have different power levels depending on the quality of the respective modulated input signals 5a, 5b.

Next, the input signal 5e (frequency fIf1e) of one series allocated on the frequency scale is amplified to an appropriate level by the amplifiers 203a and is then inputted into the frequency mixer 201 for first frequency conversion. Only the single-side band of a first IF signal 71a resulting from the first frequency conversion is filtered and is adjusted by the amplifier 203b to an appropriate level. It is to be noted that this adjustment may be achieved by appropriately combining the amplifier 203b with an attenuator.

The level-adjusted first IF signal 71a is inputted into the power combiner 204a. The power combiner 204a receives inputs of a reference signal 71c inputted from the reference signal source 2c into the power divider 204b in the reference signal addition circuit 2d and adjusted to an appropriate level by the level controller 95.

Then, in the power combiner 204a, the reference signal 71c is added to the first IF signal 71a to produce a first IF multiple signal 71d as an intermediate frequency multiple signal (frequency allocated signal) as shown in FIG. 6B.

As described above, the reference signal 71c having a frequency fLO1 outputted from the reference signal source 2c is divided into two signals via the power divider 204b, and one reference signal 71c is inputted into the frequency mixer 201 as a local oscillation signal. The other reference signal 71c resulting from power division is inputted into the level controller 95, and after being subjected to later-described appropriate level control, the other reference signal 71c is inputted into the power combiner 204a as a reference signal 71c. Then, in the power combiner 204a, the reference signal 71c and the first IF signal 71a are power-combined as described above to produce the first IF multiple signal 71d.

Herein, the first IF signal 71a is to be filtered by the filter 202a connected to between the frequency mixer 201 and the amplifier 203b in the first frequency conversion circuit 2a, and then is amplified and level-controlled by an amplifier 203 (or a combination of the amplifier 203b and an attenuator) before the reference signal 71c is added thereto.

Thus, the first IF signal 71a is level-controlled by the level control means formed from the amplifier 203b and the like, and then is provided with the reference signal 71c. Therefore, the amplifier 203b can efficiently and linearly amplify only the first IF signal 71a of low level without being causing distortion by the reference signal 71c whose level is larger than the signal 71a.

Further, the power level of the first IF signal 71a contained in the first IF multiple signal 71d and the power level of the reference signal 71c are independently controlled respectively by the amplifier 203b (or in combination with an attenuator) and by the level controller 95. Since the power levels of the first IF signal 71a and the reference signal 71c are independently controlled so that a power distribution ratio between these signals can be controlled, it becomes possible to drive the transmitting-side frequency conversion/transmission circuit 3 more linearly at full power.

Moreover, in the case where the second IF multiple signal 74 itself is subjected to frequency down-conversion with the reference signal 74c contained in the second IF multiple signal 74 during the second frequency conversion on the millimeter-waveband radio receiver 10 the side, there is an optimum power distribution ratio between a desired signal and a reference signal.

Therefore, it is desirable that in the stage of producing the first IF multiple signal 71d in the transmitting-side millimeter-wave radio transmitter 9, an appropriate ratio of (power of the first IF signal 71a)/(power of reference signal 71c) is preset so as to have an optimum power distribution ratio of high receiver sensitivity. This makes it possible to enhance frequency conversion efficiency (receiver sensitivity) and to increase radio transmission distance.

It is to be noted that the attenuators in the level control sections used in the level controller 95 and the amplifiers 203a, 203b in the first embodiment may be, for example, T-type attenuators and π-type attenuators that are resistances of chip components. Moreover, the power combiners 204a, 204b included in the reference signal addition circuit 2d should preferably be Wilkinson combiners whose output ports have isolation characteristics from each other. This makes it possible to suppress signals leaking into the output ports of the respective power combiners 204a, 204b, so that each function circuit can operate normally. More specifically, the power combiners 204a, 204b composed of the Wilkinson combiners and the amplifiers 203a, 203b can prevent the first IF signal 71a from leaking into the reference signal addition circuit 2d side. Further, it also becomes possible to prevent the added reference signal 71c from flowing back to the frequency mixer 201 from the power combiner 204a.

Herein in this frequency conversion, it is desirable to use lower sideband signals. By using the lower sideband signals, the frequency characteristics of the first IF signal 71a after frequency conversion are inverted. Due to this inversion of the frequency characteristics, the broadband first IF signal 71a can enhance its frequency characteristics (flatness) during frequency conversion/amplification operation in the amplifier 203 having the level control function as well as during subsequent up-conversion (transmitter side) to millimeter-wavebands and down-conversion (receiver side) from millimeter-wavebands. The reason thereof will be described below.

Normally, in high frequency bands not lower than ultra-high-frequency bands (UHF bands), in the process of frequency conversion and the process of amplification in the radio transmitter 9 and the radio receiver 10, loss in level of a signal of one series becomes smaller in the low frequency side than the high frequency side (in the case of amplification, gain becomes larger). Therefore, the level of the signal of one series, depicted in a signal strength level (vertical axis) versus frequency (horizontal axis) graph, presents rightwards down characteristics, dissimilar to ideal flat frequency characteristics. The input signal 5e (frequency fIf1e) inputted into the radio transmitter 9, is itself a broadband signal of a multi-channel image signal of one series, and therefore the level difference of signal 5e between the high and the low frequency sides makes its modulated signal have lower level on higher frequency side.

Therefore, by using the lower sidebands during the first frequency conversion at the transmitting-side first frequency conversion circuit 2a (more specifically, by selecting the lower sidebands in the filter 202a), the frequency characteristics after conversion is reversed regarding high and low frequencies, so that the frequency characteristics is improved to present flat characteristics. More particularly, in the signal processing step after the filter 202a in the first frequency conversion circuit 2a, the characteristic that loss is large in the high frequency side (gain is small) while loss is small in the low frequency side (gain is large) is added to the reversed frequency characteristics regarding (high and low) frequencies. By this, the frequency characteristics of the input signal Se during input operation are compensated, so that more flat frequency characteristics of the first IF multiple signal 71d and the radio multiple signal 72 are obtained.

More particularly, the frequency allocations of the signals are changed as follows, in the generating process of the first IF multiple signal 71d shown in FIG. 6B from the input signal Se of one series shown in FIG. 6A.

| (signal) | (frequency) |
| --- | --- |
| first IF reference signal 71c | fLO1 |
| First IF signal 71a | fLO1 − fIF1e |

To the inverted first IF signal 71a, a local oscillation signal derived from the reference signal source 2c used in the first frequency conversion and divided via the power divider 204b is added as a reference signal 71c. By this, the frequency characteristics in the subsequent signal processing (amplification, frequency conversion) can be improved. More particularly, in the subsequent process of frequency conversion/amplification, the characteristic that loss is large in the high frequency side of signals (gain is small) while loss is small in low frequency side (gain is large) is added to the first IF multiple signal 71d whose frequency allocation is inverted in the low frequency side and in the high frequency sides with respect to that of the input signal 5e. As a result, the frequency characteristics of the signal become more flat. The signal whose allocation is inverted with respect to that of the input signal 5e in the radio transmitter 9 is subjected to later-described second frequency down-conversion with use of a reference signal 74c on the radio receiver 10 side, by which the signal automatically becomes a signal 76 of one series (frequency fIf1e) having a recovered original frequency allocation identical to the input signal 5e (frequency fIf1e).

The first IF multiple signal 71d shown in FIG. 6B is next inputted into the millimeter-wave frequency conversion circuit 3a shown in FIG. 2. The millimeter-wave frequency conversion circuit 3a is connected to the frequency mixer 301, the bandpass filter 302, and the millimeter-wave amplifier 303 sequentially in the order from the input side to the output side. Moreover, the frequency mixer 301 is connected to the local oscillator 7.

In the millimeter-wave frequency conversion circuit 3a, the first IF multiple signal 71d is subjected to frequency up-conversion to the millimeter-waveband by the local oscillator 7 and the frequency mixer 301, and then a desired multiple signal is filtered via the bandpass filter 302. In the frequency conversion to the millimeter-waveband, upper sideband signals are used for the purpose of aforementioned frequency characteristics improvement. Then, after being amplified in the millimeter-wave amplifier 303, the multiple signal is radiated to the space as a millimeter-waveband radio multiple signal 72 via the transmission antenna 4. Herein, the transmission antenna 4 and the millimeter-wave amplifier 303 constitute a transmission means.

It is to be noted that in one desirable example, an Nth (N: natural number not less than 2) harmonic mixer such as even-harmonic mixers may be used as the frequency mixer 301. Using the Nth harmonic mixer allows the local oscillation frequency of the local oscillator 7 to be reduced to 1/N. More specifically, in this example, employing a second harmonic mixer allows the local oscillation frequency of the local oscillator 7 to be reduced to ½. For example, in the case of the millimeter-wave radio transmitter 9 and the millimeter-waveband radio receiver 10 handling transmission and reception radio multiple signals 72 and 73 of 60 GHz band, the frequency fLO2 of local oscillation signals outputted from the local oscillator 7 may be in 25 GHz to 30 GHz bands. Therefore, direct oscillation of the local oscillator 7 in 60 GHz band is not necessary, which allows easy manufacturing of the millimeter-waveband radio transmitters having high frequency stability through easy mounting process such as wire-bonding.

It is to be noted that in the generating process of the transmission radio multiple signal 72 shown in FIG. 6C from the first IF multiple signal 71d shown in FIG. 6B, the frequency allocations of the signals are changed as follows.

| (signal) | (frequency) |
|---|---|
| radio reference signal 72c | fLO1 + fLO2 |
| radio signal 72a | fLO1 + fLO2 − fIF1e |

Description is now given of the receiving side. As shown in FIG. 2, the millimeter-waveband radio receiver 10 as one example of the microwave-band radio receiver is composed of the reception antenna 14, the frequency conversion/reception circuit 11 as the first down-converter, the local oscillator 8, and the reference signal reproduction/frequency conversion circuit 12 as the second down-converter.

The frequency conversion/reception circuit 11 has a low noise amplifier 110, a millimeter-wave bandpass filter 111, and a frequency mixer 112 connected sequentially in the order from the input side to the output side. The local oscillator 8 is connected to the frequency mixer 112.

Moreover, the reference signal reproduction/frequency conversion circuit 12 has an intermediate frequency amplifier 159, a signal division circuit 161, a transmission line 162, a frequency mixer section 12a, and an amplifier 195 connected sequentially in the order from the input side to the output side. The transmission line 162 constitutes the first path P1. Moreover, a transmission line 163 constituting the second path P2, a bandpass filter 171, an amplifier 180 and the transmission line 163 are connected in sequence in between the signal division circuit 161 and the frequency mixer section 12a.

Moreover, the frequency mixer section 12a includes a mixer MX and a capacitor 196. The input side of the amplifier 195 is connected to the output side of the frequency mixer section 12a, while the output side of the amplifier 195 is connected to the output port 500.

The output port 500 of the millimeter-waveband radio receiver 10 is connected to the separation filter 190, which is connected to the terrestrial broadcasting/satellite broadcasting tuner 30 included in the TV receiver 31.

In this millimeter-waveband radio receiver 10, a radio multiple signal 73 received by the reception antenna 14 is inputted into the frequency conversion/reception circuit 11. More particularly, the radio multiple signal 73 is once amplified by the low noise amplifier 110. Next, a desired signal filtered by the millimeter-wave bandpass filter 111 is subjected to frequency down-conversion to the second intermediate frequency band with use of a local oscillation signal (frequency fLO3) from the local oscillator 8 in the frequency mixer 112 so as to produce a second IF multiple signal 74 of intermediate frequency.

It is to be noted that the frequency down-conversion of the millimeter-waveband radio multiple signal 73 is the down-conversion in which an upper sideband signal is selected as a radio multiple signal 73 to be processed as shown in FIGS. 7A and 7B. Therefore, the local oscillation frequency fLO3 on the receiving-side shown in FIG. 7A is lower than the frequency of the transmitting-side radio multiple signal 72 shown in FIG. 6C. It is to be noted that as shown in FIG. 6C, the radio multiple signal 72 contains a radio reference signal 72c (frequency (fLO1+fLO2)) and a radio signal 72a (frequency (fLO1+fLO2−fIF1e)). In FIG. 7A through FIG. 7C, hollow arrow symbols indicate the allocation direction of the signals.

Further in one desirable working example, an Nth (N: natural number not less than 2) harmonic mixer such as even-harmonic mixers is employed as the frequency mixer 112. In this case, the local oscillation frequency of the local oscillator 8 can be reduced to 1/N. In one specific example, using a second harmonic mixer as the frequency mixer 112 allows the local oscillation frequency of the local oscillator 8 to be reduced to ½. Therefore the millimeter-waveband radio receiver 10 having high frequency stability may be manufactured easily through easy mounting process such as wire-bonding. This also applied to the above-stated transmitting-side frequency conversion/transmission circuit 3.

A reception radio multiple signal 73 shown in FIG. 7A is subjected to frequency down-conversion to the second intermediate frequency band to produce a second IF multiple signal 74 shown in FIG. 7B. Through this process, the second IF multiple signal 74 is converted to have the following frequency allocation.

| (signal) | (frequency) |
|---|---|
| second IF reference signal 74c | fLO1 + fLO2 − fLO3 |
| second IF signal 74a | (fLO1 + fLO2 − fLO3) − fIF1e |

The second IF multiple signal 74 outputted from the frequency conversion/reception circuit 11 is once amplified by the intermediate frequency amplifier 159 and is divided into two signals in the signal division circuit 161. The signal division circuit 161 is formed of a Wilkinson two-way divider having, for example, about 20 dB isolation characteristics between respective output ports. This signal division circuit 161 makes it possible to suppress unwanted mutual leakage of signals between two output ports and to normally operate each circuit. It is to be noted that it is acceptable to employ a branch amplifier having functions of both the intermediate frequency amplifier 159 and the signal division circuit 161. Although unshown, the branch amplifier is composed of one input section and two output sections, and output circuits of these two output sections take two outputs from transistors connected in parallel. Consequently, between the output ports of these two output sections, considerably large inter-port isolation can be ensured.

Next, the second IF multiple signal 74 is divided via the signal division circuit 161 into two signals going to the transmission line 162 constituting the first path P1 and to the transmission line 163 constituting the second path P2, and in the first path P1, the signal is directly inputted into the frequency mixer section 12a. In the second path P2, the bandpass filter 171 allows, among the second IF multiple signal 74, only a reference signal 74c having the frequency component of (fLO1+fLO2−fLO3) to band-pass. The reference signal 74c is amplified in the amplifier 180, and inputted into the frequency mixer section 12a as a local oscillation signal synchronized with the second IF multiple signal 74. More particularly, the reference signal 74c is inputted into the frequency mixer section 12a, and the frequency mixer section 12a performs frequency down-conversion of the second IF multiple signal 74 so as to reproduce the transmitting-side input signal 5e (frequency fIFe) as an output signal 76 (frequency fIFe). The reproduced output signal 76 (frequency fIFe) is amplified by the amplifier 195 if necessary, and is outputted from the output port 500. The output signal 76 is, in one example, separated or divided by a blanching filter (or divider) 190, and is inputted into the terrestrial broadcasting/satellite broadcasting tuner 30 in the TV receiver 31.

Description is now given of signal processing for reproducing a plurality of broadcasting waves from the second IF multiple signal 74. The second IF multiple signal 74 is subjected to frequency down-conversion with use of the reference signal 74c contained in the second IF multiple signal 74. The process of producing an output signal 76 as a demodulated signal (frequency fIFe) by the frequency down-conversion can be described as follows.

Namely, through the frequency down-conversion of the second IF multiple signal 74 shown in FIG. 7B with the reference signal 74c, the frequency of the first IF signal 74a ((fLO1+fLO2−fLO3)−fIF1e) is subtracted from the frequency (fLO1+fLO2−fLO3) of the reference signal 74c, as a result of which an output signal 76 with a frequency of fIF1e is obtained as shown in FIG. 7C.

As described above, in the process of frequency down-conversion of the second IF multiple signal 74 with the reference signal 74c contained in the second IF multiple signal, the reference signal 74c is amplified by the amplifier 180 to increase its power level. This allows the frequency mixer section 12a to operation linearly. It is preferable for the amplifier 180 to have narrow-band amplification characteristics of 10% or less in specified bandwidth and operating characteristics of extracting and amplifying only the reference signal 74c achieved in combination with the filter 171.

Moreover, the reference signal reproduction/frequency conversion circuit 12 is structured to perform frequency down-conversion of the second IF multiple signal 74 with use of the reference signal 74c contained in the second IF multiple signal 74. Consequently, as shown in FIG. 7C, the output signal 76 (frequency fIF1e) resulting from the frequency down-conversion contains a DC (Direct Current) component generated by frequency conversion of the reference signal 74c with the reference signal 74c itself. Accordingly, the frequency mixer section 12a should preferably include a capacitor 196 for removing the DC component.

In the signal division circuit 161 formed of the Wilkinson divider, the second IF multiple signal 74 is divided into two signals of identical phase with the division circuit 161 took as a starting point of division. Herein, there are first and second two paths extending from the division circuit 161 through the transmission line 162 to the frequency mixer section 12a. Namely, the first path P1 is a path having the length LS2 extending from the division circuit 161 through the transmission line 162 to the mixer MX, while the second path P2 is a path having the length L3 extending through the transmission line 163, the filter 171, the amplifier 180 and the transmission line 163 to the mixer MX.

A total path length L1(=L2+L3) that is a sum of the path lengths L2 and L3 of the first and second path P1 and P2, respectively, should preferably be not more than one wavelength λ corresponding to the minimum frequency of the second IF multiple signal 74. In this case, a loop composed of the first path P1 and the second path P2 and having a total path length L1 is not more than one wavelength λ, by which undesired oscillation waves due to parasitic oscillation loops become less likely to be generated. It is to be noted that herein the path lengths L2 and L3 are electric lengths to be precise but may be physical lengths.

Figure 3A:
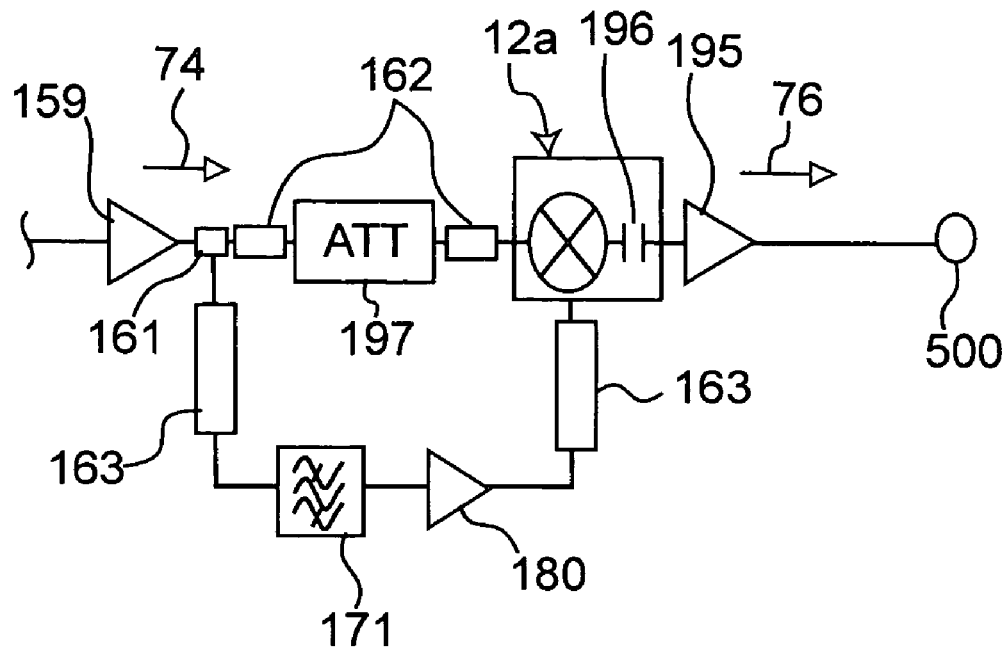
FIG. 3A is a block diagram showing a modified example of a frequency conversion circuit 12 of a receiving side in the first embodiment.
Figure 3B:
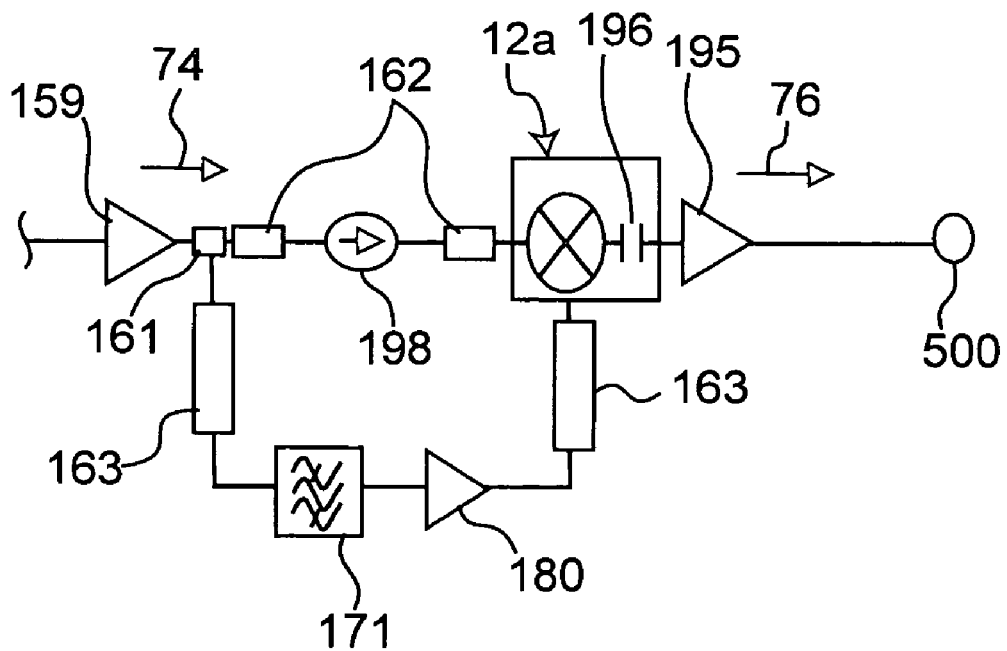
FIG. 3B is a block diagram showing another modified example of the frequency conversion circuit 12.

As shown in FIG. 3A, an attenuator 197 may be inserted into the first path P1 (path length:L2) extending through the transmission line 162, and as shown in FIG. 3B, an isolator 198 may be inserted into the first path P1 or a low-gain amplifier may be inserted instead of the isolator 198. The low-gain amplifier refers to an amplifier whose gain is lower than the gain of the amplifier 180 on the side of the second path P2 (path length L3).

Insertion of the attenuator 197, the isolator 198 or the low-gain amplifier has an effect of reducing and suppressing signal feedback components generated by the loop composed of the first and second paths with the total path length L1. Consequently, the characteristics of the loop composed of the first and second paths comes close to that of negative feedback. As a result, the frequency mixer section 12a shows stable output characteristics in which rise of noise floor and undesired wave components are suppressed. Particularly, insertion of the attenuator 197 with a low attenuation factor of about 1 db to several dB has an effect of ensuring a ratio defined by (power of the second IF signal 74a)/(power of the reference signal 74c) to be not more than 1. Consequently, the second frequency down-conversion by the frequency mixer section 12a can be brought closer to linear operation. This makes it possible to obtain stable reception characteristics with little distortion and noise in radio transmission sections.

Although in the microwave-band radio communication system of the first embodiment, the input signal 5e has been described as a signal having a terrestrial broadcast wave 5a and a satellite broadcast wave 5b, the input signal 5e may be a signal having a combination of two satellite broadcast waves, a combination of a satellite broadcast wave and a CATV (Cable Television) signal and the like, and further, for example, modulated wave signals in IF (Intermediate Frequency) stage or in RF (Radio Frequency) stage as used in radio LANs may be used as modulated wave input signals. Moreover, although in the first embodiment, the radio communication system for transmitting and receiving millimeter-waveband radio signals has been described, the radio signals are not limited to those in millimeter-wavebands, and therefore the present invention is applicable to systems for transmitting and receiving radio signals in microwave frequency bands including the millimeter-wavebands.

Second Embodiment

Description is now given of a microwave-band radio communication system in a second embodiment of the present invention. In the second embodiment, the configuration of the millimeter-wave radio transmitter 9 is identical to that in the above-described first embodiment, and further the configuration of the millimeter-wave radio receiver 10 up to a portion of the frequency mixer 112, which is the first down-converter for producing a second IF multiple signal 74 from a millimeter-waveband signal, is identical to that in the first embodiment.

More particularly, the second embodiment is different from the first embodiment in the configuration of the reference signal reproduction/frequency conversion circuit 12. The second embodiment is different from the first embodiment in the point that an input signal 5e is reproduced by producing an output signal 76 (frequency fIf1e) as a demodulated signal through frequency down-conversion of a second IF multiple signal 74 with use of a reference signal 74c contained in the same multiple signal 74. Therefore, in the second embodiment, description will be given of the portion of the reference signal reproduction/frequency conversion circuit 12 different from the first embodiment.

In the former first embodiment, a loop is composed of two paths extending from the two-way divider 161 included in the reference signal reproduction/frequency conversion circuit 12 to the frequency mixer section 12a, i.e., the transmission line 162 constituting the first path P1 and the transmission line 163 constituting the second path P2, the filter 172, the transmission line 163 and the amplifier 180. In this loop, the isolation characteristics between respective ports of the division/combination sections composed of each signal division circuit 161 and the frequency mixer section 12a should sufficiently be secured, though the path length of the loop is not limited.

Figure 4A:
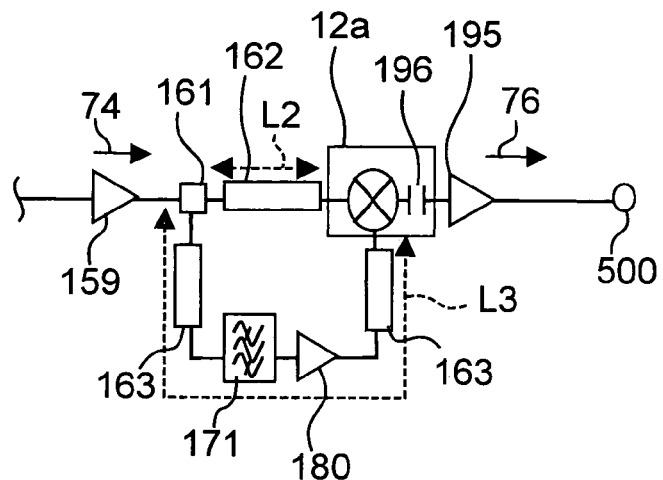
FIG. 4A is a block diagram showing a frequency conversion circuit 12 of a receiving side in a radio communication system in a second embodiment of the present invention.

In contrast, in the second embodiment, the reference signal reproduction/frequency conversion circuit 12 is configured as shown in FIG. 4A for further enhancement of the reception sensitivity of the receiver 10. As shown in FIG. 4A, in the frequency conversion circuit 12 of the second embodiment, with a signal division circuit 161 formed of a Wilkinson divider as a starting point, a second IF multiple signal 74 is divided into two signals in identical phase in the division circuit 161.

There are two paths extending from the division circuit 161 to a frequency mixer section 12a, i.e., a first path P1 extending from the division circuit 161 to the frequency mixer section 12a through a transmission line 162 and having a path length L2, and a second path P2 extending from the division circuit 161 to the frequency mixer section 12a through a transmission line 163, a filter 171 an amplifier 180 and a transmission line 163 and having a path length L3.

In the second embodiment, the path length L2 of the first path P1 and the path length L3 of the second path P2 are set to be almost equal. Reference signals 74c contained in the second IF multiple signal 74 pass through both the first path P1 with the path length L2 and the second path P2 with the path length L3 and are inputted into the frequency mixer section 12a. Both the reference signals 74c transmitted through both the paths become in identical phase at the input point. Consequently, the components of the reference signals 74c are combined in phase in the mixer section 12a, and the reference signals 74c drive the mixer section 12a as one local oscillation signal in identical phase.

Normally, as shown in FIG. 4A, on the side of the second path P2 with the path length L3, the reference signal 74c is extracted in the filter 171 and amplified in the amplifier 180. Consequently, the component of the reference signal 74c on the side of the second path P2 with the path length L3 are larger in signal level than the components of the reference signal 74c on the side of the first path P1 with the path length L2. Phase difference between the reference signals 74c in the first path P1 with the path length L2 and the second path P2 with the path length L3 generates parasitic noise components due to phase difference, thereby causing deterioration of signal quality.

In the second embodiment, since the path length L2 of the first path P1 and the path length L3 of the second path P2 are set to be almost equal as stated above, both the reference signals 74c transmitted through both the paths become in identical phase at the input point into the mixer section 12a. Therefore, it becomes possible to prevent the parasitic phase noise components from being generated and to enhance signal quality.

Figure 4B:
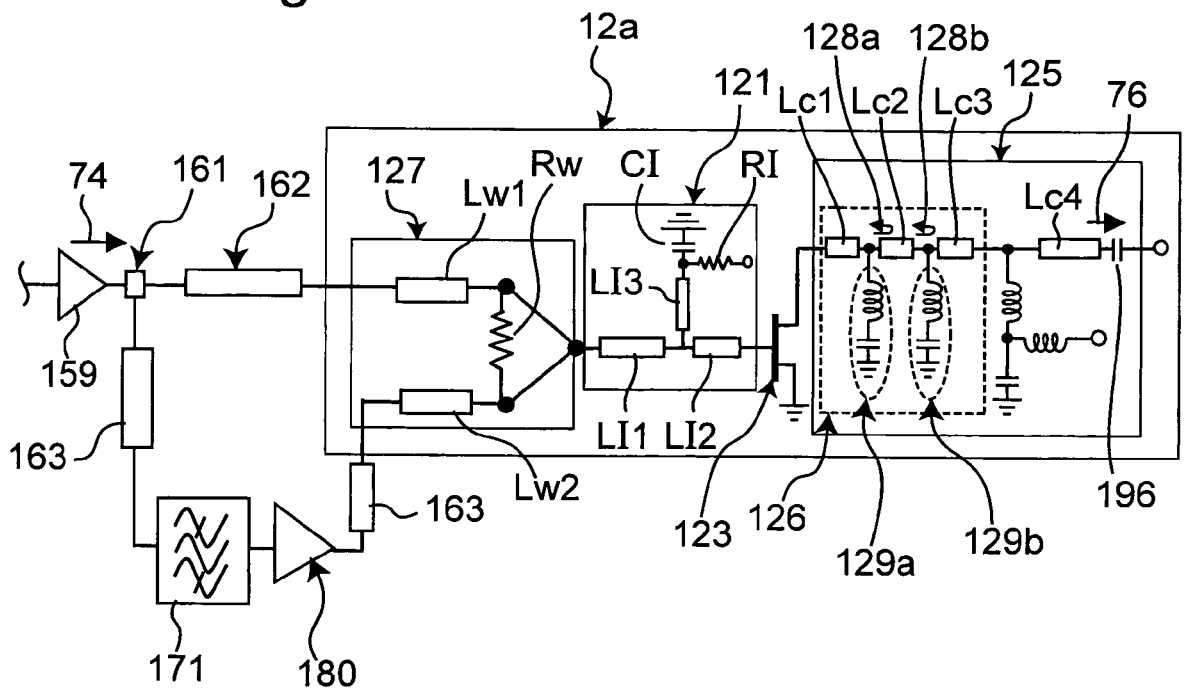
FIG. 4B is a detailed block diagram showing the frequency conversion circuit 12.

Next, FIG. 4B shows one example of more detailed configuration of the reference signal reproduction/frequency conversion circuit 12 of the second embodiment. It is to be noted that for convenience, the path length L2 of the first path P1 and the path length L3 of the second path P2 are herein described in terms of physical lengths, though the electric lengths are desirable to be precise as stated before.

The physical length of the transmission line 162 in the first path P1 is set to be equal to a sum of physical lengths of two transmission lines 163, 163 and physical lengths of paths that signals travel in the filter 171 and the amplifier 180 in the second path P2. As a result, it becomes possible to set the physical path length L2 of the first path P1 to be identical to the physical path length L3 of the second path P2. Consequently, the phase of the reference signal 74c traveling through the first path P1 becomes almost equal to the phase of the reference signal 74c traveling through the second path P2. Therefore, in down-conversion in the frequency conversion circuit 12 serving as the receiving-side second down-converter, the reference signals 74c as a local oscillation signal source are inputted from the first and second paths into the mixer MX so that the reference signals 74c in identical phase from these two paths can be combined in the mixer MX, and their signal levels can also be increased. As a result, it becomes possible to reduce frequency conversion loss, to enlarge radio transmission distance, and to prevent parasitic phase noise components from being generated so as to maintain signal quality after the frequency conversion.

Description is now given of the configuration of the mixer section 12a. As shown in FIG. 4B, the mixer section 12a is composed of a Wilkinson combiner 127, an input circuit 121 and an output circuit 125. The Wilkinson combiner 127 is composed of λ/4 transmission lines Lw1, Lw2, and a resistance RW. The λ/4 transmission line Lw1 is connected to between the transmission line 162 in the first path P1 and one end of the resistance Rw. The other transmission line Lw2 is connected to between the transmission line 163 in the second path P2 and the other end of the resistance Rw. Moreover, both the ends of the resistance Rw are connected to an output port of the Wilkinson combiner 127. Moreover, the output port of the Wilkinson combiner 127 is connected to the input side of the input circuit 121, and the output side of the input circuit 121 is connected to a base terminal of a transistor 123.

The input circuit is composed of transmission lines L11, L12, L13, a capacitor CI and a resistance RI. The transmission lines L11, L12 are connected in series from the input side to the output side. The transmission line L13 and the capacitor CI are connected in series to between a transmission line L11-L12 junction and a ground. Moreover, one end of the resistance RI is connected to a junction point between the transmission line L13 and the capacitor CI.

The emitter terminal of the transistor 123 is grounded while the collector terminal is connected to the output circuit 125. The output circuit 125 has a short circuit 126, a capacitor 196, and a transmission line Lc4 connected to between the short circuit 126 and the capacitor 196. A series circuit composed of an inductor and a capacitor is connected to between a transmission line Lc4-short circuit 126 junction point and a ground, and one end of another inductor is connected to a junction point between the inductor and the capacitor.

Moreover, the short circuit 126 has three transmission lines Lc1 to Lc3 connected in series, and a trap circuit 129a is connected to between a transmission line Lc1-Lc2 junction point and a ground, while a trap circuit 129b is connected to between a transmission line Lc2-Lc3 junction point and a ground. The trap circuits 129a, 129b are respectively constituted of a circuit composed of an inductor and a capacitor connected in series.

The mixer section 12a should preferably be a base injection-type transistor mixer (or a gate injection-type FET mixer) in which signals from the first path P1 with the path length L2 and signals from second path P2 with the path length L3 are combined in the Wilkinson combiner 127 as a signal to be injected. Moreover, the transistor 123 constituting the mixer section 12a should preferably be a microwave transistor such as HBTs (Heterojunction Bipolar Transistors) and HEMTs (High Electron Mobility Transistors). Herein, the Wilkinson combiner 127 is an in-phase combiner, and the reference signal 74c combined in phase is inputted into the common emitter (or source) transistor 123 together with a second IF signal 74a component via the input circuit 121. It is to be noted that the transistor 123 may be a common source FET.

In the radio receiver 10 of this configuration, when a radio transmission distance is long, the signal level of a second IF multiple signal 74 received in the reception antenna 14 and subjected to first frequency conversion in the frequency conversion/reception circuit 11 becomes small. Accordingly, with the amplification function and the frequency conversion function of the common emitter (or source) transistor 123, frequency conversion loss can be decreased in the case of low input-level local oscillation signals (reference signals) 74c. This makes it possible to enhance the reception sensitivity and to increase radio transmission distance. Although the Wilkinson combiner 127 is composed of the λ/4 transmission lines and the resistance, it may be composed only of lumped-constant lines such as inductors and capacitors.

Moreover, the output circuit 125 of the mixer section 12a has the short circuit 126 for short-circuiting both the second IF signal 74a contained in the inputted second IF multiple signal 74 and the reference signal 74c. Particularly, in the second embodiment, the output circuit 125 has the trap circuit 129a for short-circuiting and trapping high frequency components of the second IF multiple signal 74 of broadband, and the trap circuit 129b for short-circuiting and trapping low frequency components. Whether both two trap circuits 129a and 129b are used or only one trap circuit is used may be determined depending on the bandwidths of the second IF multiple signals 74. The short circuit 126 allows the components of the second IF multiple signals 74 leaking to the output side of the mixer section 12a to be reflected and fed back again to the side of the transistor 123 as shown by arrows 128a and 128b so that frequency mixing efficiency of the transistor 123 may be increased. It is to be noted that although the trap circuits 129a and 129b have been constituted of lumped-constant lines, they may be constituted of distributed constant lines.

Also in the second embodiment, the total path length L1(=L2+L3) that is a sum of the path length L2 of the first path P1 and the path length L3 of the second path P2 should preferably be not more than one wavelength λ corresponding to the minimum frequency of the second IF multiple signal 74. IN this case, a loop composed of the first path P1 and the second path P2 and having a total path length L1 is not more than one wavelength λ, by which undesired oscillation waves due to parasitic oscillation loops become less likely to be generated.

Third Embodiment

Description is now given of a microwave-band radio communication system in a third embodiment of the present invention. In the third embodiment, the configuration of the millimeter-wave radio transmitter 9 and the millimeter-wave radio receiver 10 up to a portion of the frequency conversion/reception circuit 11, which is the first down-converter for producing the component of a second IF multiple signal 74 from a millimeter-waveband radio multiple signal 73, are identical to that in the first embodiment.

Moreover, the third embodiment is different from the first embodiment in the point that a demodulated output signal 76, (i.e., reproduced input signal 5e) (frequency fIf1e) is produced from a second IF multiple signal 74 through frequency down-conversion with use of a reference signal 74c contained in the same multiple signal 74. Therefore, in the third embodiment, description will be given of a portion of the reference signal reproduction/frequency conversion circuit 12 corresponding to the second down-converter.

In the former second embodiment, the path length L2 of the first path P1 and the path length L3 of the second path P2 are set to be almost equal electric lengths, and on the input side of the mixer section 12a, the reference signals 74c are combined with the second IF multiple signal 74 in identical phase by the Wilkinson combiner 127 and resultant signal is injected into the base (or gate) injection-type mixer section 12a.

Figure 5A:
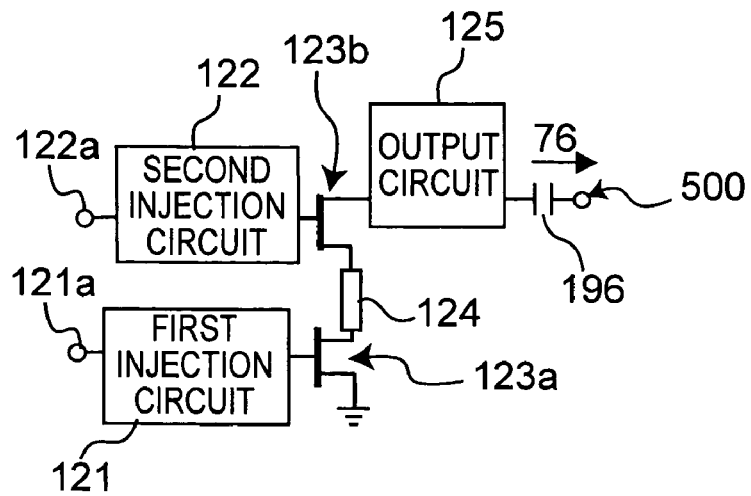
FIG. 5A is a block diagram showing a frequency conversion circuit 12 of a receiving side in a third embodiment of the present invention.

In contrast in the third embodiment, as shown in FIG. 5A, a mixer section 12a constituting the second down-converter (second frequency conversion means) has a cascode-type mixer composed of a common emitter (or source) transistor 123a and a common base (or gate) transistor 123b.

Moreover, in the mixer section 12a having the cascode-type mixer, a first injection circuit 121 is connected to the base terminal of the common emitter transistor 123a, and the first injection circuit 121 has a first injection port 121a. Moreover, the collector terminal of the common emitter transistor 123a is connected to the emitter terminal of the common base transistor 123b through a transmission line 124. The base terminal of the common base transistor 123b is connected to a second injection circuit 122, and the second injection circuit 122 has a second injection port 122a. Further, the output side of the common base transistor 123b is connected to an output circuit 125 and a DC (Direct Current component) cut capacitor 196. It is to be noted that the common emitter transistor 123a may be replaced with a common source transistor, and the common base transistor 123b may be replaced with a common gate transistor. Moreover, the transmission line 124 may be an inductor.

Figure 5B:
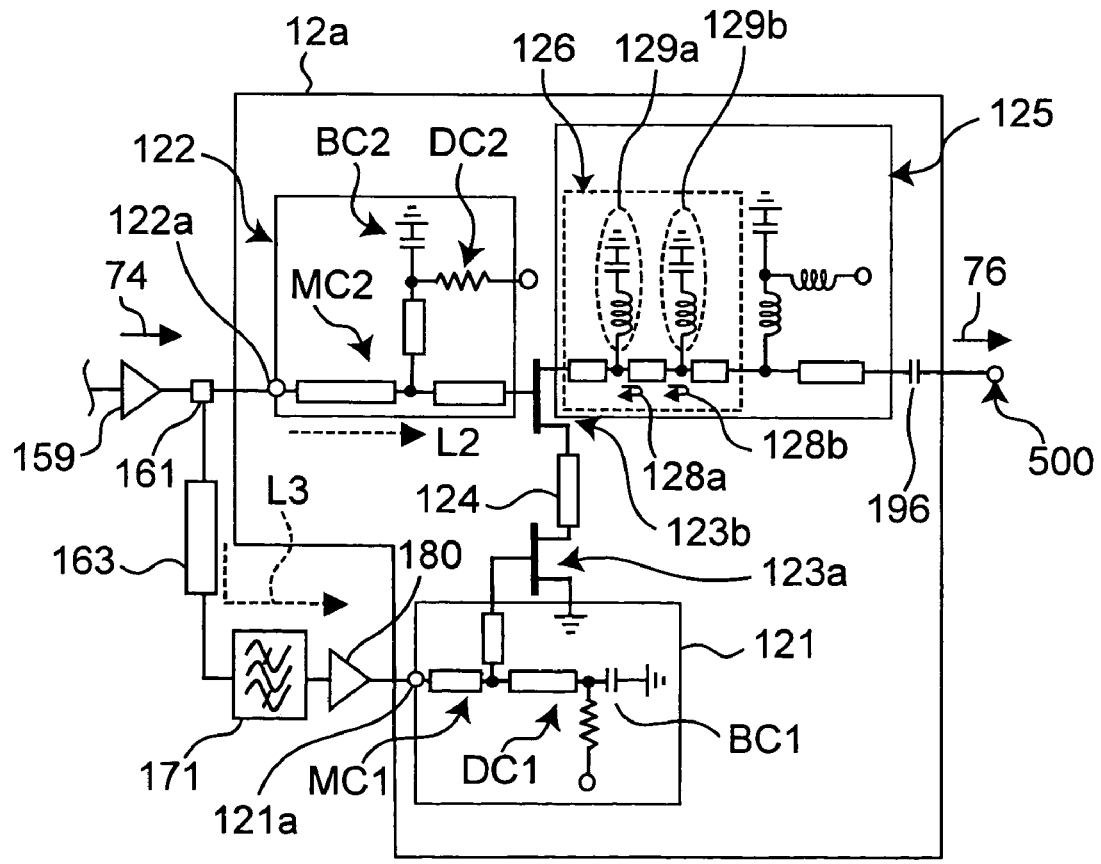
FIG. 5B is a detailed block diagram showing the frequency conversion circuit 12.

Herein, FIG. 5B shows one example of desired topology of the cascode-type mixer section 12a serving as the second down-converter in detail. As shown in FIG. 5B, the first injection circuit 121 is composed of an input signal matching circuit MC1, a DC supply circuit DC1 to the transistor, and a bypass capacitor BC1. The second injection circuit 122 is composed of an input signal matching circuit MC2, a DC supply circuit DC2 to the transistor, a bypass capacitor BC2 and the like. It is to be noted that the cascode-type transistor may be replaced with a dual base-type transistor (or a dual gate-type FET).

In the frequency conversion circuit 12 in the third embodiment, a second IF multiple signal 74 is divided into two signals going to a first path P1 and a second path P2 by a Wilkinson divider 161. In the second path P2, a reference signal 74c extracted and selected by filtering a reference signal 74c via a filter 171 and amplifying the reference signal 74c via an amplifier 180 is inputted into the first injection port 121a. The reference signal 74c inputted into the first injection port 121a is inputted into the base terminal of the common emitter transistor 123a through the first injection circuit 121. The second IF multiple signal 74 guided via the power divider 161 to the first path P1 is directly inputted into the second injection port 122a, and from the second injection port 122a, the second IF multiple signal 74 is inputted into the base terminal of the common base transistor 123b through the second injection circuit 122.

The output circuit 125 in the third embodiment, which shares the same configuration with the output circuit in the second embodiment, has an input signal short circuit 126 and the like for the second IF multiple signal 74.

It is to be noted that though the first and second injection circuits 121, 122 constituting input matching circuits is as shown in FIG. 5B in the third embodiment, it may be structured from a combination of distributed constant lines and lumped-constant lines, or may be structured only from lumped-constant lines. Moreover, in the case where the frequency band of the second IF multiple signal 74 is low, conversion gain of the cascode-type mixer MX can be sufficiently increased, and so the amplifier 180 may be omitted. Moreover, the common emitter transistor 123a may be replaced with a common source transistor, while the common base transistor 123b may be replaced with a common gate transistor.

Description is now given of the operation of the third embodiment.

As shown in FIG. 5B, a second IF multiple signal 74 is divided into two signals via the power divider 161. The reference signal 74c is extracted and selected from one divided second IF multiple signal 74 coming into the second path P2 by filtration and amplification. This reference signal 74c is inputted into the first injection port 121a of the cascode-type mixer section 12a and through the first injection circuit 121 serving as an input circuit further inputted into the base terminal of the transistor 123a.

The other divided second IF multiple signal 74 divided into the first path P1 is inputted directly into the second injection port 122a, and inputted into the base terminal of the common base transistor 123b through the input circuit 122.

The reference signal 74c and the second IF multiple signal 74 inputted from respective input ports 121a, 122a are subjected to amplification as well as mixing operation in both the transistors 123a and 123b, while the second IF signal 74a and the reference signal 74c are adjusted to have an optimum phase and optimum sensitivity (optimum drive impedance) via the transmission line 124. Moreover, in the third embodiment, as with the case of the second embodiment, a component of the inputted second IF multiple signal 74 is reflected and fed back by the input signal short circuit 126 of the output circuit 125 so as to increase the non-linear operation efficiency inside the transistors 123a, 123b and to enhance the sensitivity characteristic of the frequency conversion.

In the third embodiment, the presence of the cascode-type mixer MX makes it possible to decrease conversion loss of the frequency mixer section 12a and to improve (sufficiently increase) isolation characteristics between respective input ports 121a and 122a. With the isolation between the input ports 121a and 122a, the parasitic loops described in the first embodiment can be cut (opened), and parasitic oscillation and the like can be removed. It is to be noted that while passive Wilkinson dividers are common as the power divider 161, it is possible to use branch amplifiers formed of microwave transistors. The branch amplifier has high isolation between branches, and when combined with the cascode-type mixer section 12a makes it possible to ensure considerably high inter-port isolation, which allows the parasitic loops described in the first and second embodiments to be opened and allows more effective prevention of parasitic oscillation due to the parasitic loops.

Moreover, the mixer in the former second embodiment is a single mixer type functioning with one transistor 123, and so there is only one input port so that the mixer section 12a should be driven with same input impedance with respect to the reference signal 74c and the second IF multiple signal 74.

In contrast in the third embodiment, the first injection port 121a of the cascode-type mixer section 12a is connected to the second path P2 (path length L3) for extracting and amplifying the reference signal 74c component, while the second injection port 122a is connected to the first path P1 (path length L2) for transmitting the second IF multiple signal 74 component to be subjected to frequency conversion. According to the above configuration of the third embodiment, employing the cascode-type mixer section 12a can provide separate input ports 121a, 122a, and the respective injection circuits, 121, 122 allow the mixer section 12a to be driven with optimum input impedance. This makes it possible to improve the frequency characteristics and distortion characteristics of the mixer section 12a.

Moreover in the third embodiment, the reference signal 74c as a local oscillation component of the mixer section 12a is inputted into the first injection port 121a, while the second IF multiple signal 74 as a primary target of the frequency conversion is inputted into the injection port 122a. By this, the sensitivity characteristics to the reference signal component necessary for the transmission and reception system in the present embodiment can be obtained even at low input levels, and the level fluctuation of the reference signal 74c component can be reduced. More particularly, the first input port has a wide dynamic range and has a function to amplify the reference signal 74c component, so that the level of transmission reference signals 72c may be lowered relatively to transmission radio signals 72a on the transmitter 9 side, thereby making it possible to increase transmission efficiency (a ratio of transmission target signals to reference signals). In addition, with the level fluctuation in reception radio multiple signal 73, the fluctuation of the output signal 76 subjected to the second frequency conversion on the receiving side is brought closer to the linear operation, so that rapid fluctuation can be reduced and more stable reception can be achieved.

Fourth Embodiment

Figure 8:
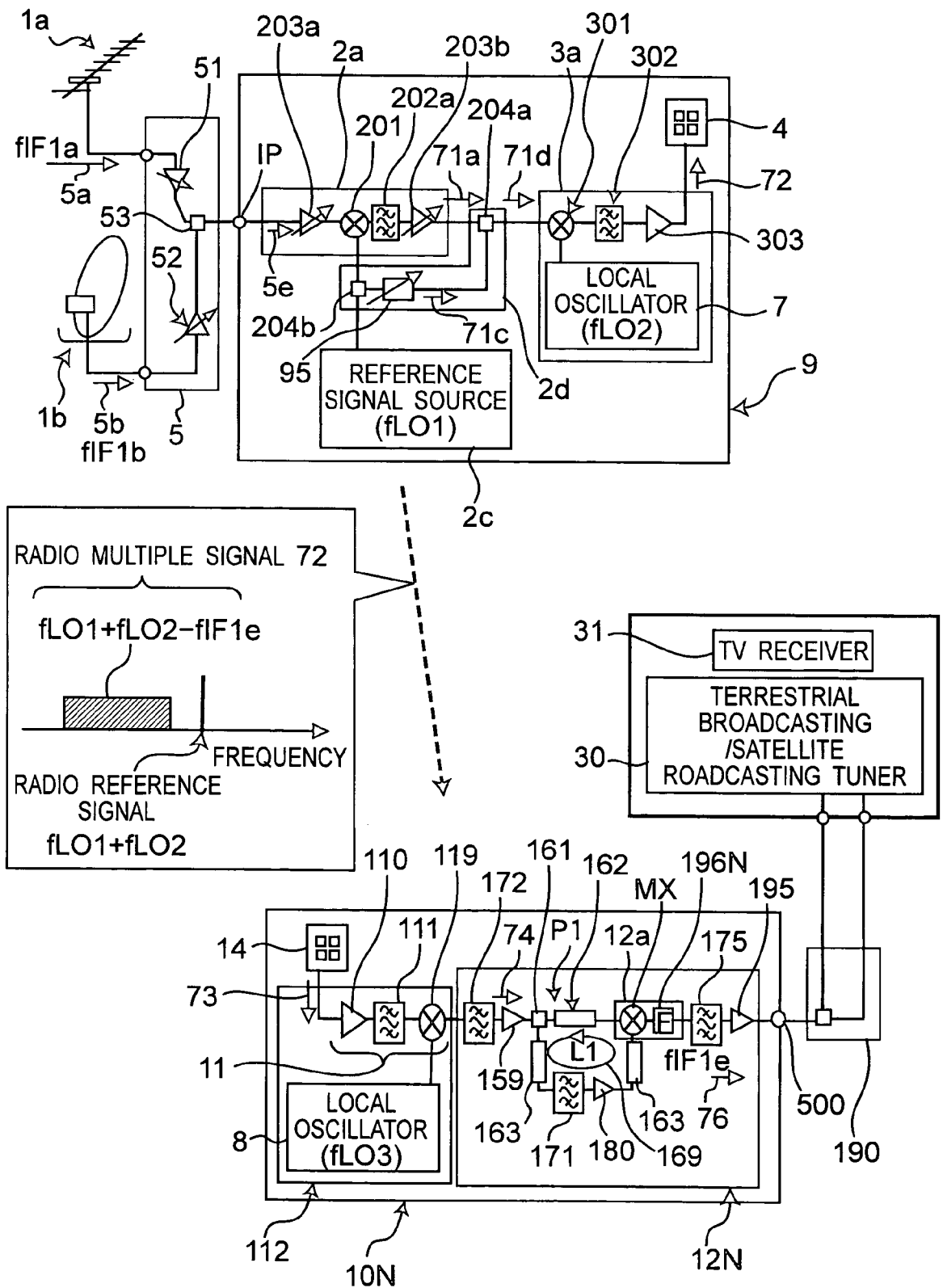
FIG. 8 is a block diagram showing a microwave-band radio communication system in a fourth embodiment of the present invention.

Next, FIG. 8 shows the configuration of a microwave-band radio communication system in a fourth embodiment of the present invention. The microwave-band radio communication system has a microwave-band radio transmitter 9 and a microwave-band radio receiver 10N. It is to be noted that microwave-bands herein refer to frequency bandwidths including microwave-bands and millimeter-wavebands.

The microwave-band radio transmitter 9 of the fourth embodiment is identical in configuration to the millimeter-waveband radio transmitter 9 in the first embodiment shown in FIG. 2 except that the radio receiver 10N in the fourth embodiment is different in configuration from the radio receiver 10 in the first embodiment. Namely, the radio receiver 10N is different from the radio receiver 10 in the first embodiment in the point that, as shown in FIG. 8, a reference signal reproduction/frequency conversion circuit 12N serving as the second down-converter of the microwave-band radio receiver 10N has a filter 172 serving as the first filter connected to the input side of an intermediate frequency amplifier 159 and a filter 175 connected to between a frequency mixer section 12a and an amplifier 195. Accordingly, in the fourth embodiment, focus will be put on the point different from the first embodiment while the point similar to those in the first embodiment will be briefly described.

The schematic configuration of the microwave-band radio communication system in the fourth embodiment is shown in FIG. 1.

As shown in FIG. 1, the microwave-band radio transmitter 9 on the transmitting side is schematically composed of a frequency arrangement unit 5, a reference signal addition/power level control circuit 2, a frequency conversion/transmission circuit 3, a local oscillator 7, and a transmission antenna 4.

With respect to the operation of the millimeter-waveband radio transmitter 9, first, for the first step, in the frequency arrangement unit 5 as shown in FIG. 11, for example, the power levels of an modulated wave input signal 5a from a terrestrial broadcasting antenna 1a and an input modulated wave signal 5b from a satellite broadcasting antenna 1b are respectively adjusted by respective amplifiers 51 and 52, and their frequency allocations are arranged in a mixer 53 to produce an input modulated signal 5e (fIF1e) of one series. It is to be noted that FIG. 11A shows the production process of the signal on a frequency scale.

In the next step, the input modulated signal 5e is inputted into the reference signal addition/power level control circuit 2, and as shown in FIG. 11B, the input modulated signal Se of one-series (frequency fIF1e) allocated on the frequency scale is subjected to first frequency conversion. In the reference signal addition/power level control circuit 2, a first IF signal 71a produced by the first frequency conversion is subjected to level control, and at the same time, a proper-level reference signal 71c is added to the first IF signal 71a, by which a first IF multiple signal 71d (frequency (fLO1−fIF1e)) that is an intermediate frequency multiple signal (frequency allocated signal) is produced.

Herein, description is given of the case where lower sideband waves are used as desired waves, for example. In this case, due to imperfection of a filter 202a of a first frequency conversion circuit 2a in FIG. 8, level difference varies largely, and as shown by broken lines in FIG. 11B, an upper sideband undesired wave component (frequency: fLO1+fIF1e) is also generated.

In the next step, the first IF multiple signal 71d outputted from the reference signal addition/power level control circuit 2 is inputted into the frequency conversion/transmission circuit 3. Then, in the frequency conversion/transmission circuit 3, the first IF multiple signal 71d is subjected to frequency conversion to the millimeter-waveband with a local oscillation signal (frequency fLO2) outputted from the local oscillator 7 before being amplified.

As shown in FIG. 11C, a radio multiple signal 72 produced by the frequency conversion and the amplification is transmitted as a radio signal from the transmission antenna 4. It is to be noted that in FIG. 11A through FIG. 1C, hollow arrow symbols indicate the allocation direction of the signals. Moreover, in FIG. 1C, broken lines indicate an undesired signal (frequency: fLO1+fLO2+fIF1e) accompanying the radio multiple signal 72.

As shown in FIG. 1, the millimeter-waveband radio receiver 10 is schematically composed of a reception antenna 14 for receiving radio multiple signals from the transmitting side, a frequency conversion/reception circuit 11 for performing first frequency down-conversion upon reception of radio multiple signals 73 from the reception antenna 14, a local oscillator 8 for feeding local oscillation signals, and a reference signal reproduction/frequency conversion circuit 12 for performing second frequency down-conversion of the receiving side. The frequency conversion/reception circuit 11 serves as the first down-converter, while the reference signal reproduction/frequency conversion circuit 12 serves as the second down-converter.

Figure 12A:
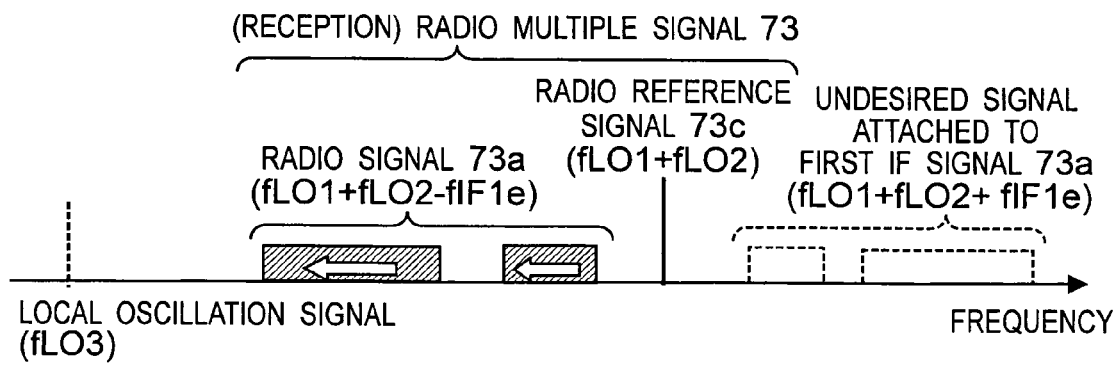
FIG. 12A is a view showing a frequency allocation of a radio multiple signal 73 received in a first operation step of a millimeter-waveband radio receiver 10N of the fourth embodiment.
Figure 12B:
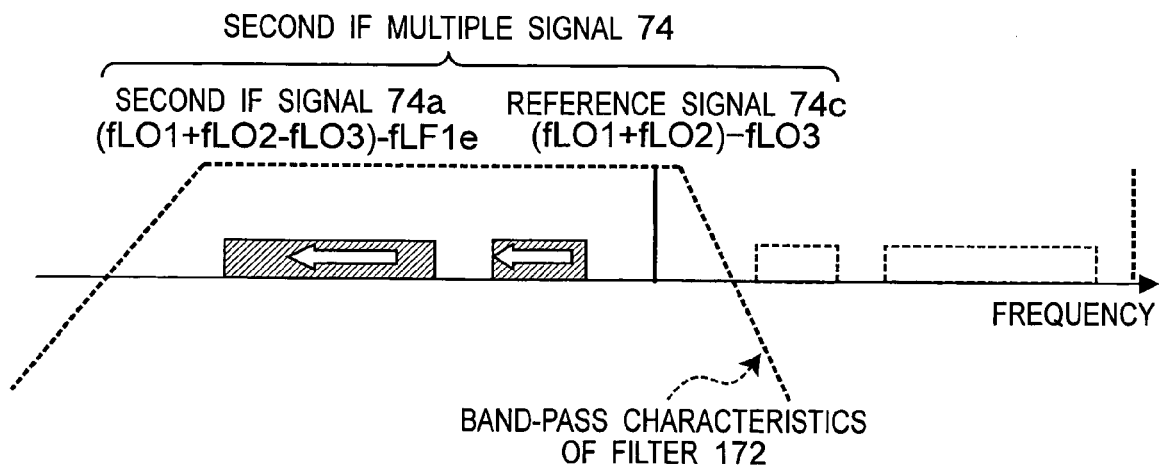
FIG. 12B is a view showing a frequency allocation of a second IF multiple signal 74 received in a following operation step of the millimeter-waveband radio receiver 10N in the fourth embodiment.

In the millimeter-waveband radio receiver 10, first, for the first step of its operation steps, as shown in FIG. 1 and FIG. 12A, a radio multiple signal 72 from the transmitting side is received by the reception antenna 14 and then a radio multiple signal 73 from the reception antenna 14 is received by the frequency conversion/reception circuit 11, where first frequency down-conversion is performed. More particularly, in the frequency conversion/reception circuit 11, the radio multiple signal 73 is converted to a second intermediate frequency-band signal with the local oscillation signal (frequency fLO3) fed from the local oscillator 8 shown in FIG. 8 to produce a second IF multiple signal 74 that is an intermediate frequency multiple signal as shown in FIG. 12B. It is to be noted that in FIG. 12A and FIG. 12B, hollow arrow symbols indicate the allocation direction of signals. Moreover, in FIG. 12A, broken lines indicate an undesired signal (frequency: fLO1+fLO2+fIF1e) accompanying to the radio multiple signal 73.

In the next step, the second IF multiple signal 74 is inputted into the reference signal reproduction/frequency conversion circuit 12N, and its undesired wave signal is suppressed as shown in FIG. 12B by a first filter 172 shown in FIG. 8. Then, the reference signal reproduction/frequency conversion circuit 12N extracts a reference signal 74c from the second IF multiple signal 74 shown in FIG. 12B by means of a second filter 171, amplifies the reference signal 74c, and performs frequency down-conversion of the second IF multiple signal 74 that is an intermediate frequency multiple signal with use of the above reference signal 74c. As a result, the reference signal reproduction/frequency conversion circuit 12 reproduces the input signal 5e (frequency fIf1e) of one series inputted on the transmitting side as an output signal 76 (frequency fIf1e) of one series.

Next, in the last step on the receiving side, the output signal 76 outputted from the output port 500 of the radio receiver 10 is inputted into a frequency inverse arrangement/separation section 190. In the frequency inverse arrangement/separation section 190, from the serial output signal 76 (frequency fIf1e) of one series reproduced on the receiving side and corresponding to the input signal 5e on the transmitting side, a signal 76a corresponding to the signal 5a for terrestrial broadcasting and a signal 76b corresponding to the signal 5b for satellite broadcasting are reproduced. These divided signals 76a, 76b are respectively inputted into a plurality of terrestrial broadcasting/satellite broadcasting tuners 30 in a plurality of the TV receivers 31.

Next, the microwave-band radio communication system in the fourth embodiment will be described in detail with reference to FIG. 8. As described before, the fourth embodiment is similar to the first embodiment in the configuration of the microwave-band radio transmitter 9. The fourth embodiment is different from the first embodiment in the point that the microwave-band radio receiver 10N has a filter 172 as the first filter and a filter 175, and also different in the configuration of the frequency mixer section 12a. Accordingly, in the fourth embodiment, focus will be put on the point different from the first embodiment while the point similar to those in the first embodiment will be briefly described.

FIG. 8 shows the detailed configuration of the microwave-band radio communication system in the fourth embodiment. As shown in FIG. 8, the millimeter-waveband radio transmitter 9 as one example of the microwave-band radio transmitter is composed of a frequency arrangement section 5, a first frequency conversion circuit 2a exemplifying an intermediate frequency conversion section, a reference signal source 2c, a reference signal addition circuit 2d exemplifying a multiple signal production means, and a millimeter-wave frequency conversion circuit 3a exemplifying a transmitting-side frequency conversion section.

In the frequency arrangement section 5, the power levels of the modulated wave input signal 5a from the terrestrial broadcasting antenna 1a and the modulated wave input signal 5b from the satellite broadcasting antenna 1b are respectively adjusted by respective amplifier 51 and the amplifier 52. By this, the power levels of the respective modulated wave input signals 5a, 5b are adjusted to be equal, and the respective modulated wave input signals 5a, 5b are further subjected to power combination and frequency arrangement. As a result, an input signal Se (frequency fIf1e) of one series shown in FIG. 11A is produced. Herein, in the case where the modulated input signal 5a and the modulated input signal 5b share the same frequency band, direct power combination of these signals cannot be conducted, and so the frequency of either one of the modulated input signals is converted before execution of the power combination of these signals. Thus, the input signal Se (frequency fIf1e) of one series is produced. Herein, since the respective modulated input signals 5a, 5b are different in frequency band from each other, they are directly combined in a power combiner 53. Further, although the power levels of the respective modulated input signals 5a, 5b have been modulated to be equal in this case, power combination may be executed in the state that the input modulated signals 5a, 5b have different power levels depending on the quality of the respective modulated input signals 5a, 5b.

Next, the signal Se (frequency fIf1e) of one series allocated on the frequency scale is amplified and adjusted to an appropriate level by the amplifiers 203a and is then inputted into a frequency mixer 201 for first frequency conversion. Only the single-side band of a first IF signal 71a resulting from the first frequency conversion is filtered and is adjusted by an amplifier 203b to an appropriate level. It is to be noted that this adjustment may be achieved by appropriately combining the amplifier 203b with an attenuator.

Then, in a power combiner 204a, the reference signal 71c adjusted to have an appropriate level is added to the first IF signal 71a to produce a first IF multiple wave signal 71d as an intermediate frequency multiple signal (frequency allocated signal).

Herein, a reference signal 71c having a frequency fLO1 outputted from the reference signal source 2c is divided into two signals in a power divider 204b, and one reference signal 71c is inputted into the frequency mixer 201 as a local oscillation signal. The other reference signal 71c resulting from power division is inputted into a level controller 95, and after being subjected to later-described appropriate level control, the other reference signal 71c is inputted into a power combiner 204a as a reference signal 71c. Then, in the power combiner 204a, the reference signal 71c and the first IF signal 71a are power-combined to produce a first IF multiple signal 71d.

Herein, the first IF signal 71a is to be filtered by the filter 202a, and then is amplified and level-controlled by an amplifier 203 (or a combination of the amplifier 203 and an attenuator) before the reference signal 71c is added thereto.

Thus, the first IF signal 71a is level-controlled by the level control means formed of the amplifier 203b and the like, and then is provided with the reference signal 71c. Therefore, the amplifier 203b can efficiently and linearly amplify only the first IF signal 71a of low level without causing distortion by the reference signal 71c whose level is larger than the signal 71a.

Further, the power level of the first IF signal 71a contained in the first IF multiple wave signal 71d and the power level of the reference signal 71c may be independently controlled respectively by the amplifier 203b (or in combination with an attenuator) and by the level controller 95. Therefore, since the power levels of the first IF signal 71a and the reference signal 71c may be independently controlled so that a power ratio distribution ratio between these signals can be controlled, it becomes possible to drive the transmitting-side frequency conversion/transmission circuit 3 more linearly at full power.

Moreover, on the side of the millimeter-waveband radio receiver 10, in the case where the second IF multiple signal 74 itself is subjected to frequency down-conversion with the reference signal 74c contained in the second IF multiple signal 74 during the second frequency conversion, there is an optimum power distribution ratio between a desired signal and a reference signal.

Therefore, in the transmitting-side millimeter-wave radio transmitter 9, it is desirable that in the stage of producing the first IF multiple signal 71d an appropriate ratio of (power of the first IF signal 71a)/(power of reference signal 71c) is preset so as to have an optimum power distribution ratio for high receiver sensitivity. This makes it possible to enhance frequency conversion efficiency (receiver sensitivity) and to increase radio transmission distance.

It is to be noted that the attenuators in the level control sections used in the level controller 95 and the amplifiers 203a, 203b in the fourth embodiment for example may be T-type attenuators and r-type attenuators made of resistances used for chip components. Moreover, the power combiners 204a, 204b included in the reference signal addition circuit 2d should preferably be Wilkinson combiners whose output ports have isolation characteristics from each other. This makes it possible to suppress signals leaking into the output ports of the respective power combiners 204a, 204b, so that each function circuit can operate normally. More specifically, the power combiners 204a, 204b formed of the Wilkinson combiners and the amplifiers 203a, 203b can prevent the first IF signal 71a from leaking into the side of the reference signal addition circuit 2d. Further, it also becomes possible to prevent the added reference signal 71c from flowing back to the frequency mixer 201 from the power combiner 204a.

Herein in this frequency conversion, it is desirable to use lower sideband signals. By using the lower sideband signals, the frequency characteristics of the first IF signal 71a after frequency conversion are inverted. The inversion of the frequency characteristics makes it possible to improve the frequency characteristics (frequency flatness) in the frequency conversion/amplification characteristics of the first IF signal 71a of broadband, in the amplifier 203 having the level control function as well as in up-conversion (transmitter side) and down-conversion (receiver side) to and from millimeter-wavebands in the subsequent stages. The reason thereof will be described below.

Normally, in high frequency bands not lower than ultra-high-frequency bands (UHF bands), in the process of frequency conversion and the process of amplification in the radio transmitter 9 and the radio receiver 10, loss in level of a signal of one series becomes smaller in the low frequency side than the high frequency side (in the case of amplification, gain becomes larger). Therefore, the loss is larger in the high frequency side than in the low frequency side (in the case of amplification, the gain becomes smaller). Therefore, the loss is larger in the high frequency side than in the low frequency side (in the case of amplification, the gain becomes smaller). Therefore, the level of the signal of one series, depicted in a signal strength levels (vertical axis) versus frequencies (horizontal axis) graph, presents rightwards down frequency characteristics, dissimilar to ideal flat frequency characteristics. It is to be noted that the input signal 5e (frequency fIf1e) inputted into the radio transmitter 9, is itself a broadband signal of a multi-channel image signal of one series, and therefore the level difference of signal 5e between the high and low frequency sides of signal 5e makes its modulated signal have lower level on higher frequency side.

Therefore, by using the lower sidebands during the first frequency conversion at the transmitting-side first frequency conversion circuit 2a (more specifically, by selecting the lower sidebands in the filter 202a), the frequency characteristics after conversion is inverted between high and low frequency sides, so that the frequency characteristics is improved to have flat characteristics. More particularly, in the signal processing step subsequent to the filter 202a of the first frequency conversion circuit 2a, the characteristic that loss is large in the high frequency side (gain is small) while loss is small in the low frequency side (gain is large) is added to the signal having reversed frequency characteristics regarding low and high frequencies. By this, the frequency characteristics of the input signal 5e are compensated, so that more flat frequency characteristics of the first IF multiple signal 71d and the radio multiple signal 72 is obtained.

More particularly, the frequency allocations of the signals are changed as follows during generating process of the first IF multiple signal 71d shown in FIG. 11B from the input signal 5e of one series shown in FIG. 11A.

| (signal) | (frequency) |
|---|---|
| first IF reference signal 71c | fLO1 |
| First IF signal 71a | fLO1 − fIF1e |

To the inverted first IF signal 71a, a local oscillation signal derived from the reference signal source 2c used in the first frequency conversion and divided via the power divider 204b is added as a reference signal 71c. By this, the frequency characteristics in the subsequent signal processing (amplification, frequency conversion) can be improved. More particularly, in the subsequent process of frequency conversion/amplification, the characteristic that loss is large in the high frequency side of signals (gain is small) while loss is small in low frequency side (gain is large) is added to the first IF multiple signal 71d whose frequency allocation is inverted in low and high frequency sides with respect to that of the input signal Se. As a result, the frequency characteristics of the signal become more flat. It is to be noted that the signal whose allocation is inverted with respect to that of the input signal Se in the radio transmitter 9 is subjected to later-described second frequency down-conversion with use of a reference signal 74c on the radio receiver 10 side, by which the signal automatically becomes a signal 76 of one series (frequency fIf1e) having a recovered original frequency allocation identical to the input signal 5e (frequency fIf1e).

The first IF multiple signal 71d shown in FIG. 11B is next inputted into the millimeter-wave frequency conversion circuit 3a shown in FIG. 8. The millimeter-wave frequency conversion circuit 3a is connected to a frequency mixer 301, a bandpass filter 302, and a millimeter-wave amplifier 303 sequentially in the order from the input side to the output side. Moreover, the frequency mixer 301 is connected to the local oscillator 7.

In the millimeter-wave frequency conversion circuit 3a, the first IF multiple signal 71d is subjected to frequency up-conversion to the millimeter-waveband by the local oscillator 7 and the frequency mixer 301, and then a desired multiple signal is filtered via the bandpass filter 302. In the frequency conversion to the millimeter-waveband, upper sideband signals are used for the purpose of aforementioned frequency characteristics improvement. Then, after being amplified in the millimeter-wave amplifier 303, the multiple signal is radiated to the space as a millimeter-waveband multiple radio signal 72 via the transmission antenna 4. Herein, the transmission antenna 4 and the millimeter-wave amplifier 303 constitute a transmission means.

It is to be noted that in one desirable example, an Nth (N: natural number not less than 2) harmonic mixer such as even-harmonic mixers may be used as the frequency mixer 301. Using the Nth harmonic mixer allows the local oscillation frequency of the local oscillator 7 to be reduced to 1/N. More specifically, in this example, employing a second harmonic mixer allows the local oscillation frequency of the local oscillator 7 to be reduced to ½. For example, in the case of the millimeter-wave radio transmitter 9 and the millimeter-waveband radio receiver 10 handling transmission and reception radio multiple signals 72 and 73 of 60 GHz band, the frequency fLO2 of local oscillation signals outputted from the local oscillator 7 may be in 25 GHz to 30 GHz bands. Therefore, direct oscillation of the local oscillator 7 in 60 GHz band is not necessary, which allows easy manufacturing of the millimeter-waveband radio transmitters having high frequency stability through easy mounting process such as wire-bonding.

However, due to the imperfection of the bandpass filter 302 in the millimeter-wave frequency conversion circuit 3a, the undesired signal (frequency fLO1+fLO2+fIF1e) shown by broken lines in FIG. 11C is not completely suppressed and remains, and the remaining undesired signal albeit only slightly is radiated via the transmission antenna 4.

It is to be noted that in the generating process of the transmission radio multiple signal 72 shown in FIG. 6C from the first IF multiple signal 71d shown in FIG. 6B to, the frequency allocations of the signals are changed as follows.

| (signal) | (frequency) |
|---|---|
| radio reference signal 72c | fLO1 + fLO2 |
| radio signal 72a | fLO1 + fLO2 − fIF1e |

Description is now given of the receiving side. As shown in FIG. 2, the millimeter-waveband radio receiver 10 as one example of the microwave-band radio receiver is composed of the reception antenna 14, the frequency conversion/reception circuit 11 as the first down-converter, the local oscillator 8, and the reference signal reproduction/frequency conversion circuit 12N as the second down-converter. The frequency conversion/reception circuit 11 and the local oscillator 8 constitute a frequency conversion section 112. The frequency conversion/reception circuit 11 has a low noise amplifier 110, a millimeter-wave bandpass filter 111, and a frequency mixer 119 connected sequentially in the order from the input side to the output side. The local oscillator 8 is connected to the frequency mixer 119.

Moreover, the reference signal reproduction/frequency conversion circuit 12N has a filter 172, an intermediate frequency amplifier 159, a signal division circuit 161, a transmission line 162, a frequency mixer section 12a, a filter 175 and an amplifier 195 connected sequentially in the order from the input side to the output side. The filter 172 is the first filter to remove undesired waves from intermediate frequency multiple signals.

The transmission line 162 constitutes the first path P1. Moreover, a transmission line 163 constituting the second path P2, a bandpass filter 171, an amplifier 180 and the transmission line 163 are connected in sequence in between the signal division circuit 161 and the frequency mixer section 12a. The bandpass filter 171 is the second filter to extract reference signals from the intermediate frequency multiple signals.

The frequency mixer section 12a includes a mixer MX and a trap circuit 196N as a feedback circuit. The input side of the amplifier 195 is connected to the output side of the frequency mixer section 12a, while the output side of the amplifier 195 is connected to the output port 500.

The output port 500 of the millimeter-waveband radio receiver 10 is connected to the separation filter 190, which is connected to the terrestrial broadcasting/satellite broadcasting tuner 30 included in the TV receiver 31.

In this millimeter-waveband radio receiver 10, a radio multiple signal 73 received by the reception antenna 14 is inputted into the frequency conversion/reception circuit 11. More particularly, the radio multiple signal 73 is once amplified by the low noise amplifier 110. Next, a desired signal filtered by the millimeter-wave bandpass filter 111 is subjected to frequency down-conversion to the second intermediate frequency band with use of a local oscillation signal (frequency fLO3) from the local oscillator 8 in the frequency mixer 112 so as to produce a second IF multiple signal 74 of intermediate frequency.

It is to be noted that the frequency down-conversion of the millimeter-waveband radio multiple signal 73 is the down-conversion in which an upper sideband signal is selected as a radio multiple signal 73 to be processed as shown in FIGS. 12A and 12B. Therefore, the local oscillation frequency fLO3 on the receiving-side shown in FIG. 12B is lower than the frequency of the transmitting-side radio multiple signal 72 shown in FIG. 16C. It is to be noted that as shown in FIG. 11C, the radio multiple signal 72 contains a radio reference signal 72c (frequency (fLO1+fLO2)) and a radio signal 72a (frequency (fLO1+fLO2−fIF1e)). In FIG. 12A and FIG. 12C, hollow arrow symbols indicate the allocation direction of the signals.

Further in one desirable working example, an Nth (N: natural number not less than 2) harmonic mixer such as even-harmonic mixers is employed as the frequency mixer 119. In this case, the local oscillation frequency of the local oscillator 8 may be reduced to 1/N. In one specific example, using a second harmonic mixer as the frequency mixer 119 allows the local oscillation frequency of the local oscillator 8 to be reduced to ½. Therefore the millimeter-waveband radio receiver 10 having high frequency stability may be manufactured easily through easy mounting process such as wire-bonding. This also applies to the above-stated transmitting-side frequency conversion/transmission circuit 3.

A reception radio multiple signal 73 shown in FIG. 7A is subjected to frequency down-conversion to the second intermediate frequency band to produce a second IF multiple signal 74 shown in FIG. 12B. Through this production process, the second IF multiple signal 74 is converted to have the following frequency allocation.

| (signal) | (frequency) |
|---|---|
| second IF reference signal 74c | fLO1 + fLO2 − fLO3 |
| second IF signal 74a | (fLO1 + fLO2 − fLO3) − fIF1e |

While the low noise amplifier 110 in the frequency conversion/reception circuit 11 amplifys the radio multiple signal 73, the low noise amplifier 110 also amplifies an undesired signal (frequency fLO1+fLO2+fIF1e). The millimeter-wave bandpass filter 111 in the subsequent stage of the low noise amplifier 110, which is low in steepness, fails to sufficiently suppress the undesired wave signal, and as a result of the first frequency down-conversion, the undesired wave signal (frequency (fLO1+fLO2−fLO3)+fIF1e) remains as shown with broken line in FIG. 12A. Furthermore, in the case where radio transmission distance is short, radio reference signals 73c having large signal levels cause distortion in the low noise amplifier 110 and the frequency mixer 119, by which the undesired wave signal (frequency fLO1+fLO2fIF1e) is strengthened.

As shown in FIG. 12B, the undesired wave signal (frequency (fLO1+fLO2−fLO3)+fIF1e) is completely removed from the second IF multiple signal 74 by the filter 172 as the first filter. Consequently, it becomes possible to normally operate the subsequent reference signal reproduction/frequency conversion circuit (second down-converter) 12N, and to reduce deterioration in CN (Carrier Noise ratio) indicating signal quality, in the second frequency conversion, thereby making it possible to demodulate high-quality signals.

More specific description of this operation will be given below. A desired radio multiple signal 73 being an intermediate frequency multiple signal is selected via the filter 172 as described above and passes the filter 172. Then, the radio multiple signal 73 is amplified by the intermediate frequency amplifier (IF amplifier) 159 and is divided into two signals via the signal division circuit 161. The signal division circuit 161 is formed of a Wilkinson two-way divider having isolation characteristics between respective output ports.

Consequently, it becomes possible to suppress unwanted leakage signals in each output port and to normally operate each circuit. It is to be noted that it is acceptable to employ a branch amplifier having functions of both the intermediate frequency amplifier 159 and the signal division circuit 161. Although unshown, the branch amplifier is composed of one input section and two output sections, and output circuits of these two output sections take two outputs from transistors connected in parallel. Consequently, between the output ports of these two output sections, considerably large inter-port isolation can be ensured.

Next, the second IF multiple signal 74 is divided in the signal division circuit 161 into two signals going to the transmission line 162 constituting the first path P1 and to the transmission line 163 constituting the second path P2, and in the first path P1, the signal is directly inputted into the frequency mixer section 12a. In the second path P2, the bandpass filter 171 allows a reference signal 74c of the frequency (fLO1+fLO2−fLO3) contained in the second IF multiple signal 74 to band-pass. The reference signal 74c is amplified in the amplifier 180, and operates as a local oscillation signal of the frequency mixer section 12a synchronized with the second IF multiple signal 74. More particularly, the reference signal 74c is inputted into the frequency mixer section 12a, and the frequency mixer section 12a performs frequency down-conversion of the second IF multiple signal 74 so as to reproduce the transmitting-side input signal 5e (frequency fIFe) as an output signal 76 (frequency fIFe). The reproduced output signal 76 (frequency fIFe) is amplified by the amplifier 195 if necessary, and is outputted from the output port 500. The output signal 76 is, in one example, separated or divided by a blanching filter (or divider) 190, and is inputted into the terrestrial broadcasting/satellite broadcasting tuner 30 in the TV receiver 31.

Description is now given of signal process for reproducing a plurality of broadcasting waves from the second IF multiple signal 74. The second IF multiple signal 74 is subjected to frequency down-conversion with use of the reference signal 74c contained in the second IF multiple signal 74. The process of producing an output signal 76 as a demodulated signal (frequency fIFe) by the frequency down-conversion can be described as follows.

Figure 13A:
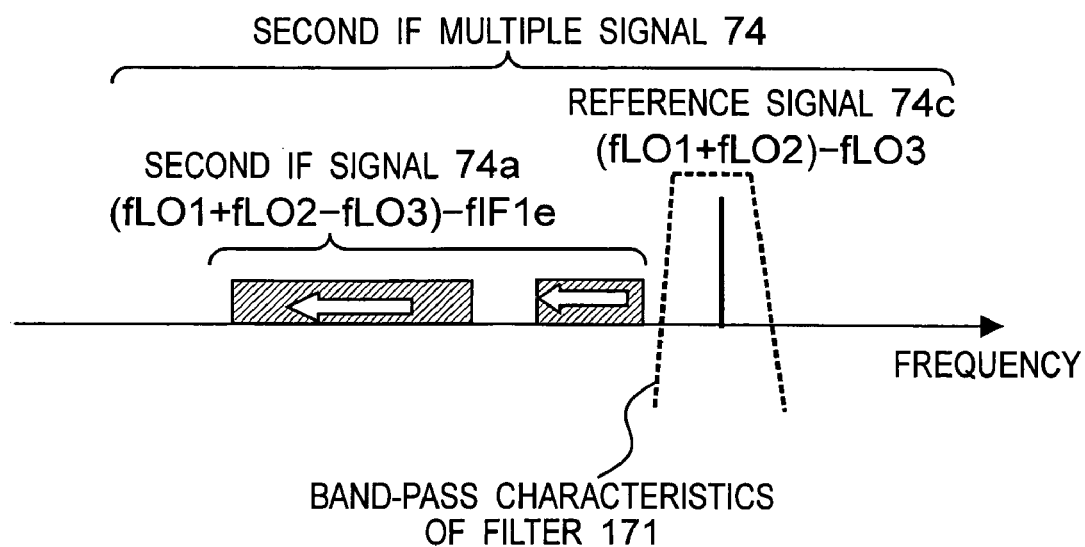
FIG. 13A is a view showing a frequency allocation of a second IF multiple signal 74 inputted into a reference signal reproduction/frequency conversion circuit 12N of the millimeter-waveband radio receiver 10N in the fourth embodiment.
Figure 13B:
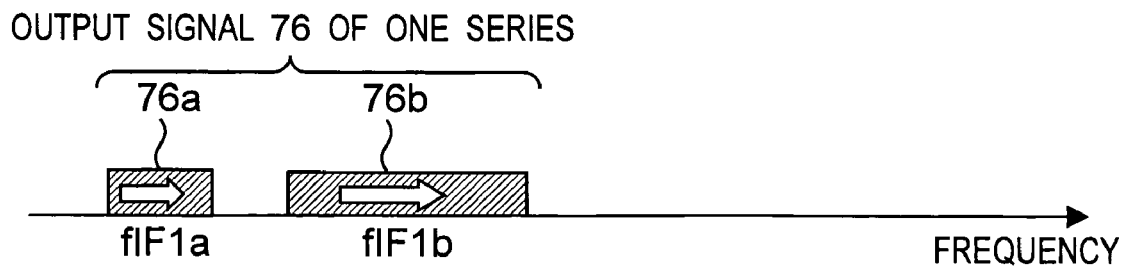
FIG. 13B is a view showing a frequency allocation of an output signal 76 produced in the reference signal reproduction/frequency conversion circuit 12N.

Namely, through the frequency down-conversion of the second IF multiple signal 74 shown in FIG. 13A, the frequency (fLO1+fLO2−fLO3) of the reference signal 74c is subtracted from the frequency of the first IF signal 74a ((fLO1+fLO2−fLO3)−fIF1e) as shown in FIG. 13B.

As described above, in the process of frequency down-conversion of the second IF multiple signal 74 with the reference signal 74c contained in the second IF multiple signal, a reference signal 74c is extracted from the second IF multiple signal 74 by a narrow-band pass filter 171, and the reference signal 74c is amplified in the amplifier 180 to increase its power level. This allows linear operation of the frequency mixer section 12a.

Moreover, since the undesired wave signal generated in the stage prior to the second down-conversion is removed by the first filter 172 after the first down-conversion, it becomes possible to limit the second IF multiple signals to desired intermediate frequency multiple signals to be transmitted. Therefore, with the narrow-band pass filter 171, only the reference signals can be extracted from the intermediate frequency multiple signals with more reliability.

In the case where the first filter 172 is not present, the filter 171 as the second filer is generally an narrow-band filter, and therefore in the vicinity of the reference signal 73c, only the reference signal 73c can be extracted and filtered as shown in FIG. 12A, though in the bands one octave band or more higher than the reference signal 73c or in the bands in the vicinity of DCs, the suppression ratio is not sufficient. Consequently, undesired waves and the like are selected and filtered through the filter 171, and then amplified in the amplifier 180. This attributes to signal deterioration in the second frequency conversion.

In contrast in the present embodiment, combination of the first filter 172 and the second filter 171 allows only the reference signal to be faithfully amplified in the amplifier 180, so that a reference signal component containing little noise component and undesired wave component can be reproduced (effect 1).

Moreover, in the case where the first filter 172 is not present, on the side of the transmission line 162 constituting the other path P1, the frequency component ((fLO1+fLO2−fLO3)+fIF1e) of the undesired wave signal is inputted in the frequency mixer section 12a together with the second IF multiple signal (intermediate frequency multiple signal) 74, which disturbs normal frequency down-conversion. As a result, the CN quality of the down-converted output signal is deteriorated.

In contrast in the present embodiment, selecting and filtering the desired second IF multiple signal (intermediate frequency signal) 74 with the first filter 172 enables the second frequency conversion to function normally as single sideband down conversion (effect 2).

As a result of these two effects, second frequency down-conversion with good characteristics is achieved, making it possible to reduce CN deterioration due to the second down-conversion.

Figure 9A:
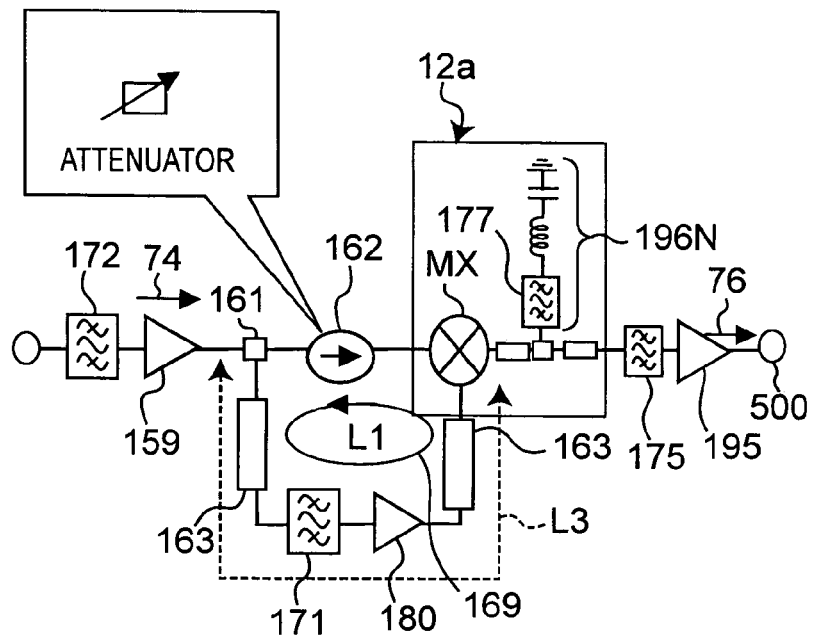
FIG. 9A is a block diagram showing a frequency mixer section 12a in a reference signal reproduction/frequency conversion circuit 12N of the fourth embodiment.

As shown in FIG. 9A, in the reference signal reproduction/frequency conversion circuit 12N constituting the second frequency down-conversion section, the output side of the frequency mixer section 12a is connected to the trap circuit 196N having a filter 177 for extracting reference signals. The trap circuit 196N constitutes a feedback circuit for feeding reference signals back to the input side, in which the component of the reference signal 74c leaking to the output side of the frequency mixer section 12a is trapped and fed back to the frequency mixer section 12a. Consequently, the fed-back reference signal 74c can be utilized as a local oscillation source of the mixer section. This makes it possible to enhance frequency conversion gain of the frequency mixer section 12a, to enlarge a linear operation region with respect to the input/output characteristics of the frequency mixer section 12a so as to widen the frequency bandwidth, and to increase the radio transmission distance.

Further, as shown in FIG. 9A, in the reference signal reproduction/frequency conversion circuit 12N, inserting an isolator (or attenuator) 162 to the input side of the frequency mixer section 12a makes it possible to reduce a feedback amount of a regeneration loop 169 in the reference signal reproduction/frequency conversion circuit 12N. As result, the regeneration loop 169 can be turned to be a negative feedback loop, which makes it possible to eliminate undesired wave oscillation and to implement normal operation of the frequency conversion circuit 12N.

Figure 9B:
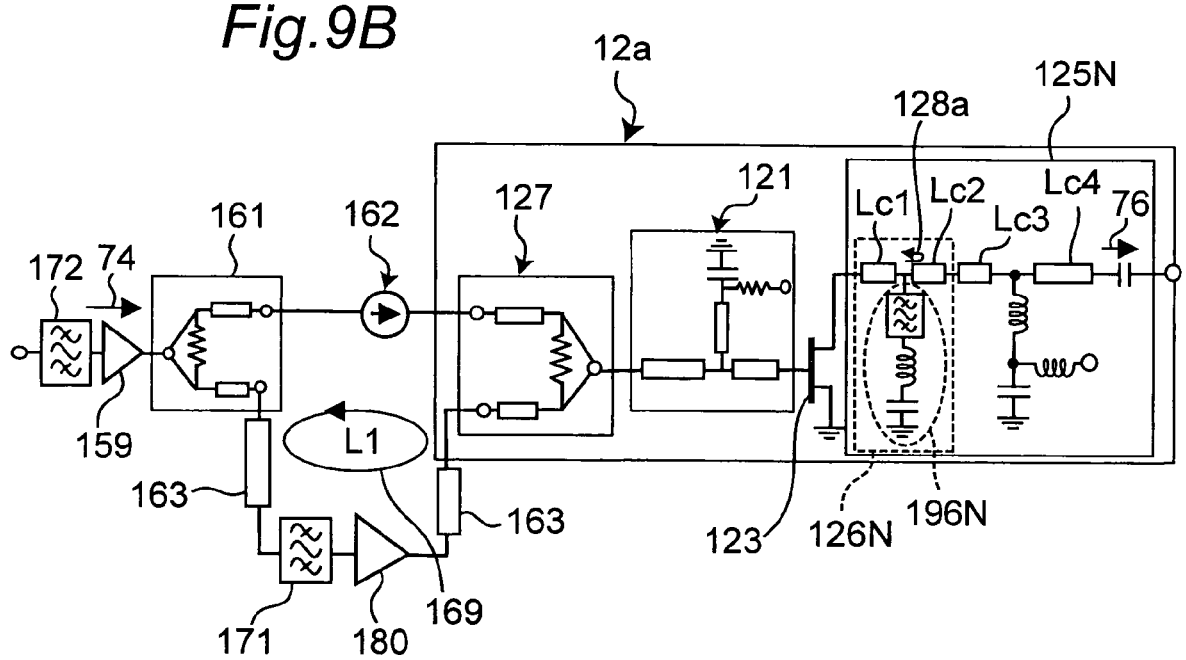
FIG. 9B is a block diagram showing a modified example of the frequency mixer section 12a of the fourth embodiment.

Moreover, as shown in FIG. 9B, the frequency mixer section 12a may be a gate injection-type or a base injection-type mixer section having a common source or emitter source microwave transistor 123, a Wilkinson power combiner 127, an input circuit 121 and an output circuit 125N. The power combiner 127, the input circuit 121 and the microwave transistor 123 share the same configuration with the combiner 127, the input circuit 121 and the microwave transistor 123 shown in FIG. 4B in the second embodiment. Moreover, the output circuit 125N has a short circuit 126N shown in FIG. 9B instead of the short circuit 126 in the output circuit 125 shown in FIG. 4B of the. Moreover, as shown in FIG. 9B, the power divider 161 shares the same configuration with the power combiner 127.

According to this configuration, particularly, due to the port isolation of the power divider 161 and the port isolation of the power combiner 127 constituting a signal input port and a local oscillation signal input port, a feedback amount of the regeneration loop 169 can be reduced, which makes it possible to stabilize the regeneration loop 169. Furthermore, signals from the input circuit 121 are structured to be inputted from the base side or the gate side of the microwave transistor 123, by which the frequency mixer section 12a also has an amplification function. Therefore, the frequency mixer section 12a can perform stable frequency conversion with high conversion gain and less undesired oscillation and the like.

In addition, the frequency mixer section 12a can perform frequency conversion of intermediate frequency signal waves with little frequency signal source power. This makes it possible to increase radio transmission distance and to elongate radio transmission distance. More particularly, even when the power of a reproduced reference signal 74c is small, low-loss frequency conversion can be performed with small reference signal power, thereby allowing frequency conversion with high CN (Carrier Noise ratio) and sufficient quality.

In addition, according to the thus-structured radio receiver, the undesired wave signal generated after the first down-conversion can be removed by the first filter 172 in the stage prior to the second down-conversion. Consequently, it becomes possible to limit signals transmitted from the first filter 172 to the intermediate frequency amplifier 159 to desired intermediate frequency multiple signals which are transmission target signals. As a result, only the reference signals can be extracted from the intermediate frequency multiple signals via the second filter 171. Consequently, the amplifier 180 can faithfully amplify only the reference signals, so that reference signals containing little noise component and undesired wave component can be reproduced. In addition, since a broadband filter is not present in the first path P1, a loop L1 composed of the first path P1 and the second path P2 does not constitute a broadband resonator, which makes it possible to provide a stable loop without forming a positive feedback loop which oscillates in a certain frequency.

Figure 10:
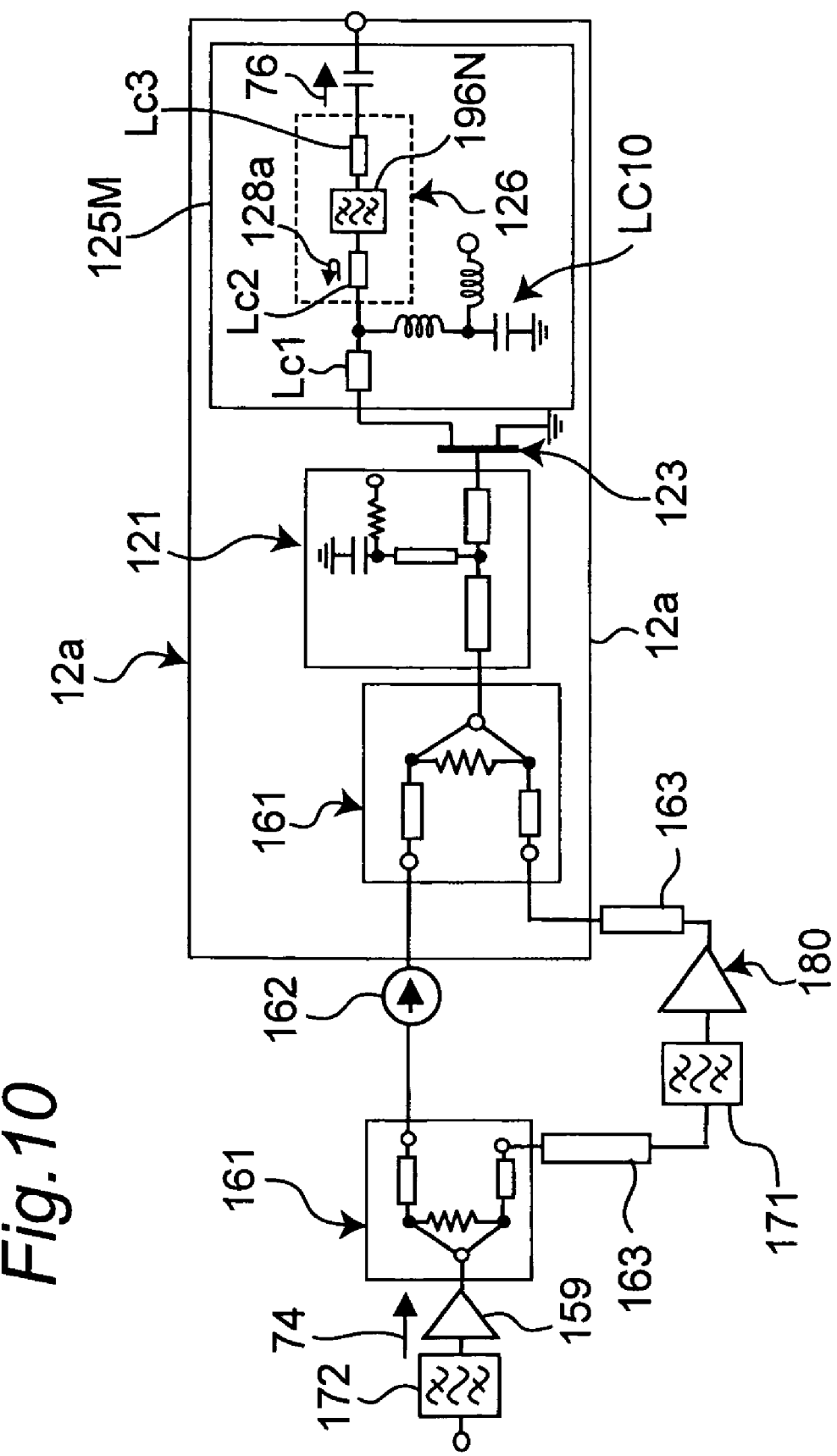
FIG. 10 is a block diagram showing another modified example of the frequency mixer section 12a of the fourth embodiment.

It is to be noted that in the fourth embodiment, the frequency mixer section 12a shown in FIG. 9B may have an output circuit 125M having a short circuit 126 disposed in the rear stage of a short circuit LC10 as shown in FIG. 10 instead of the output circuit 125N.

Fifth Embodiment

Figure 14:
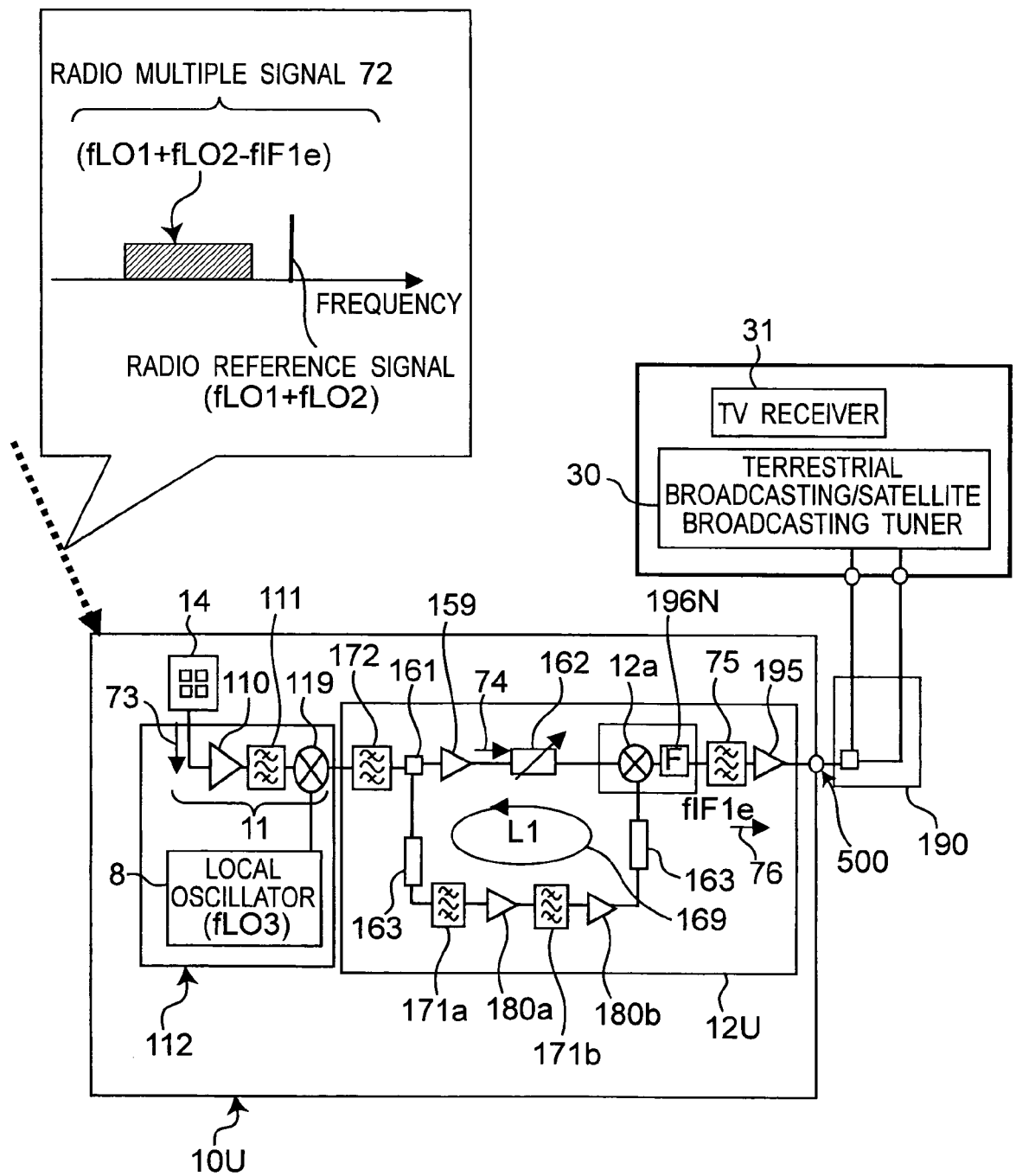
FIG. 14 is a block diagram showing a microwave-band radio receiver 10U included in a microwave-band radio communication system of a fifth embodiment of the present invention.

Description is now given of a fifth embodiment of the present invention with reference to FIG. 14. In the fifth embodiment, the microwave-band radio transmitter 9 is similar in configuration to the fourth embodiment. In the fifth embodiment, the microwave-band radio receiver 10N in the fourth embodiment is replaced with a microwave-band radio receiver 10U shown in FIG. 14.

The microwave-band radio receiver 10U is similar to the microwave-band radio receiver 10N in the configuration of the frequency conversion section 112. A reference signal reproduction/frequency conversion circuit 12U as the second down-converter is different from the reference signal reproduction/frequency conversion circuit 12N in the fourth embodiment.

As shown in FIG. 14, the reference signal reproduction/frequency conversion circuit 12U in the microwave-band radio receiver 10U in the fifth embodiment is different from the reference signal reproduction/frequency conversion circuit 12N in the fourth embodiment (See FIG. 8) in the point that a filter 171a, an amplifier 180a, a filter 171b and an amplifier 180b are sequentially connected in series to between two transmission lines 163 in a second path P2. Moreover, in the fifth embodiment, the reference signal reproduction/frequency conversion circuit 12U is different from the reference signal reproduction/frequency conversion circuit 12N in the point that the an amplifier 159 is inserted to between a division circuit 161 and a transmission line 162. In the reference signal reproduction/frequency conversion circuit 12N, the amplifier 159 was connected to between the filter 172 and the division circuit 161.

In the reference signal reproduction/frequency conversion circuit 12U of the fifth embodiment, the first filter 172 passes a second IF multiple signal 74 that is an intermediate frequency multiple signal from a frequency mixer 119 of a frequency conversion/reception circuit 11. The second IF multiple signal 74 is divided into two signals going to a first path P1 and a second path P2 via the power divider 161. In the first path P1, the second IF multiple signal 74 is amplified by the amplifier 159, and is inputted into a mixer section 12a through the transmission line 162 constituting a variable attenuator. In the second path P2, a reference signal is extracted from the second IF multiple signal 74 by the filter 171a and is amplified in the amplifier 180a. The amplified reference signal is further extracted and amplified by the next filter 171b and amplifier 180b.

Namely, in this embodiment, the reference signal extracted and amplified in two steps composed of the filter 171a and the amplifier 180a as well as the filter 171b and the amplifier 180b is inputted into the mixer section 12a.

In the fifth embodiment, as with the case of the fourth embodiment, after first down-conversion of a radio multiple signal 73, an undesired wave component can be removed by a first filter 172 in the stage prior to second down-conversion. Therefore, it becomes possible to limit signals sent to the power divider 161 to the second IF multiple signals 74 which are transmission target signals. Therefore, by means of the filters 171a, 171b serving as the second filter, only a reference signal 74c can be extracted from the second IF multiple signal 74. Therefore, only the reference signal 74c can be faithfully amplified in the amplifiers 180a, 180b, so that only the reference signals containing little noise component and undesired wave component can be reproduced.

Moreover, in the fifth embodiment, the amplifier 159 is present in the first path P1 extending to the mixer section 12a, so that a loop L1 (169) composed of the first path P1 and the second path P2 constitutes a negative feedback loop with the isolation action of the amplifier 159, thereby allowing obtention of a stable loop. Further, with each of the amplification degree of the amplifier 159, the transmission line 162 constituting a variable attenuator and the amplifiers 180a, 180b, the balance between the second IF signal 74a which is a desired signal and the reference signal 74c may be adjusted. More particularly, by decreasing a ratio (power of second IF signal 74a)/(power of reference signal 74c), the local oscillation port of the mixer section 12a may be driven by the reference signal 74c of local oscillation being larger in power than the desired second IF signal 74a. Therefore, the operation of the mixer section 12a may be brought close to the ideal mixer operation, which makes it possible to achieve sufficient frequency conversion. As a result, second frequency down-conversion of good characteristics is achieved, which can decrease CN (Carrier/Noise ratio) deterioration by the second down-conversion.

Sixth Embodiment

Figure 15:
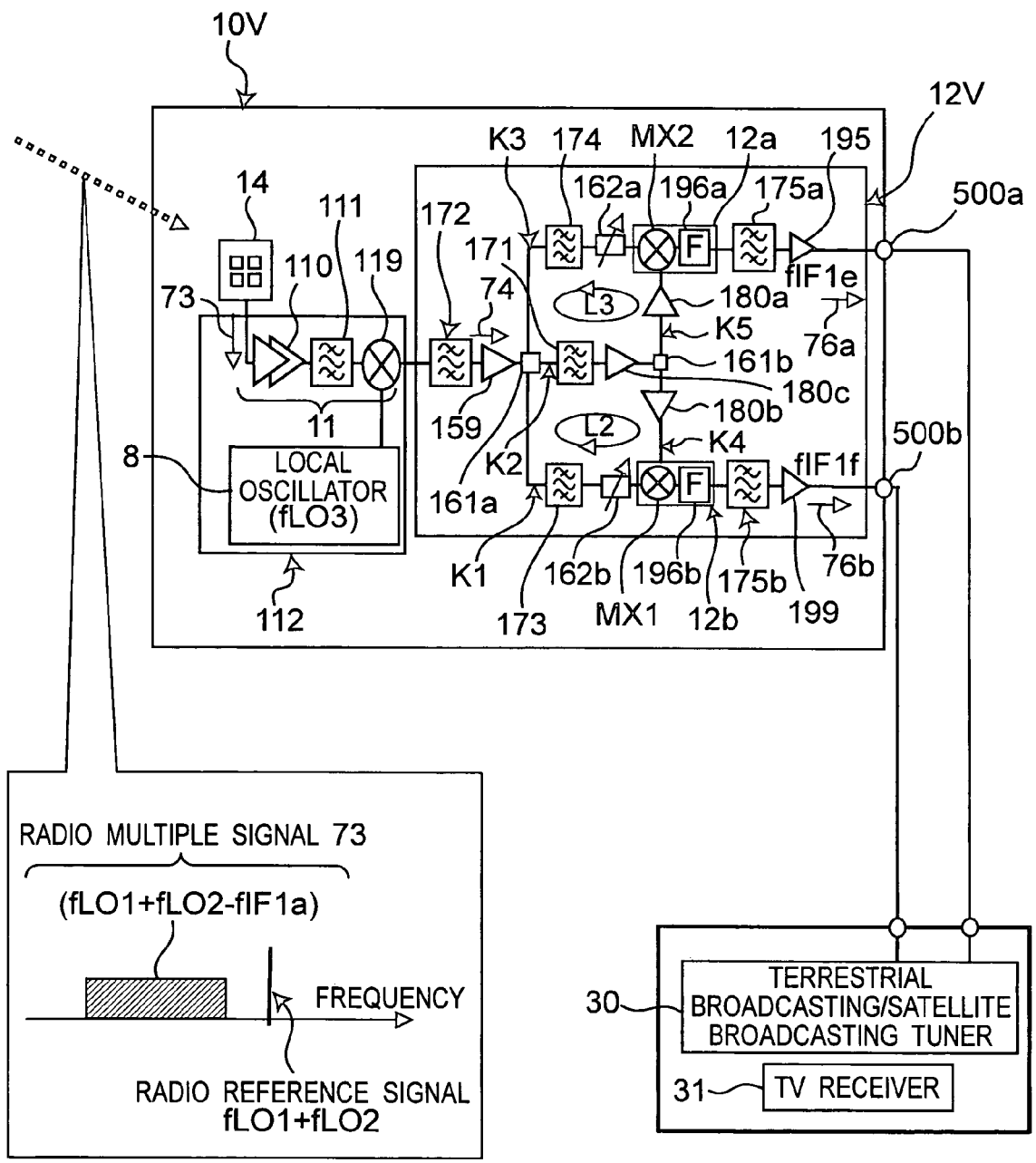
FIG. 15 is a block diagram showing a microwave-band radio receiver 10V included in a microwave-band radio communication system of a sixth embodiment of the present invention.

Description is now given of a sixth embodiment of the present invention with reference to FIG. 15. In the sixth embodiment, the microwave-band radio receiver 10N in the fifth embodiment is replaced with a microwave-band radio receiver 10V shown in FIG. 15.

The microwave-band radio receiver 12V is similar to the microwave-band radio receiver 10N in the configuration of the frequency conversion section 112 (See FIG. 10). A reference signal reproduction/frequency conversion circuit 12V as the second down-converter is different from the reference signal reproduction/frequency conversion circuit 12N in the fourth embodiment.

As shown in FIG. 15, the reference signal reproduction/frequency conversion circuit 12V in the microwave-band radio receiver 10v in the sixth embodiment is different from the reference signal reproduction/frequency conversion circuit 12N in the fourth embodiment in the point that the loop L1 is replaced with loops L2 and L3.

More particularly, as shown in FIG. 15, the reference signal reproduction/frequency conversion circuit 12V has a first divider 161a connected to the output side of an intermediate frequency amplifier 159, and first to third paths K1 to K3 connected to the divider 161a.

The first path K1 has a first path filter 173, a variable attenuator 162b and a first mixer section 12b sequentially connected in series. The second path K2 has a reference signal extraction filter 171, an amplifier 180c and a second divider 161b sequentially connected in series. Moreover, the third path K3 has a third path filter 174, a variable attenuator 162a and a second mixer section 12a sequentially connected in series.

A fourth path K4 is connected to between the second divider 161b and the first mixer section 12b, and the fourth path K4 has a first amplifier 180b. Moreover, a fifth path K5 is connected to between the second divider 161b and the second mixer section 12a, and the fifth path K5 has a second amplifier 180a. The second mixer section 12a has a mixer MX1 and a feedback circuit 196a, and the first mixer section 12b has a mixer MX2 and a feedback circuit 196b. The feedback circuits 196a, 196b share the same configuration with the trap circuit 196N in FIG. 9A.

Moreover, the first, second and fourth paths K1, K2, K4 constitute a loop L2, while the second, third and fifth paths K2, K3 and K5 constitute a loop L3.

A filter 175a and an amplifier 195 are sequentially connected in series between the second mixer section 12a and a second output port 500a. Moreover, a filter 175b and an amplifier 199 are sequentially connected in series between the first mixer section 12b and a first output port 500b.

In the sixth embodiment, a radio multiple signal 73 is subjected to first down-conversion by the frequency conversion section 112 and is inputted into the reference signal reproduction/frequency conversion circuit 12V. In the reference signal reproduction/frequency conversion circuit 12V, first, a second IF multiple signal 74 is passed by the filter 172, and is amplified by the intermediate frequency amplifier 159. Then, the second IF multiple signal 74 is divided by the first divider (power divider) 161a into three signals going to the first path K1, the second path K2 and the third path K3.

In the second path K2, a reference signal 74c is extracted by the reference signal extraction filter 171. The extracted reference signal 74c is amplified in the amplifier 180c, and is divided by the second divider 161b into signals going to the fourth path K4 and the fifth path K5. The reference signal 74c is amplified by the first amplifier 180b in the fourth path K4 and transmitted to the first mixer section 12b to be a local oscillation signal of the first mixer section 12b. Moreover, the reference signal 74c is amplified in the second amplifier 180a in the fifth path K5 and transmitted to the second mixer section 12a as a local oscillation signal of the second mixer section 12a.

Figure 16A:
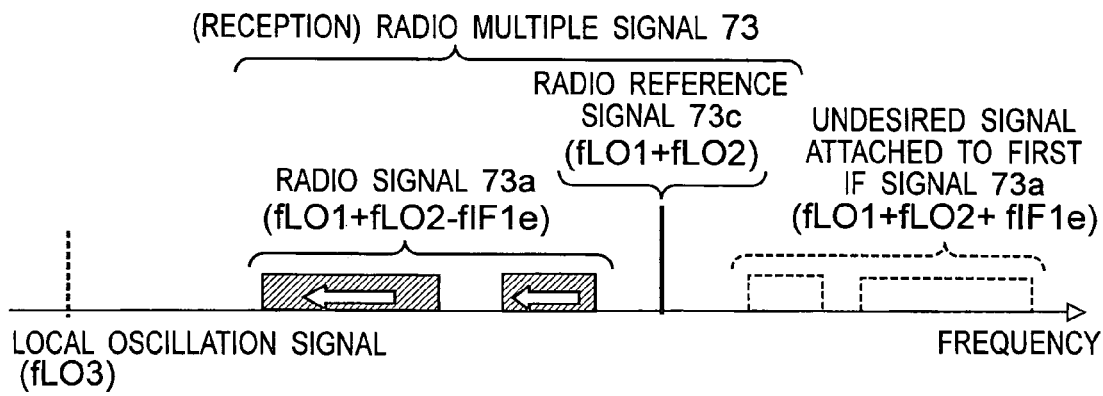
FIG. 16A is a view showing a frequency allocation of a radio multiple signal 73 received by the microwave-band radio receiver 10V in the sixth embodiment.
Figure 16B:
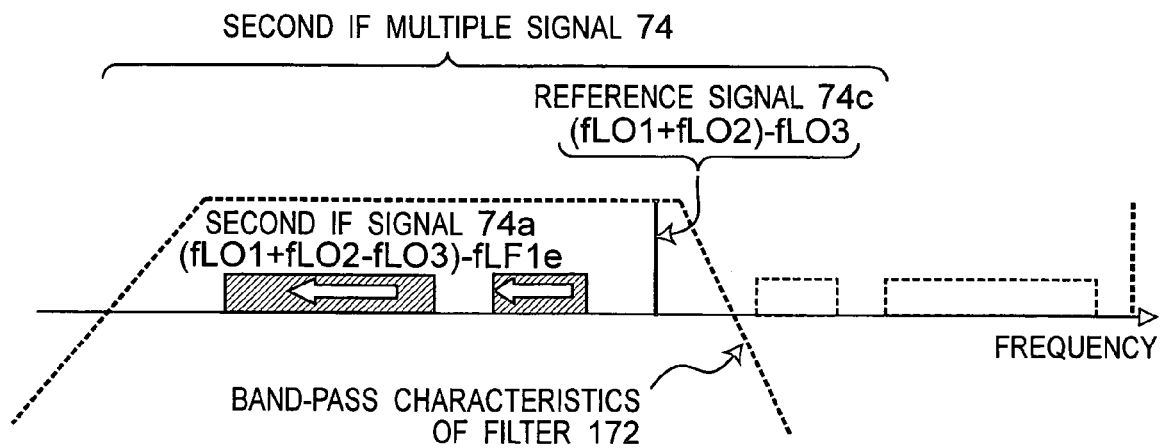
FIG. 16B is a view showing a frequency allocation of a second IF multiple signal 74 inputted into a reference signal reproduction/frequency conversion circuit 12V in the sixth embodiment.
Figure 16C:
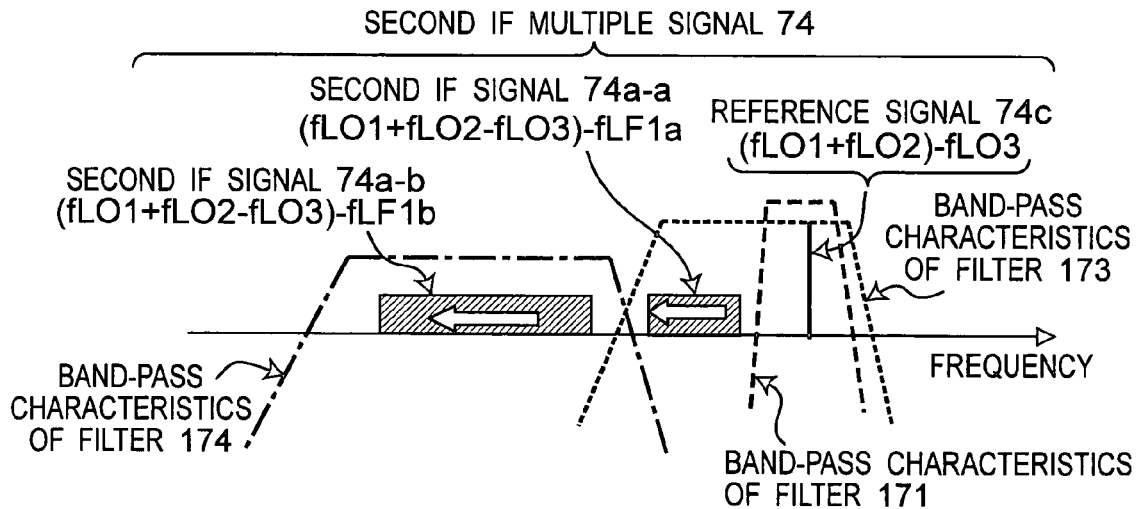
FIG. 16C is a view showing a frequency allocation of the state of band segmentation of the second IF multiple signal 74.

In the first and third paths K1 and K3, the second IF multiple signals 74 are subjected to band separation by the first path filter 173 and the third path filter 174 as shown in FIG. 16C. Consequently, the second IF signal 74a is band-divided into a second IF signal 74a-a and a second IF signal 74a-b. More particularly, the second IF multiple signal 74 is divided according to the band-pass characteristics of the first path filter 173 and the band-pass characteristics of the third path filter 174 as shown in FIG. 16C. It is to be noted that FIG. 16A and FIG. 16B are identical to FIG. 12A and FIG. 12B, which are frequency characteristic views showing the radio multiple signal 73 and the second IF multiple signal 74.

Figure 17A:
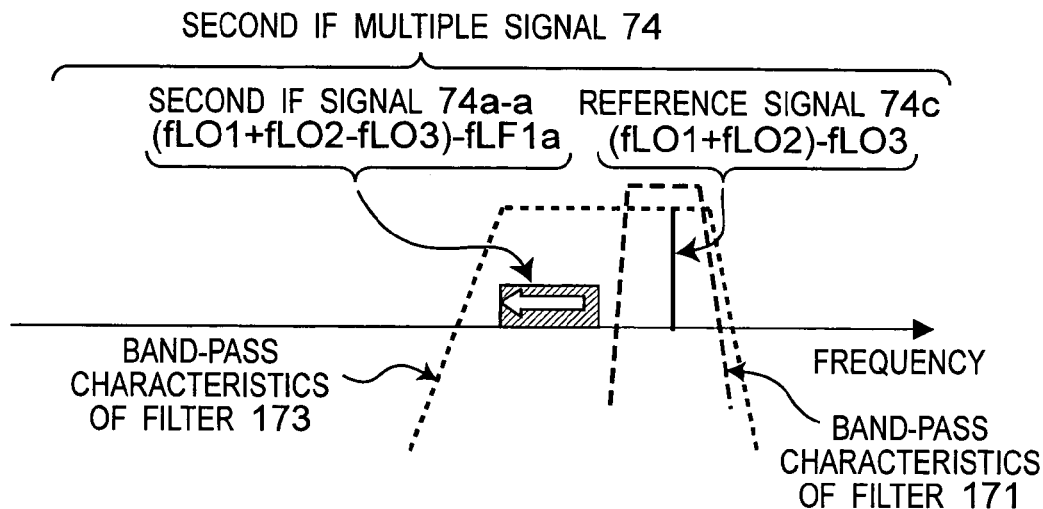
FIG. 17A is a view showing a frequency allocation of a second IF signal 74a-a separated in a first path filter 173 in the reference signal reproduction/frequency conversion circuit 12V.
Figure 17B:
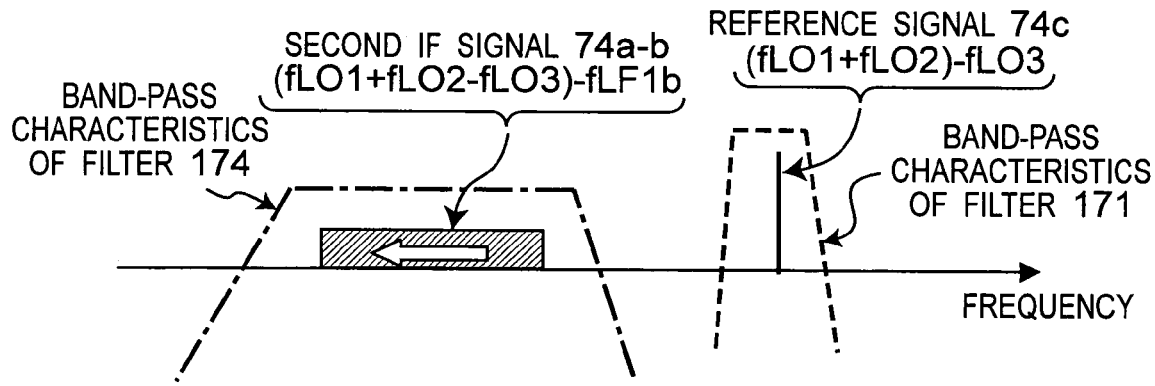
FIG. 17B is a view showing a frequency allocation of a second IF signal 74a-a separated in a third path filter 174 in the reference signal reproduction/frequency conversion circuit 12V.

FIG. 17A shows the frequency allocation of the second IF signal 74a-a filtered via the filter 173, and FIG. 17B shows the frequency allocation of the second IF signal 74a-b filtered via the third path filter 174. It is to be noted that FIG. 17A and FIG. 17B also show the state in which the reference signal 74c is extracted by the band-pass characteristics of the reference signal extraction filter 171.

As shown in FIG. 17A, a signal obtained via the first path filter 173 contains a second IF signal 74a-a as a part of a desired signal and a reference signal 74c. Moreover, as shown in FIG. 17B, a signal obtained via the third path filter 174 contains a second IF signal 74a-b as a part of a desired signal but does not contain a reference signal 74c. As shown in FIG. 17A and FIG. 17B, the frequency of the reference signal 74c is (fLO1+fLO2)−fLO3, the frequency of the second IF signal 74a-a is (fLO1+fLO2−fLO3)−fIF1a, and the frequency of the second IF signal 74a-b is (fLO1+fLO2−fLO3)−fIF1b.

In a specific example, when a terrestrial digital broadcast signal (frequency fIF1a) and a satellite broadcast signal (frequency fIF1b) are used as the modulated wave signals 5a and 5b shown in FIG. 8, the second IF reference signal 74c and the second IF signal 74a-a corresponding to the terrestrial digital broadcast signal are selected and passed via the first path filter 173, whereas via the third path filter 174, the second IF signal 74a-b corresponding to the satellite broadcast signal is selected and passed.

Figure 17C:
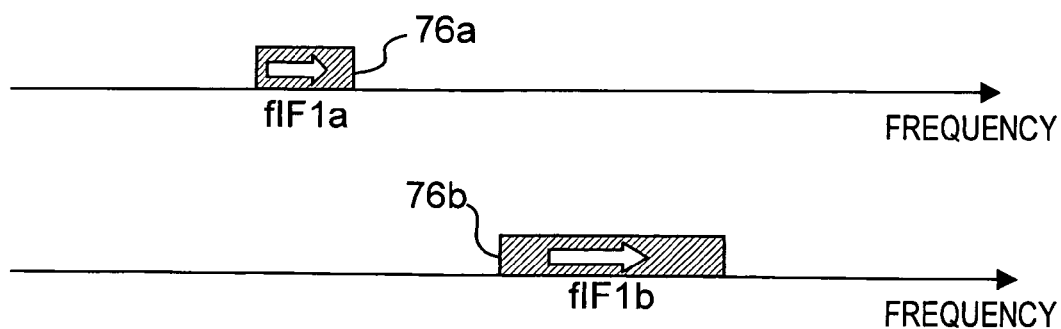
FIG. 17C is a view showing a frequency allocation of a modulated wave signal 76a and a modulated wave signal 76b outputted from the reference signal reproduction/frequency conversion circuit 12V.

Then, the second IF signals 74a-a and the second IF signal 74a-b are level-adjusted in the attenuators 162a, 162b, and then become input signals into the second and first mixer sections 12a, 12b, where second frequency conversion is performed with use of the local oscillation signals extracted via the fifth and fourth paths K5, K4. By the second frequency conversion, a demodulated wave signal 76a corresponding to the terrestrial broadcast signal (fIF1a) and a demodulate wave signal 76b corresponding to the satellite broadcast signal (frequency fIF1b), which are input signal waves to the millimeter-waveband radio transmitter 9 shown in FIG. 8, are obtained as shown in FIG. 17C.

It is to be noted that the amplifiers 162a, 162b, which are weak attenuators of about 0.1 dB to 33B, may be replaced with isolators and amplifiers (the input side should be the filters 173, 174 side). With the attenuators, isolators and amplifiers (the input side should be the filters 173, 174 side), the loop L2 composed of the first and second paths K1 and K2, and the loop L3 composed of the first and third paths K1 and K3 can be brought close to the negative feedback loop. This makes it possible to perform the second frequency conversion with the reference signal 74c more stably.

In addition, in the sixth embodiment, since the second IF multiple signal 74 is band-divided by the first path filter 173 and the third path filter 174, so that the second frequency conversion is performed in narrow-bands, it becomes possible to reduce the influence of harmonic distortion, particularly, second and third distortion involved in frequency conversion. Further, the feedback circuits 196a, 196b in the output sections of the second mixer section 12a and the first mixer section 12b are circuits composed of an inductor (L) and a capacitor (C), and this allows band limiting. Consequently, it becomes possible to increase conversion gain in the mixer sections 12a, 12b and to increase transmission distance.

Further, in the sixth embodiment, the amplifiers 180a, 180b, 180c are disposed after the first divider 161a which divides a second IF multiple signal 74 into three, so that the local oscillator sections are communized by the frequency mixer sections 12a, 12b, and the amplifiers 180a, 180b are disposed after the second divider 161b which divides a reference signal 74c into two signals. Consequently, the isolation function by the amplifiers 180a to 180c makes it possible to prevent leakage of the respective second IF signals 74a-a and 74a-b from the local oscillation ports of the mixer sections 12a, 12b.

Although in the sixth embodiment, description has been given of the case in which the terrestrial broadcast wave and the satellite broadcast wave haven been employed as the input modulated wave signals 5a and 5b, the input modulated wave signals 5a and 5b may be a combination of two satellite broadcast waves, a combination of a satellite broadcast wave and a CATV (Cable Television) signal and the like, and further, for example, modulated wave signals in IF (Intermediate Frequency) stage or in RF (Radio Frequency) stage as used in radio LANs may be used as the input modulated wave signals. Although in the present embodiment, the radio communication system for transmitting and receiving millimeter-waveband radio signals has been described, the radio signals are not limited to those in millimeter-wavebands, and therefore the present invention is applicable to systems for transmitting and receiving radio signals in microwave frequency bands including the millimeter-wavebands.

Seventh Embodiment

Description is now given of a seventh embodiment of the present invention. The seventh embodiment is a modified example of the sixth embodiment.

More particularly, in the seventh embodiment, the first path filter 173 included in the first path K1 shown in FIG. 15 is used as a high-pass filter, while the third path filter 174 included in the third path K3 is used as a low-pass filter. This reduces the size of the loops L2 and L3 and reduces the size of the circuit shape, thereby making it possible to increase the oscillation frequencies of the loops L2, L3 and enabling the loops L2, L3 to operate more stably. The mechanism of this effect will be described below.

Figure 18A:
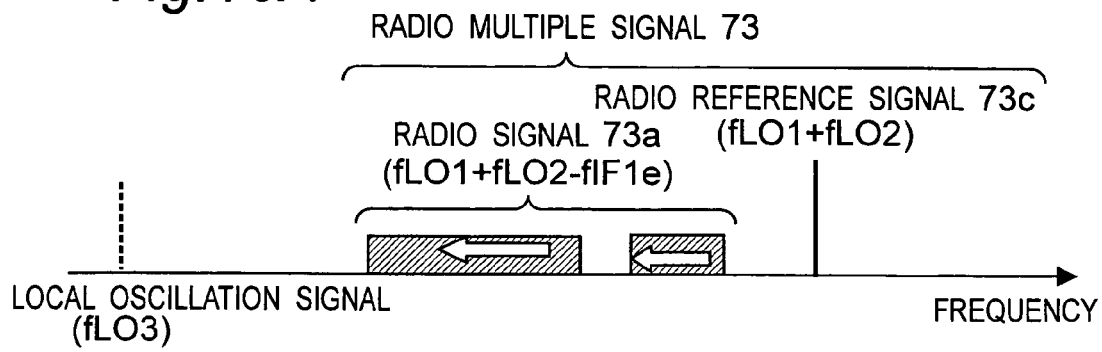
FIG. 18A is a frequency allocation view showing a radio multiple signal 73.
Figure 18B:
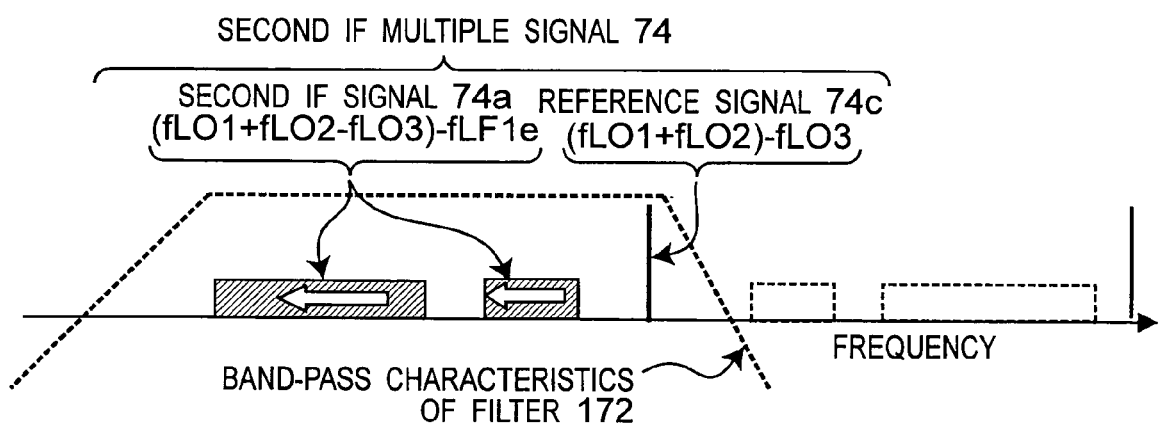
FIG. 18B is a view showing a frequency allocation of a second IF multiple signal 74.
Figure 18C:
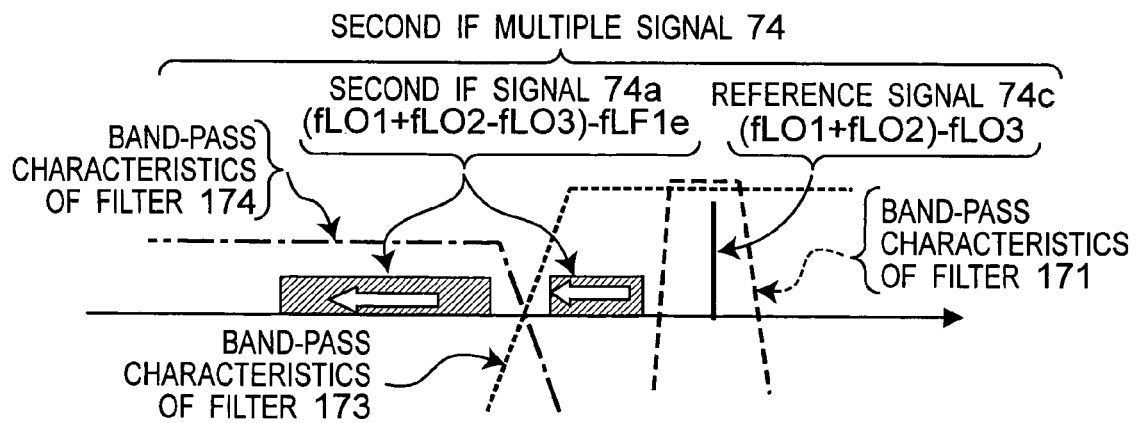

FIG. 18C shows pass band frequency of a second IF multiple signal 74 obtained by separation through the respective filters 173, 174. More particularly, the filter 173 shows the band-pass characteristics shown by doted lines, and the filter 174 shows the band-pass characteristics shown by chain lines. FIG. 18A is a frequency allocation view showing a radio multiple signal 73, while FIG. 18B is a frequency allocation view showing a second IF multiple signal 74.

Figure 19A:
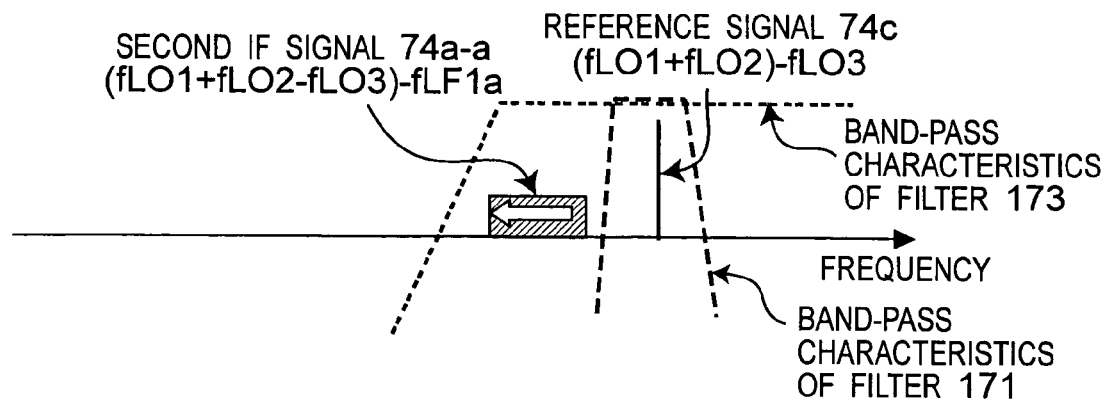
FIG. 19A is a view showing the state of a frequency allocation in which the first path filter 173 in the reference signal reproduction/frequency conversion circuit 12V of the sixth embodiment allows a reference signal 74c and a second IF signal 74a-a to pass by its band-pass characteristics.
Figure 19B:
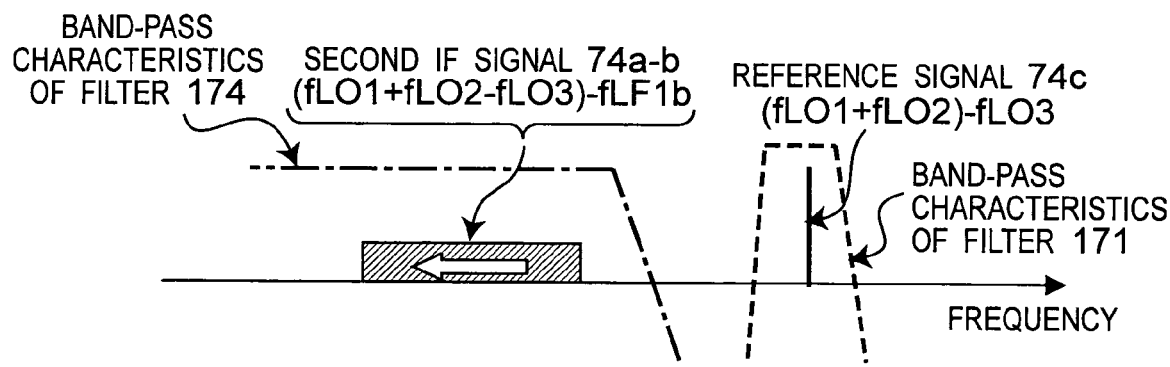
FIG. 19B is a view showing the state of a frequency allocation in which the third path filter 174 in a third path K3 in the reference signal reproduction/frequency conversion circuit 12V allows only a second IF signal 74a-b to pass by its band-pass characteristics.
Figure 19C:
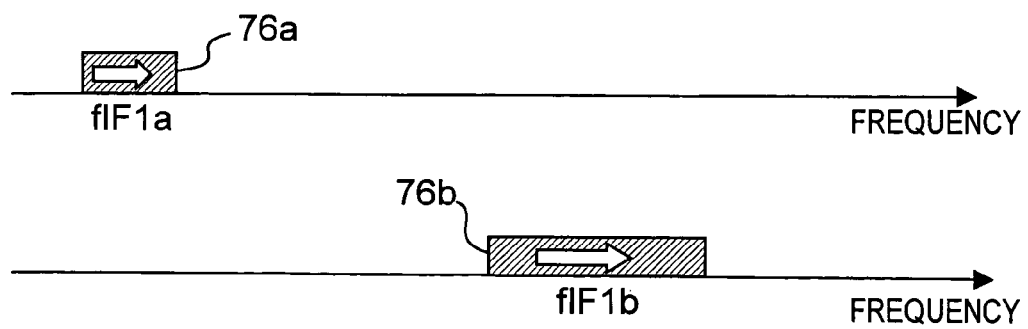
FIG. 19C is a view showing a frequency allocation of a modulated wave signal 76a (frequency fIF1a) and a modulated wave signal 76b (frequency fIF1b) outputted from the reference signal reproduction/frequency conversion circuit 12V.

As shown in FIG. 19A, the first path filter (high-pass filter) 173 in the first path K1 passes the reference signal 74c and the second IF signal 74a-a by its band-pass characteristics. As shown in FIG. 19B, the third path filter (low-pass filter) 174 in the third path K3 passes only the second IF signal 74a-b by its band-pass characteristics. FIG. 19A and FIG. 19B also show the state in which the bandpass filter 171 in the second path K2 extracts the reference signal 74c. Moreover, FIG. 19C is identical to FIG. 17C showing a modulated wave signal 76a corresponding to the terrestrial signal (frequency fIF1a) and a modulated wave signal 76b corresponding to the satellite broadcast signal (frequency fIF1b).

Figure 20A:
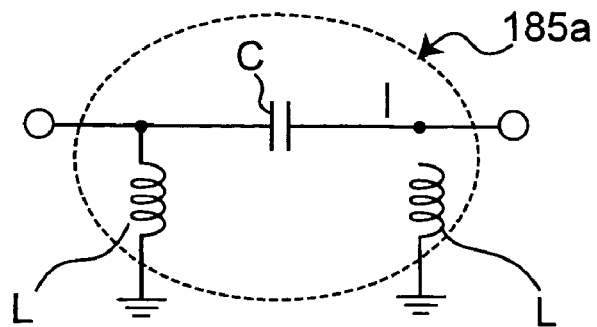
FIG. 20A is a view showing a basic equivalent circuit (resonator 185a) of the first path filter (high-pass filter) 173.
Figure 20B:
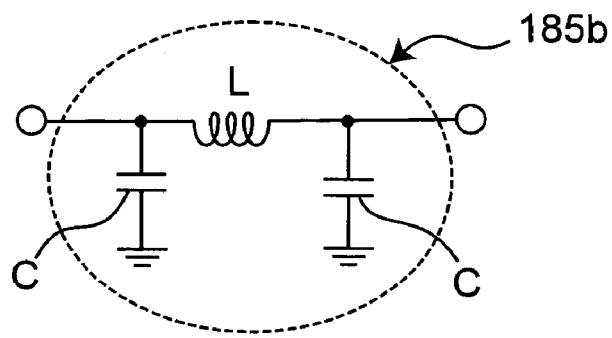
FIG. 20B is a view showing a basic equivalent circuit (resonator 185b) of the third path filter (low-pass filter) 174.
Figure 20C:
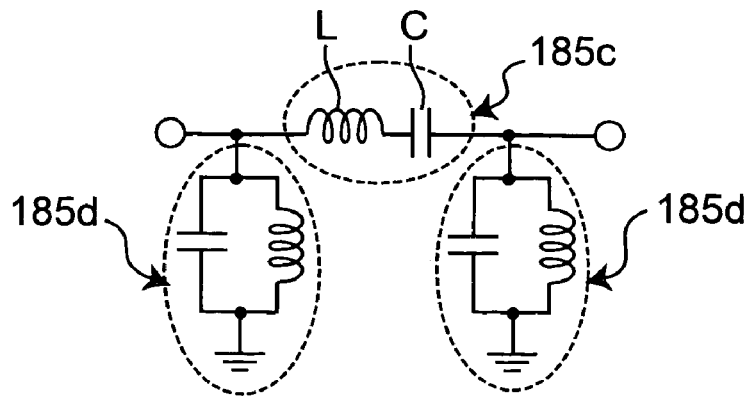
FIG. 20C is a view showing a narrow-band pass filter 171 used for extracting a reference signal 74c in a second path K2.

Description is now given of the size reduction of the loops L2, L3 and the size reduction of the circuit form. FIG. 20A shows a basic equivalent circuit (resonator 185a) of the first path filter (high-pass filter) 173, FIG. 20B shows a basic equivalent circuit (resonator 185b) of the third path filter (low-pass filter) 174, and FIG. 20C shows a basic equivalent circuit (resonators 185c, 185d) of the reference signal extraction filter (narrow-band pass filter) 171. It is to be noted that the suppression ratio of undesired waves in each filter may be adjusted by increasing the number of filters where necessary.

As shown in FIG. 20C, the narrow-band pass filter 171 for use in extraction of the reference signal 74c in the second path K2 is composed of a capacitance (C) and an inductance (L) constituting the resonators 185c, 185d, which makes it possible to obtain a narrow bandpass filters with simple configuration. This narrow-bandpass filter may be downsized by using small-size chip components, laminate substrate technology, IC technology and the like. Moreover, as shown in FIG. 20A, the first path filter (high-pass filter) 173 in the first path K1 is basically composed of only the resonator 185a, and its downsizing is achieved by using small-size chip components, laminate substrate technology, IC technology and the like. Also, as shown in FIG. 20B, the third path filter (low-pass filter) 174 in the third path K3 is basically composed of only the resonator 185b, and its downsizing is achieved by using small-size chip components, laminate substrate technology, IC technology and the like.

More particularly, as shown in FIG. 20A and FIG. 20B, by using the high-pass filter 173 and the low-pass filter 174 in the portions where broadband characteristics are necessary such as the first and third paths K1 and K3, it becomes possible to decrease and simplify the resonators 185a, 185b constituting the respective filters 173, 174. Consequently, the loop L2 and the loop L3 can be downsized and undesired oscillation and the like are suppressed.

Herein, the bandpass filter (or low-pass filter) 172, as shown in FIG. 18B, separates the second IF multiple signal 74 from undesired waves before the second IF multiple signal 74 is converted. Consequently, even in the case where the first and third paths K1 and K3 are simplified by the high-pass filter 173 and the low-pass filter 174, and one-side band separation is performed by the high-pass filter 173 and the low-pass filter 174, only the desired second IF signals 74a-a, 74a-b are passed and separated.

Therefore, according to the seventh embodiment, it becomes possible to obtain the second IF signals 74a-a, 74a-b and the reference signal 74c as desired signals having undesired wave signals being suppressed and having little noise, and to perform second frequency conversion in the loops L2 and L3 in a stabled state. Therefore, it becomes possible to implement sufficient frequency conversion characteristics.

Although the present invention has been described as above, it is apparent that the present invention may be modified in various methods. It should be understood that such modifications come within the spirit and the scope of the invention, and all the arrangements which will readily suggest themselves to those skilled in the art are intended to be embraced in the scope of the appended claims.

The invention claimed is:

1. A radio receiver, comprising:
    a first down-converter for down-converting a received radio signal to produce an intermediate frequency multiple signal; and
    a second down-converter for down-converting the intermediate frequency multiple signal to produce an input signal, wherein
    the second down-converter has:
    a first path;
    a second path;
    a divider for dividing the intermediate frequency multiple signal into signals going to the first path and the second path; and
    a mixer section,
    the first path transmits the intermediate frequency multiple signal from the divider to the mixer section,
    the second path has a filter for extracting a reference signal from the intermediate frequency multiple signal and transmits the reference signal to the mixer section, and
    the mixer section multiplies the intermediate frequency multiple signal from the first path by the reference signal from the second path so as to perform frequency down-conversion of the intermediate frequency multiple signal.

2. The radio receiver as defined in claim 1, wherein the first path does not have a filter.

3. The radio receiver as defined in claim 1, wherein the first path and the second path constitute a negative feedback loop which practically generates negative feedback.

4. The radio receiver as defined in claim 1, wherein the first path has an attenuator.

5. The radio receiver as defined in claim 1, wherein the first path has an isolator.

6. The radio receiver as defined in claim 1, wherein a path length of the first path is almost equal to a path length of the second path.

7. The radio receiver as defined in claim 1, wherein
a sum of the path length of the first path and the path length of the second path is not more than one wavelength in a minimum frequency of a low-side signal of the intermediate frequency multiple signal.

8. The radio receiver as defined in claim 1, wherein
the mixer section has a combiner having port isolation and a base injection-type mixer.

9. The radio receiver as defined in claim 8, wherein
the base injection-type mixer has a short circuit for short-circuiting at least the intermediate frequency multiple signal or the reference signal.

10. The radio receiver as defined in claim 1, wherein
the mixer section is a cascode-type mixer section.

11. The radio receiver as defined in claim 10, wherein
the mixer section has a common emitter-type transistor and a common base-type transistor.

12. The radio receiver as defined in claim 11, wherein
in the mixer section, the reference signal is inputted into the common emitter-type transistor while the intermediate frequency multiple signal is inputted into the common base-type transistor.

13. The radio receiver as defined in claim 1, further comprising:
a first filer which is a filter for filtering out undesired waves from the intermediate frequency multiple signal; and
a second filer which is the filter for extracting the reference signal from the intermediate frequency multiple signal.

14. The radio receiver as defined in claim 1, wherein
the first path has a first amplifier for amplifying the intermediate frequency multiple signal, and
the second path has a second amplifier for amplifying the reference signal extracted via the filter.

15. The radio receiver as defined in claim 1, wherein
the mixer section has a feedback circuit for feeding a reference signal back to an input side.

16. The radio receiver as defined in claim 15, wherein
the mixer section is a base injection-type or a gate injection-type mixer formed of a microwave transistor.

17. The radio receiver as defined in claim 16, wherein
in the mixer section, a signal input port and a local oscillation signal input port are formed of power combiners having port isolation.

18. Electronic equipment comprising the radio receiver as defined in claim 1, wherein
an input signal produced through frequency down-conversion by the radio receiver is at least either recorded or outputted.

19. A radio communication system, comprising:
the radio receiver as defined in claim 1 or the electronic equipment as defined in claim 18; and
a radio transmitter for up-converting an input signal with use of a reference signal to produce an intermediate frequency signal, adding the reference signal to the intermediate frequency signal to produce an intermediate frequency multiple signal, further up-converting the intermediate frequency multiple signal to produce a microwave-band signal, and wirelessly transmitting the microwave-band signal.

20. A radio receiver, comprising:
a first down-converter for down-converting a received radio signal to produce an intermediate frequency multiple signal; and
a second down-converter for down-converting the intermediate frequency multiple signal to produce an input signal, wherein
the second down-converter has:
first to fifth paths;
an undesired wave removal filter for filtering out undesired waves from the intermediate frequency multiple signal; and
a first divider for dividing the intermediate frequency multiple signal into signals going to the first path, the second path and the third path,
the first path has a first path filter and a first mixer section,
the second path has a reference signal extraction filter for extracting a reference signal from the intermediate frequency multiple signal and a second divider for dividing the reference signal into signals going to the fourth path and the fifth path,
the third path has a third path filter and a second mixer section,
the fourth path has a first amplifier and transmits the reference signal to the first mixer section,
the fifth path has a second amplifier and transmits the reference signal to the second mixer section,
the first mixer section multiplies the intermediate frequency multiple signal from the first path by the reference signal from the fourth path so as to perform frequency down-conversion of the intermediate frequency multiple signal, and
the second mixer section multiplies the intermediate frequency multiple signal from the third path by the reference signal from the fifth path so as to perform frequency down-conversion of the intermediate frequency multiple signal.

21. The radio receiver as defined in claim 20, wherein
the first path filter is a high-pass filter, and
the third path filter is a low-pass filter.

22. The radio receiver as defined in claim 20, wherein
the first path and the third path have an isolator or an attenuator.

23. A radio receiver, comprising:
a first down-converter for down-converting a received radio signal to produce an intermediate frequency multiple signal; and
a second down-converter for down-converting the intermediate frequency multiple signal to produce an input signal, wherein
the second down-converter:
extracts a reference signal from the intermediate frequency multiple signal; and
multiplies the intermediate frequency multiple signal containing the reference signal by the reference signal to down-covert the intermediate frequency multiple signal.

* * * * *